United States Patent
Li

(10) Patent No.: US 12,481,712 B2
(45) Date of Patent: *Nov. 25, 2025

(54) DETAILS PAGE PROCESSING METHOD, APPARATUS, AND SYSTEM, ELECTRONIC DEVICE, AND STORAGE MEDIUM

(71) Applicant: Petal Cloud Technology Co., Ltd., Dongguan (CN)

(72) Inventor: Chao Li, Nanjing (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 72 days.

This patent is subject to a terminal disclaimer.

(21) Appl. No.: 18/612,454

(22) Filed: Mar. 21, 2024

(65) Prior Publication Data

US 2024/0232278 A1      Jul. 11, 2024

Related U.S. Application Data

(63) Continuation of application No. 17/914,440, filed as application No. PCT/CN2021/079637 on Mar. 9, 2021, now Pat. No. 11,966,447.

(30) Foreign Application Priority Data

Mar. 27, 2020   (CN) .......................... 202010231500.1

(51) Int. Cl.
| | | |
|---|---|---|
| G06F 16/9535 | (2019.01) |
| G06F 3/0483 | (2013.01) |
| G06F 16/957 | (2019.01) |
| G06F 16/958 | (2019.01) |
| H04L 67/306 | (2022.01) |

(52) U.S. Cl.
CPC ........ *G06F 16/9535* (2019.01); *G06F 3/0483* (2013.01); *G06F 16/957* (2019.01); *G06F 16/958* (2019.01); *H04L 67/306* (2013.01)

(58) Field of Classification Search
CPC ..... G06F 16/957; G06F 16/958; G06F 3/0483
USPC ........................................................ 715/234
See application file for complete search history.

(56) References Cited

U.S. PATENT DOCUMENTS

| | | |
|---|---|---|
| 6,446,076 B1 | 9/2002 | Burkey et al. |
| 10,248,991 B1 | 4/2019 | Cheung |
| 11,403,362 B1 * | 8/2022 | Liu .......................... G06F 3/023 |

(Continued)

FOREIGN PATENT DOCUMENTS

| | | |
|---|---|---|
| AU | 2017254843 A1 | 11/2017 |
| CN | 101609457 A | 12/2009 |

(Continued)

*Primary Examiner* — William D Titcomb
(74) *Attorney, Agent, or Firm* — Conley Rose, P.C.

(57) ABSTRACT

A terminal sends, to a server, a request for obtaining details page content of first information, where the request includes an identifier of a user and an identifier of the first information. The server determines, based on the identifier of the user and the identifier of the first information, the details page content of the first information, where the details page content is different from preset details page content of the first information. The server sends the details page content of the first information to the terminal. The terminal displays, based on the details page content of the first information, a details page of the first information.

20 Claims, 46 Drawing Sheets

(56) References Cited

U.S. PATENT DOCUMENTS

| | | | |
|---|---|---|---|
| 2008/0201206 A1* | 8/2008 | Pokorney | G06Q 30/02 |
| | | | 705/7.29 |
| 2008/0201242 A1* | 8/2008 | Minnis | G06Q 30/0244 |
| | | | 705/14.66 |
| 2008/0201643 A1* | 8/2008 | Nagaitis | G06Q 30/0255 |
| | | | 715/738 |
| 2011/0211813 A1 | 9/2011 | Marks | |
| 2012/0036449 A1* | 2/2012 | Minnis | G06Q 30/02 |
| | | | 715/745 |
| 2014/0201038 A1* | 7/2014 | Minnis | G06Q 30/0269 |
| | | | 715/234 |
| 2014/0278758 A1 | 9/2014 | Christiansen et al. | |
| 2014/0337791 A1 | 11/2014 | Agnetta et al. | |
| 2015/0254222 A1* | 9/2015 | Shadfar | G06F 16/957 |
| | | | 715/230 |
| 2017/0140041 A1 | 5/2017 | Dotan-Cohen et al. | |
| 2018/0004371 A1 | 1/2018 | Han et al. | |
| 2018/0240069 A1 | 8/2018 | Yong et al. | |
| 2019/0259054 A1 | 8/2019 | Minnis et al. | |
| 2023/0120681 A1* | 4/2023 | Li | G06F 16/958 |
| | | | 715/234 |

FOREIGN PATENT DOCUMENTS

| | | |
|---|---|---|
| CN | 104599144 A | 5/2015 |
| CN | 105260463 A | 1/2016 |
| CN | 105677649 A | 6/2016 |
| CN | 106682144 A | 5/2017 |
| CN | 110007829 A | 7/2019 |
| WO | 2014015106 A1 | 1/2014 |

* cited by examiner

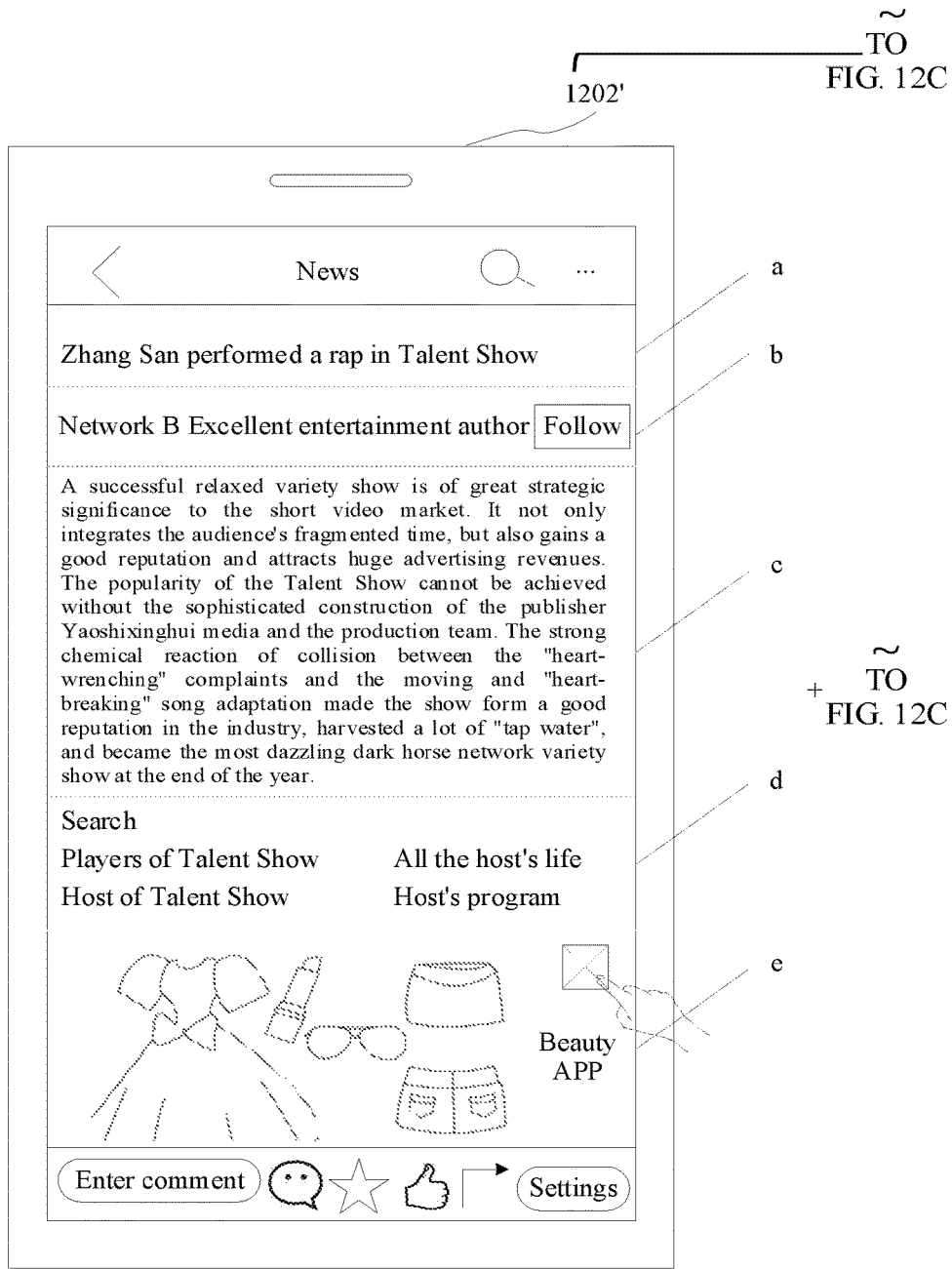

CONT. FROM FIG. 16A ~

TO FIG. 16C

DETAILS PAGE PROCESSING METHOD, APPARATUS, AND SYSTEM, ELECTRONIC DEVICE, AND STORAGE MEDIUM

This application is a continuation of U.S. patent application Ser. No. 17/914,440, filed on Sep. 26, 2022, which is a National Stage of International Patent Application No. PCT/CN2021/079637, filed on Mar. 9, 2021, which claims priority to Chinese Patent Application No. 202010231500.1, filed on Mar. 27, 2020. All of the aforementioned patent applications are hereby incorporated by reference in their entireties.

TECHNICAL FIELD

Embodiments of this application relate to Internet technologies, and in particular, to a details page processing method, apparatus, and system, an electronic device, and a storage medium.

BACKGROUND

With the rapid development of Internet technologies, a user can obtain information such as text and a video by using a browser application or a news and information application in a terminal device. Currently, a home page of an application may display information categories such as entertainment, military information, or music. For each category, a list page corresponding to information of the category is correspondingly displayed, and the list page includes instructions of a plurality of pieces of information of the category. After a user selects a piece of information on the list page, the list page jumps to a details page of the information.

In the conventional technology, a details page of information includes content in preset subject areas, and the preset subject areas are arranged on the details page in a preset order. The preset subject areas include a title area, a text area, a recommendation area related to the information, an advertisement area, a comment area, and the like.

However, different users have different preferences for preset subject areas on a details page, and existing details pages cannot meet personalized requirements of the users.

SUMMARY

Embodiments of this application provide a details page processing method, apparatus, and system, an electronic device, and a storage medium, to provide a details page suitable for reading by a user, thereby meeting a personalized requirement of the user and improving user experience.

According to a first aspect, an embodiment of this application provides a details page processing system. The system includes a terminal device and a server. In this embodiment of this application, the terminal device sends, to the server, a request for obtaining details page content of first information, where the request includes an identifier of a user and an identifier of the first information; and the server may determine the details page content of the first information based on the identifier of the user and the identifier of the first information, and send the details page content of the first information to the terminal device, where the details page content is different from preset details page content of the first information. Correspondingly, the terminal device may display a details page of the first information after receiving the details page content of the first information.

That the detail page content that is of the first information and that is determined by the server is different from the preset details page content of the first information is specifically as follows: The details page content of the first information does not include a first subject area, or the details page content of the first information includes preset subject areas, but a first subject area in the preset subject areas is ranked lower than in a preset order. It should be understood that, the first subject area is a subject area that is not preferred by the user, and the first subject area may be different for different users.

It should be understood that, in this embodiment of this application, for information requested by different users, details page content different from preset details page content of the information may be determined. In this way, details pages suitable for reading by the users can be provided for the users, thereby meeting personalized requirements of the users and improving user experience.

For one user, subject areas preferred and not preferred by the user may be different for different categories of information. In other words, for the user, first subject areas of different categories of information are different. In this embodiment of this application, in a process in which the user previously reads information, the terminal device may collect reading data of the user, and send the reading data of the user to a user portrait device and the server. Further, the server or the user portrait device may determine, based on the reading data of the user, preference data that is of the user and that is corresponding to each subject area of a details page of each category of information, and further determine, based on the preference data of the user, a first subject area corresponding to a category to which the first information belongs. It should be understood that, after obtaining the preference data of the user based on the reading data of the user, the user portrait device may send the preference data of the user to the server.

The following describes a process in which the server obtains the preference data of the user based on the reading data of the user and a process in which the server determines, based on the preference data of the user, the first subject area corresponding to information of the category. The preference data of the user herein is preference data corresponding to each subject area on a details page corresponding to the category to which the first information belongs. It should be understood that, manners of obtaining, by the server, preference data that is of the user and that is corresponding to various subject areas on details pages of various categories of information are the same. The reading data of the user may include a category of the information, reading duration of the information, and reading duration, clicking data, and exposure data that are corresponding to each subject area in preset subject areas on a details page of the information. In this embodiment of this application, reading data that is of the user and that is corresponding to the category to which the first information belongs may be determined based on the category to which the first information belongs, and the reading data that is of the user and that is corresponding to the category to which the first information belongs includes reading data obtained when the user reads information of the category each time. In other words, each time the user reads the information of the category, the terminal device sends, to the server, the reading data obtained when the user reads the information.

In a process in which the user reads data at a time, the server may obtain, based on a reading duration proportion, clicking data, and exposure data that are corresponding to each subject area, a preset weight of the reading duration proportion, a preset weight of the clicking data, and a preset weight of the exposure data, a preference value that is of the user and that is corresponding to each subject area in the preset subject areas for the case that the user reads information of the category this time. It should be understood that, the server may use a subject area that is in subject areas corresponding to preference values less than a threshold and that is corresponding to preference values whose quantity is greater than a quantity threshold, as a first subject area. For example, if a preference value corresponding to an advertisement area is less than the threshold each time information reading is performed, and a quantity of preference values that are corresponding to the advertisement area and that are less than the threshold is greater than the quantity threshold, the advertisement area is determined as a first subject area.

In this embodiment of this application, after determining the preference data that is of the user and that is corresponding to the category to which the first information belongs, that is, a preferred subject area and a non-preferred subject area (the first subject area), the server may guide the user to close the first subject area or rank the first subject area lower in order (this is referred to as guiding the user to perform settings on the first subject area for short below).

A process in which the server guides the user to perform settings on the first subject area may be specifically as follows: When the user requests details page content of second information whose category is the same as that of the first information, the server may send an identifier of the first subject area together with the details page content of the second information, so that the terminal device displays a closing control in the first subject when displaying a details page of the second information. The user may select the closing control in the first subject area, so that the terminal device disables display of the first subject area or ranks the first subject area lower in order for display. Correspondingly, the terminal device may send information about the settings performed by the user to the server. The settings information may include the identifier of the first subject area. Generally, the terminal device notifies the server that the user performs settings on the first subject area. During sending of details page content of a same category next time, the terminal device does not send the content of the first subject area, or ranks the first subject area lower in order.

Correspondingly, when the user requests the details page content of the first information, the server may determine, based on information about settings performed by the user on the second information of the same category, that the details page content of the first information specifically does not include the first subject area, or that the details page content of the first information includes the preset subject areas but the first subject area in the preset subject areas is ranked lower than in the preset order. Therefore, for different users, details page content suitable for reading by the users can be provided for the users based on reading preferences of the users, thereby meeting personalized requirements of the users and improving user experience.

It should be noted that, after performing settings on the first subject area, the user may also restore the settings of the first subject area. For example, after the terminal device closes the first subject area, the user may further re-open the first subject area by interacting with the terminal device. Alternatively, after the terminal device ranks the first subject area lower in order, the user may further rank the first subject area higher in order by interacting with the terminal device. This embodiment of this application provides two possible implementations.

In a first possible implementation, a "Settings" control is displayed on the details page of the first information, and the user may select the "Settings" control to re-open the first subject area or rank the first subject area higher in order. Correspondingly, after the user changes settings on the first subject area, the terminal device may send updated settings information to the server.

In a second possible implementation, the server may determine a hotspot subject area based on reading data that is corresponding to the first information and that is fed back by another terminal device. After determining the hotspot subject area, the server may determine whether the hotspot subject area includes the first subject area. If the hotspot subject area includes the first subject area, the server may send reminder information to the terminal device. Correspondingly, the terminal device may display the reminder information on the details page of the first information. The user may perform an operation on the reminder information to re-open the first subject area or rank the first subject area higher in order. Correspondingly, after the user changes settings on the first subject area, the terminal device may send updated settings information to the server.

According to a second aspect, an embodiment of this application provides a details page processing method. The details page processing method may be performed by a server or a processor, a chip, or the like in a server. The details page processing method includes: receiving, from a terminal device, a request for obtaining details page content of first information, where the request includes an identifier of a user and an identifier of the first information; determining the details page content of the first information based on the identifier of the user and the identifier of the first information, where the details page content is different from preset details page content of the first information, the preset details page content includes preset subject areas arranged in a preset order, and that the details page content is different from preset details page content of the first information specifically includes: the details page content does not include a first subject area in the preset subject areas, or the details page content includes the preset subject areas but a first subject area in the preset subject areas is ranked lower than in the preset order; and sending the details page content of the first information to the terminal device.

In this embodiment of this application, for information requested by different users, details page content different from preset details page content of the information may be determined. In this way, details pages suitable for reading by the users can be provided for the users, thereby meeting personalized requirements of the users and improving user experience.

In a possible implementation, the determining the details page content of the first information based on the identifier of the user and the identifier of the first information includes: obtaining, based on a category of the first information and the identifier of the user, information about settings performed by the user on a details page of second information of the category, where the settings information indicates that the user closes a first subject area on the details page of the second information; and determining the details page content of the first information based on the identifier of the first information and the settings information.

In this manner, the user has different preferences for subject areas on details pages of different categories of information. In this embodiment of this application, details page content that is more suitable for the current first information can be determined based on the settings information corresponding to the category of the first information requested by the user.

In a possible implementation, the obtaining information about settings performed by the user on a details page of second information of the category includes: receiving the settings information sent by the terminal device, where the settings information is generated by the terminal device based on an operation performed by the user on a closing control in the first subject area on the details page of the second information.

When the terminal device requests details page content of the second information of the category, the server sends an identifier of the first subject area to the terminal device based on preference data that is of the user and that is corresponding to the information of the category, so that the terminal device displays the closing control included in the first subject area. When the user performs the operation on the closing control, the server may receive the settings information sent by the terminal device.

In this manner, settings on the first subject area are determined by the server based on the preference data of the user. The first subject area may be pushed to the user in a process of reading information by the user, to guide the user to perform settings on the first subject area. The user does not need to specifically set a non-preferred subject area in advance.

In a possible implementation, the preference data of the user includes a preference value that is of the user and that is corresponding to each subject area in the preset subject areas each time the user reads information of the category. Before the sending an identifier of the first subject area on the details page of the second information to the terminal device, the method further includes: determining subject areas that are in the subject areas and that are corresponding to preference values less than a threshold each time the user reads the information of the category; and using a subject area that is in the subject areas corresponding to the preference values less than the threshold and that is corresponding to preference values whose quantity is greater than a quantity threshold, as the first subject area.

In this manner, the preference data of the user is determined by the server based on reading data of the user. Therefore, in this embodiment of this application, the first subject area can be intelligently recommended to the user, and the first subject area has relatively high confidence.

In a possible implementation, after the sending the details page content of the first information to the terminal device, the method further includes: receiving updated settings information from the terminal device, where the updated settings information is generated based on an operation performed by the user on the first subject area; and the operation is used to restore display of the first subject area or rank the first subject area higher in order.

In this manner, after performing settings on the first subject area, the user may further use the terminal device to open the first subject area or rank the first subject area higher in order. This helps the user open the first subject area when the user needs to read the first subject area.

In a possible implementation, the method further includes: sending reminder information to the terminal device, where the reminder information is generated based on reading data that is corresponding to the first information and that is fed back by another terminal device, and the reminder information indicates to restore display of the first subject area or rank the first subject area higher in order.

The first subject area indicated by the reminder information is a subject area preferred by a user of the another terminal device, that is, a hotspot subject area. In this embodiment of this application, a hotspot subject area on the details page of the first information may be determined based on preference data that is of the user of the another terminal device and that is corresponding to each subject area on the details page of the first information. If the hotspot subject area includes the first subject area, the reminder information is sent to the terminal device.

In this manner, after the user performs settings on the first subject area, the server may further push the reminder information to the terminal device, so that the user can open the first subject area or rank the first subject area higher in order. This helps the user open the first subject area when the user needs to read the first subject area.

In a possible implementation, after the sending reminder information to the terminal device, the method further includes: receiving re-updated settings information from the terminal device, where the re-updated settings information is generated based on an operation performed by the user on the reminder information; and the operation is used to restore display of the first subject area or rank the first subject area higher in order.

In a possible implementation, before the sending an identifier of the first subject area to the terminal device based on preference data that is of the user and that is corresponding to the information of the category, the method further includes: receiving user portrait information from a user portrait device, where the user portrait information includes the identifier of the user and preference data that is corresponding to the identifier of the user and each category of information; and obtaining the preference data from the user portrait information.

In a possible implementation, before the sending an identifier of the first subject area to the terminal device based on preference data that is of the user and that is corresponding to the information of the category, the method further includes: receiving reading data of the user from the terminal device in a process in which the user previously reads information; and obtaining the preference data based on the reading data.

In a possible implementation, the reading data of the user includes a category of the information, reading duration of the information, and reading duration corresponding to each subject area in preset subject areas on a details page. Optionally, the reading data of the user may further include clicking data and/or exposure data corresponding to each subject area in the preset subject areas on the details page.

In the foregoing manner, the server or the user portrait device may determine the preference data of the user based on the reading data of the user, and further determine, based on the preference data, the first subject area corresponding to each category of information, to guide the user to close the first subject area, and provide the user with details page content suitable for reading by the user.

According to a third aspect, an embodiment of this application provides a details page processing method. The details page processing method may be performed by a terminal device or a processor, a chip, or the like in a terminal device. The details page processing method includes: sending, to a server, a request for obtaining details page content of first information, where the request includes an identifier of a user and an identifier of the first information; receiving the details page content of the first information from the server, where the details page content is different from preset details page content of the first information, the preset details page content includes preset subject areas arranged in a preset order, and that the details page content is different from preset details page content of the first information specifically includes: the details page content does not include a first subject area in the preset subject areas, or the details page content includes the preset subject areas but a first subject area in the preset subject areas is ranked lower than in the preset order; and displaying a details page of the first information based on the details page content of the first information.

In a possible implementation, before the sending, to a server, a request for obtaining details page content of first information, the method further includes: displaying a details page of second information whose category is the same as that of the first information, where the first subject area on the details page of the second information includes a closing control; and receiving an operation performed by the user on the closing control in the first subject area, and sending, to the server, information about settings performed by the user on the details page of the second information of the category, where the settings information indicates the user to close the first subject area on the details page of the second information.

In a possible implementation, a settings control is further displayed on the details page of the first information, and the method further includes: receiving an indication of the user for selecting the settings control, and displaying a settings interface, where an adjustment control is displayed on the settings interface, and the adjustment control is used to restore display of the first subject area or rank the first subject area higher in order; and receiving a selection operation performed by the user on the adjustment control, and sending updated settings information to the server.

In a possible implementation, the method further includes: receiving reminder information from the server, where the reminder information is generated by the server based on reading data that is corresponding to the first information and that is fed back by another terminal device, and the reminder information indicates to restore display of the first subject area or rank the first subject area higher in order; displaying the reminder information on the details page of the first information; and receiving an indication of the user for selecting the reminder information, generating re-updated settings information, and sending the re-updated settings information to the server.

In a possible implementation, after the sending updated settings information/the sending the re-updated settings information to the server, the method further includes: displaying a refreshed details page of the first information, where on the refreshed details page of the first information, the first subject area is displayed, or the first subject area is ranked higher in order.

In a possible implementation, the method further includes: in a process in which the user previously reads information, collecting reading data of the user, and sending the reading data of the user to a user portrait device and the server.

In a possible implementation, the reading data of the user includes a category of the information, reading duration of the information, and reading duration corresponding to each subject area in preset subject areas on a details page of the information. Optionally, the reading data of the user may further include clicking data and/or exposure data corresponding to each subject area in the preset subject areas on the details page.

For beneficial effects of the details page method provided in the third aspect of embodiments of this application, refer to the beneficial effects brought in the second aspect. Details are not described herein again.

According to a fourth aspect, an embodiment of this application provides a details page processing apparatus. The details page processing apparatus includes a transceiver module and a processing module. The transceiver module is configured to perform a sending operation and a receiving operation performed by the server in the second aspect and the possible implementations of the second aspect. The processing module is configured to perform a processing operation performed by the server in the second aspect and the possible implementations of the second aspect.

According to a fifth aspect, an embodiment of this application provides a details page processing apparatus. The details page processing apparatus includes a transceiver module, a processing module, and a display module. The transceiver module is configured to perform a sending operation and a receiving operation performed by the terminal device in the third aspect and the possible implementations of the third aspect. The processing module is configured to perform a processing operation performed by the terminal device in the third aspect and the possible implementations of the third aspect. The display module is configured to display an interface of the terminal device. For example, the interface provides a details page of information.

According to a sixth aspect, an embodiment of this application provides an electronic device, including at least one processor and a memory communicatively connected to the at least one processor. The memory stores instructions that can be executed by the at least one processor. The instructions are executed by the at least one processor, so that the electronic device can perform the method in the second aspect and the possible implementations of the second aspect.

According to a seventh aspect, an embodiment of this application provides an electronic device, including at least one processor, a memory communicatively connected to the at least one processor, and a display. The memory stores instructions that can be executed by the at least one processor. The instructions are executed by the at least one processor, so that the electronic device can perform the method in the third aspect and the possible implementations of the third aspect.

According to an eighth aspect, an embodiment of this application provides a chip. The chip stores a computer program. When the computer program is executed by the chip, the method provided in the second aspect or the third aspect is implemented.

According to a ninth aspect, an embodiment of this application provides a computer program product including instructions. When the computer program product runs on a computer, the computer is enabled to perform the method provided in the second aspect or the third aspect.

According to a tenth aspect, an embodiment of this application provides a computer-readable storage medium. The computer-readable storage medium stores instructions. When the instructions are run on a computer, the computer is enabled to perform the method provided in the second aspect or the third aspect.

Embodiments of this application provide a details page processing method, apparatus, and system, an electronic device, and a storage medium. The method includes: A terminal device sends, to a server, a request for obtaining details page content of first information, where the request includes an identifier of a user and an identifier of the first information; the server determines the details page content of the first information based on the identifier of the user and the identifier of the first information, where the details page content is different from preset details page content of the first information; the server sends the details page content of the first information to the terminal device; and the terminal device displays a details page of the first information based on the details page content of the first information. In embodiments of this application, for different users, details pages suitable for reading by the users can be provided for the users, thereby meeting personalized requirements of the users and improving user experience.

BRIEF DESCRIPTION OF DRAWINGS

FIG. 12A to FIG. 12H are a schematic diagram 5 of an interface change of a terminal device according to an embodiment of this application;

DESCRIPTION OF EMBODIMENTS

Figure 1A:
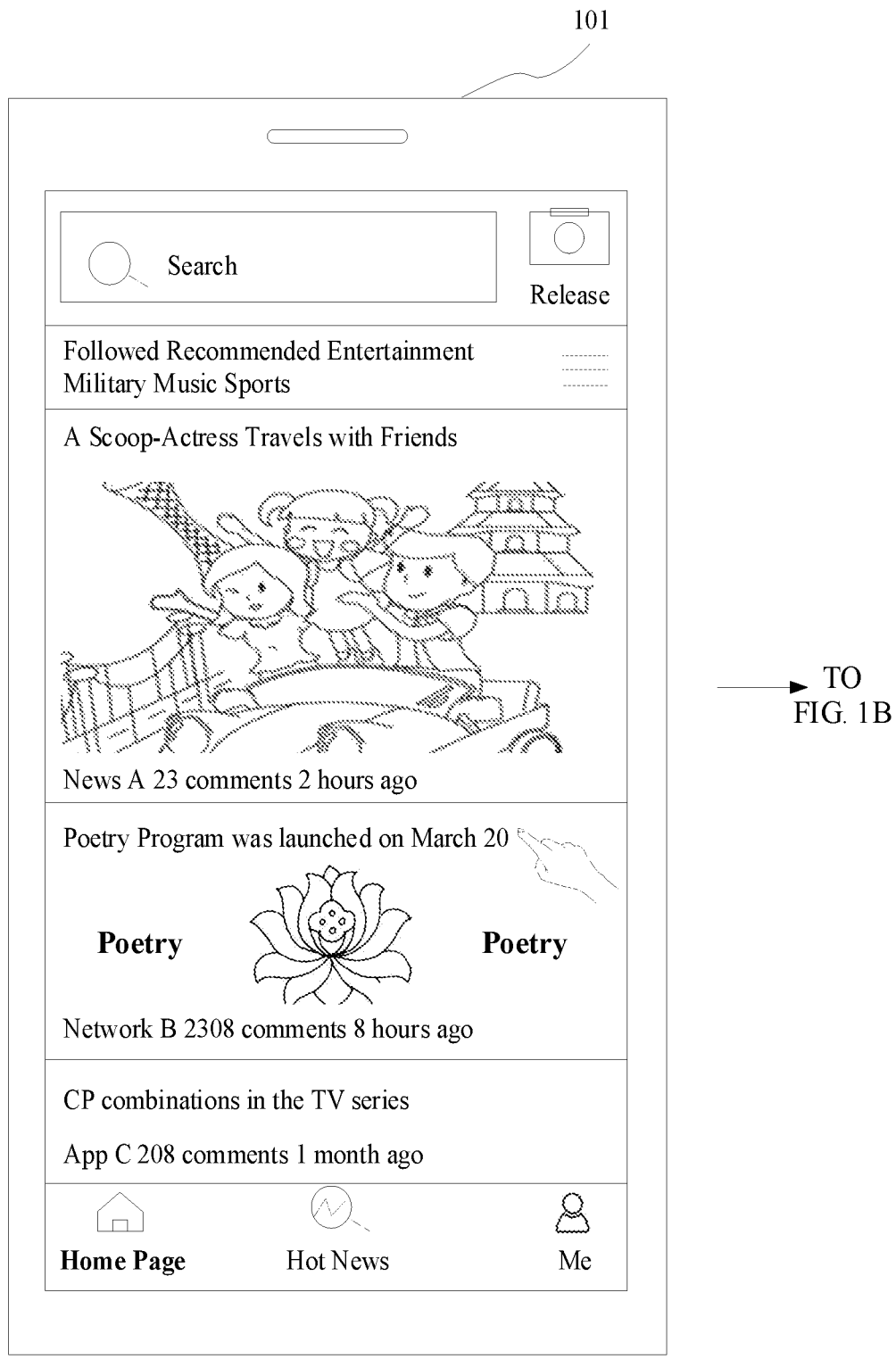
FIG. 1A to FIG. 1C are a schematic diagram of an interface change occurring when a user obtains information according to the conventional technology.
Figure 1B:
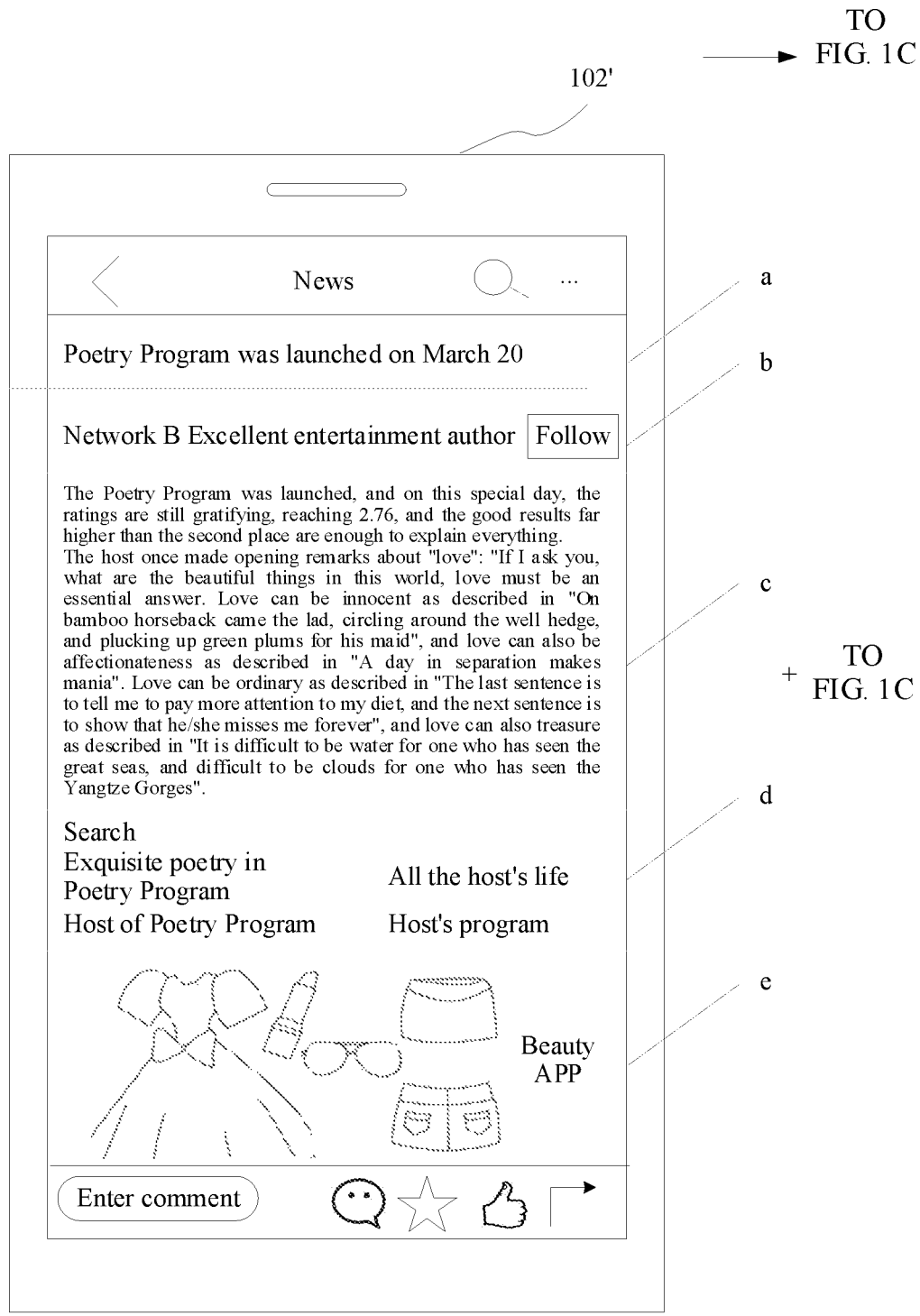
Figure 1C:
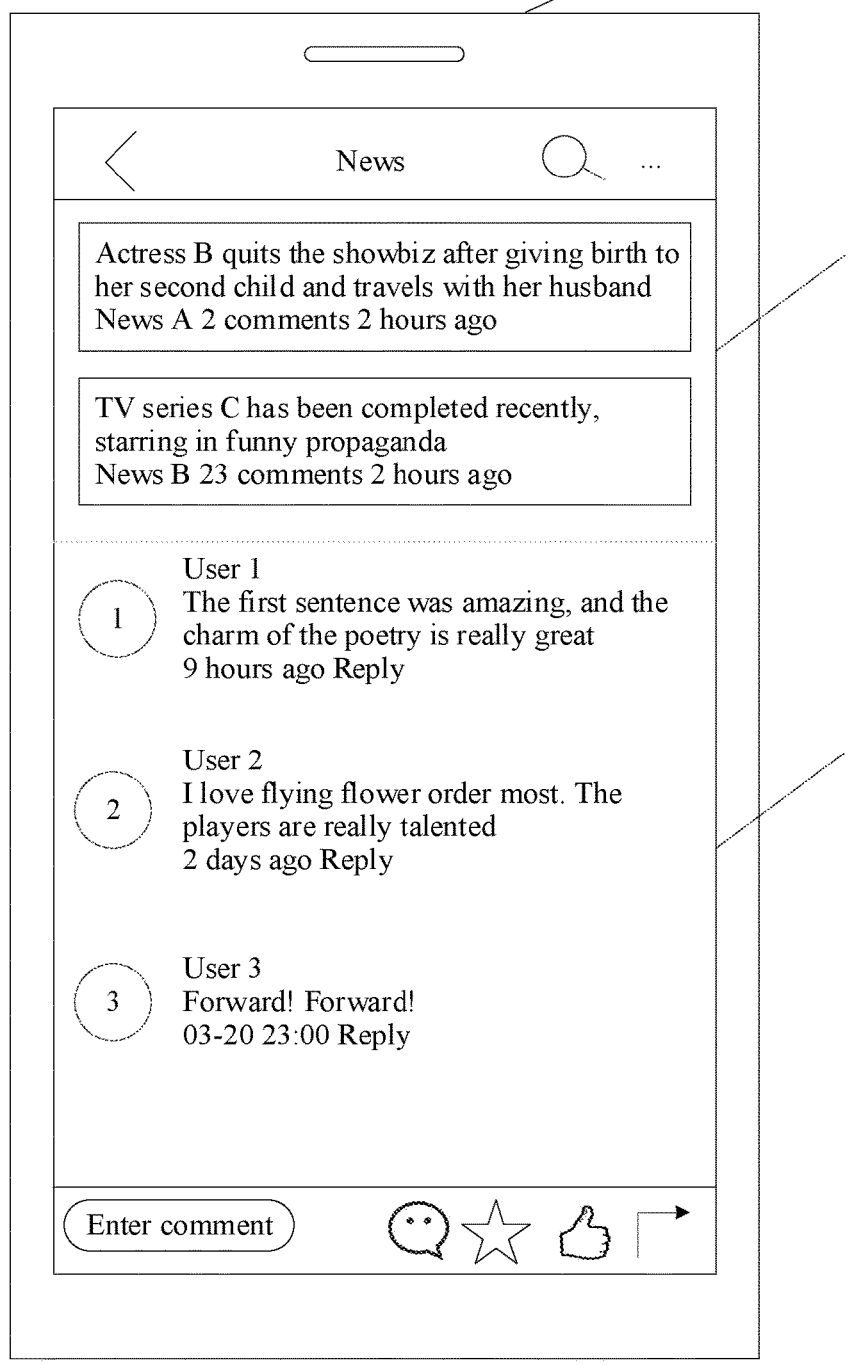

FIG. 1A to FIG. 1C are a schematic diagram of an interface change occurring when a user obtains information according to the conventional technology. It should be understood that, the information in embodiments of this application is information such as text, a video, or audio. In FIG. 1A to FIG. 1C, an example in which a terminal device is a smartphone is used to describe interfaces on which the user obtains information by using a news and information application in the smartphone. As shown in FIG. 1A to FIG. 1C, an interface 101 is a home page of the application, and the interface 101 includes information categories such as followed information, recommended information, entertainment, military information, music, and sports, to help provide navigational reading for the user. Each category may further include subcategories. For example, the entertainment category may include national entertainment and international entertainment. The subcategories are not shown in FIG. 1A to FIG. 1C. For each category, a list page corresponding to information of the category is correspondingly displayed, and the list page includes instructions of a plurality of pieces of information of the category. For example, the interface 101 provides a list page corresponding to the entertainment category, and the list page includes a plurality of pieces of entertainment information. After the user selects a piece of information on the list page, the list page jumps to a details page of the information. If the user touches information "Poetry Program was launched on March 20" on the interface 101, the interface 101 jumps to an interface 102. The interface 102 provides a details page of the information "Poetry Program was launched on March 20".

In the conventional technology, a details page of information includes content in preset subject areas, and the preset subject areas are arranged on the details page in a preset order. As shown on the interface 102, preset subject areas on the details page of the entertainment information include a title area a, an author introduction area b, a text area c, a recommendation area d related to the information, an advertisement area e, an extended reading area f, and a comment area g. In addition, the preset subject areas on the details page are arranged in a preset order of a to g. It should be noted that, in FIG. 1A to FIG. 1C, to fully display the details page of the information, the interface 102 is displayed as two interfaces: an interface 102' and an interface 102". It should be understood that, the interface 102" is an interface obtained when the user slides down on the interface 102', and both the interface 102' and the interface 102" are details pages of the information "Poetry Program was launched on March 20". It should be understood that, information related to Poetry Program is recommended in the recommendation area d related to the information, and other information of the entertainment category is recommended in the extended reading area f.

As a carrier of the information and a core technology of an application product, the details page of the information can affect reading experience of the user. Different users have different preferences for the preset subject areas on the details page. In the conventional technology, the details page includes fixed preset subject areas, and a manner in which the preset subject areas are arranged on the details page in the preset order cannot meet personalized requirements of the users. For example, the user does not like the advertisement area on the details page, but each time the user reads information, the user can see the advertisement area after reading the text area, and therefore has poor user experience. For another example, the user likes to view the comment area on the details page, but each time the user reads information, the user can see the comment area only after sliding down to the bottom of the details page.

To resolve the foregoing problems, an embodiment of this application provides a details page processing method, to provide different users with details pages suitable for reading by the users, thereby meeting personalized requirements of the users and improving user experience.

Figure 2:
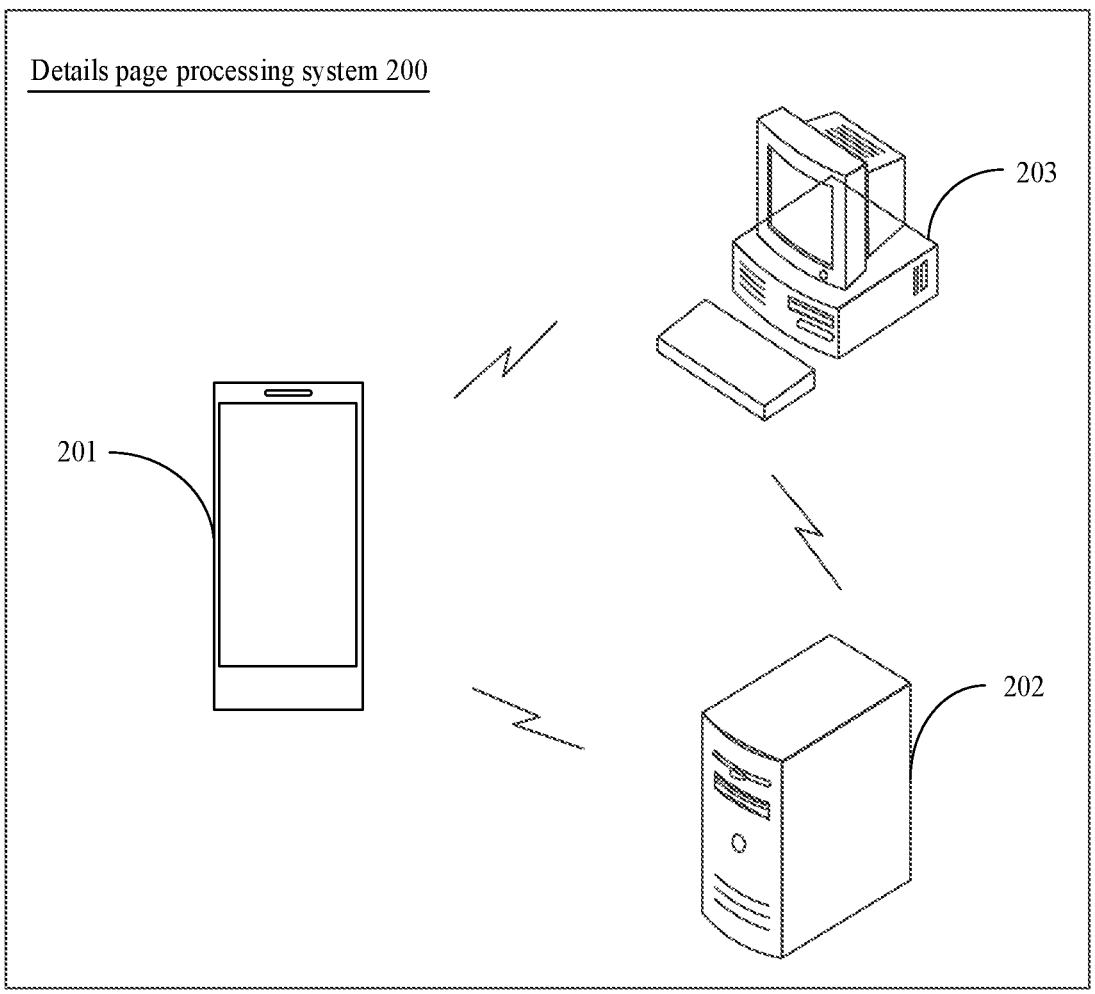
FIG. 2 is a schematic diagram of a details page processing system according to an embodiment of this application.

The details page processing method in this embodiment of this application may be applied to a details page processing system. FIG. 2 is a schematic diagram of a details page processing system according to an embodiment of this application. As shown in FIG. 2, the details page processing system 200 may include a terminal device 201, a server 202, and a user portrait device 203.

A user may request information by using the terminal device 201, so that the terminal device 201 requests the information from the server 201. The server 202 stores preference data that is of different users and that is corresponding to each subject area in preset subject areas. Therefore, the server may determine, based on a request of the terminal device 201, a personalized assembled details page suitable for reading by the user corresponding to the terminal device 201, so that the terminal device 201 can display the details page suitable for reading by the user, to improve user experience.

It should be understood that, the personalized assembled details page suitable for reading by the user is different from a preset details page. The personalized assembled details page suitable for reading by the user does not include a subject area that is not preferred by the user. In this way, during information reading, the user reads only content in a subject area preferred by the user, to avoid interference from content in another subject area that is not preferred by the user. Alternatively, preset subject areas in the personalized assembled details page suitable for reading by the user are arranged based on a preference of the user, so that the user can first read content in a subject area preferred by the user, to avoid interference that is caused to reading by the user because content in another subject area that is not preferred by the user is ranked higher in order.

In this embodiment of this application, the terminal device 201 may feed back reading data of the user to the user portrait device 203 and the server 202 in a process in which the user reads information. The user portrait device 203 may obtain preference data of the user based on the reading data of the user, and send the preference data of the user to the server 202. The server 202 may store the preference data of the user in a database, and the server may also store the reading data of the user correspondingly. It should be noted that, the details page processing system in this embodiment of this application may not include the user portrait device 203, and the server 202 may perform the operation of obtaining the preference data of the user that is performed by the user portrait device 203.

In this embodiment of this application, the server 202 may determine, based on the preference data of the user, a subject area that is not preferred by the user, so that when displaying a details page of information, the terminal device 201 may display, in the subject area that is not preferred by the user, a closing control that can be used to close the subject area. Further, the user may close the non-preferred subject area by closing the non-preferred subject area, or rank the non-preferred subject area lower in order.

It can be understood that, the foregoing briefly describes the details page processing method provided in this embodiment of this application, and the following describes the details page processing method in detail with reference to specific embodiments.

In embodiments of this application, the terminal device 201 may be user equipment, an access terminal, a subscriber unit, a subscriber station, a remote terminal, a mobile device, a user terminal, a terminal, a wireless communication device, a user agent, or a user apparatus. The terminal device may be a mobile phone (mobile phone), a tablet computer (pad), a computer with wireless receiving and sending functions, a cellular phone, a cordless phone, a session initiation protocol (session initiation protocol, SIP) phone, a personal digital assistant (personal digital assistant, PDA), a handheld device with a wireless communication function, a computing device or another processing device connected to a wireless modem, a vehicle-mounted device, a wearable device, a virtual reality (virtual reality, VR) terminal device, an augmented reality (augmented reality, AR) terminal device, a wireless terminal in a smart home (smart home), a terminal device in a future 5G network, a terminal device in a future evolved public land mobile network (public land mobile network, PLMN), or the like. This is not limited in embodiments of this application.

Figure 3:
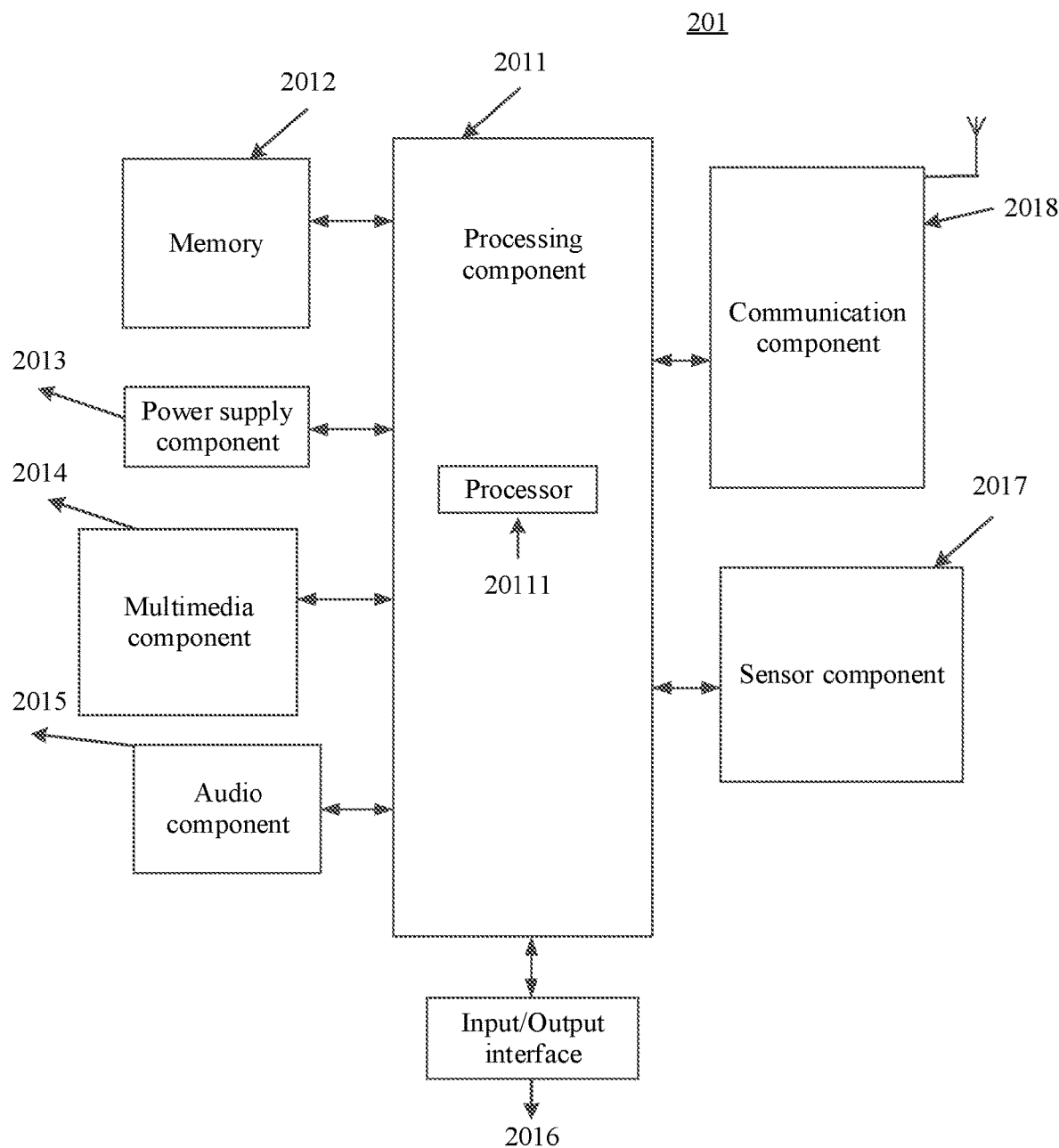
FIG. 3 is a schematic diagram of a structure of a terminal device according to an embodiment of this application.

FIG. 3 is a schematic diagram of a structure of a terminal device according to an embodiment of this application. As shown in FIG. 3, the terminal device 201 in this embodiment of this application may include one or more of the following components: a processing component 2011, a memory 2012, a power supply component 2013, a multimedia component 2014, an audio component 2015, an input/output (I/O) interface 2016, a sensor component 2017, and a communication component 2018.

The processing component 2011 may include one or more processors 20111 to execute instructions, to complete a processing operation performed by the terminal device in this embodiment of this application. In addition, the processing component 2011 may include one or more modules. This facilitates interaction between the processing component 2011 and other components, for example, interaction between the processing component 2011 and the multimedia component 2014, interaction between the processing component 2011 and the audio component 2015, and interaction between the processing component 2011 and the communication component 2018. The interaction between the processing component 2011 and the multimedia component 2014 may implement information display, and the interaction between the processing component 2011 and the communication component 2018 may implement interaction between the terminal device 201 and the server 202.

The memory 2012 stores various types of data to support an operation on the terminal device 201. For example, the data includes instructions, information, a picture, a video, and the like for any application or method operated on the terminal device 201. The memory 2012 may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power supply component 2013 provides power to various components of the terminal device 201. The power supply component 2013 may include a power management system, one or more power supplies, and other components associated with power generation, management, and distribution for the terminal device 201.

The multimedia component 2014 includes a screen that is between the terminal device 201 and a user and that provides an output interface. In some embodiments, the screen may include a liquid crystal display (LCD) and a touch panel (TP). If the screen includes a touch panel, the screen may be implemented as a touchscreen to receive an input signal from the user. The touch panel includes one or more touch sensors to sense touches, sliding, and gestures on the touch panel. The touch sensor not only can sense a boundary of a touch or slide operation, but also can detect duration and pressure associated with the touch or slide operation. In some embodiments, the multimedia component 2014 includes a front-facing camera and/or a rear-facing camera. When the terminal device 201 is in an operating mode, for example, a shooting mode or a video mode, the front-facing camera and/or the rear-facing camera may receive external multimedia data. The front-facing camera and the rear-facing camera each may be a fixed optical lens system or have a focal length and an optical zooming capability.

The audio component 2015 is configured to output and/or input an audio signal. For example, the audio component 2015 includes a microphone (MIC). When the terminal device 201 is in the operating mode, for example, a call mode, a recording mode, and a speech recognition mode, the microphone is configured to receive an external audio signal. The received audio signal may be further stored in the memory 2012 or sent through the communication component 2018. In some embodiments, the audio component 2015 further includes a speaker for audio output.

The I/O interface 2016 provides an interface between the processing component 2011 and a peripheral interface module, and the peripheral interface module may be a keyboard, a click wheel, a button, or the like. The button may include but is not limited to a home button, a volume button, a start button, and a lock button.

The sensor component 2017 includes one or more sensors, and is configured to provide status assessment of various aspects for the terminal device 201. For example, the sensor component 2017 may detect an on/off state of the terminal device 201 and detect relative positions between components of the terminal device 201. For example, the components are a display and a keypad of the terminal device 201. The sensor component 2017 may further detect a position change of the terminal device 201 or a component of the terminal device 201, detect whether the user is in contact with the terminal device 201, and detect an orientation or acceleration/deceleration of the terminal device 201 and a temperature change of the terminal device 201. The sensor component 2017 may include a proximity sensor. The proximity sensor is configured to: when there is no physical contact, detect whether a nearby object exists. The sensor component 2017 may further include an optical sensor, such as a CMOS or CCD image sensor, for use in an imaging application. In some embodiments, the sensor component 2017 may further include an acceleration sensor, a gyro sensor, a magnetic sensor, a pressure sensor, or a temperature sensor.

The communication component 2018 provides wireless communication between the terminal device 201 and the server 202 and/or a user portrait device 203. The terminal device 201 may access a wireless network that is based on a communication standard, for example, Wi-Fi, 2G, 3G, 4G, 5G, or a combination thereof. In an example embodiment, the communication component 2018 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and another technology. It should be understood that, the communication component 2018 may be integrated with a transceiver module to perform a receiving operation or a sending operation of the terminal device 201 in this embodiment of this application.

Figure 4:
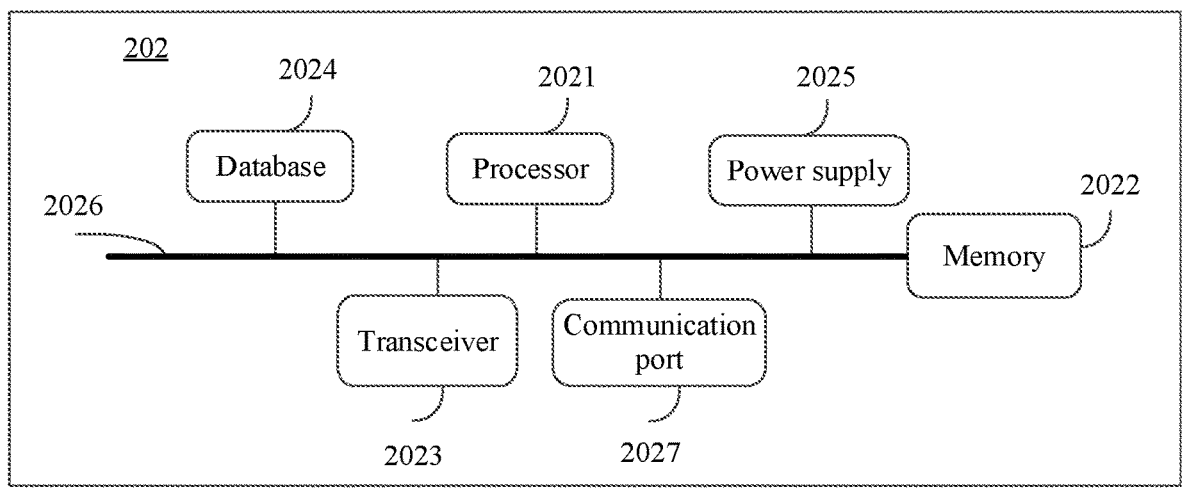
FIG. 4 is a schematic diagram of a structure of a server according to an embodiment of this application.

FIG. 4 is a schematic diagram of a structure of a server according to an embodiment of this application. It should be understood that, the server 202 in this embodiment of this application may be an application server. As shown in FIG. 4, the server 202 may include a processor 2021 (for example, a CPU), a memory 2022, a transceiver 2023, and a database 2024. The memory 2022 may include a high-speed random-access memory (random-access memory, RAM), or may further include a non-volatile memory (non-volatile memory, NVM), for example, at least one disk memory. The memory 2022 may store various instructions. The processor 2021 invokes the instructions in the memory 2022 to complete various processing functions and implement a processing operation performed by the server in this embodiment of this application. It should be understood that, the database 2024 in the server 202 is configured to store reading data of a user, preference data of the user, and the like that are sent by a terminal device.

Optionally, the server 202 in this application may further include a power supply 2025, a communication bus 2026, and a communication port 2027. The communication bus 2026 is configured to implement a communication connection between elements. The communication port 2027 is configured to implement connections and communication between the server 202 and other devices such as the terminal device 201 and the user portrait device 203. The transceiver 2023 is configured to perform a receiving operation or a sending operation of the server 202 in this embodiment of this application.

Figure 5:
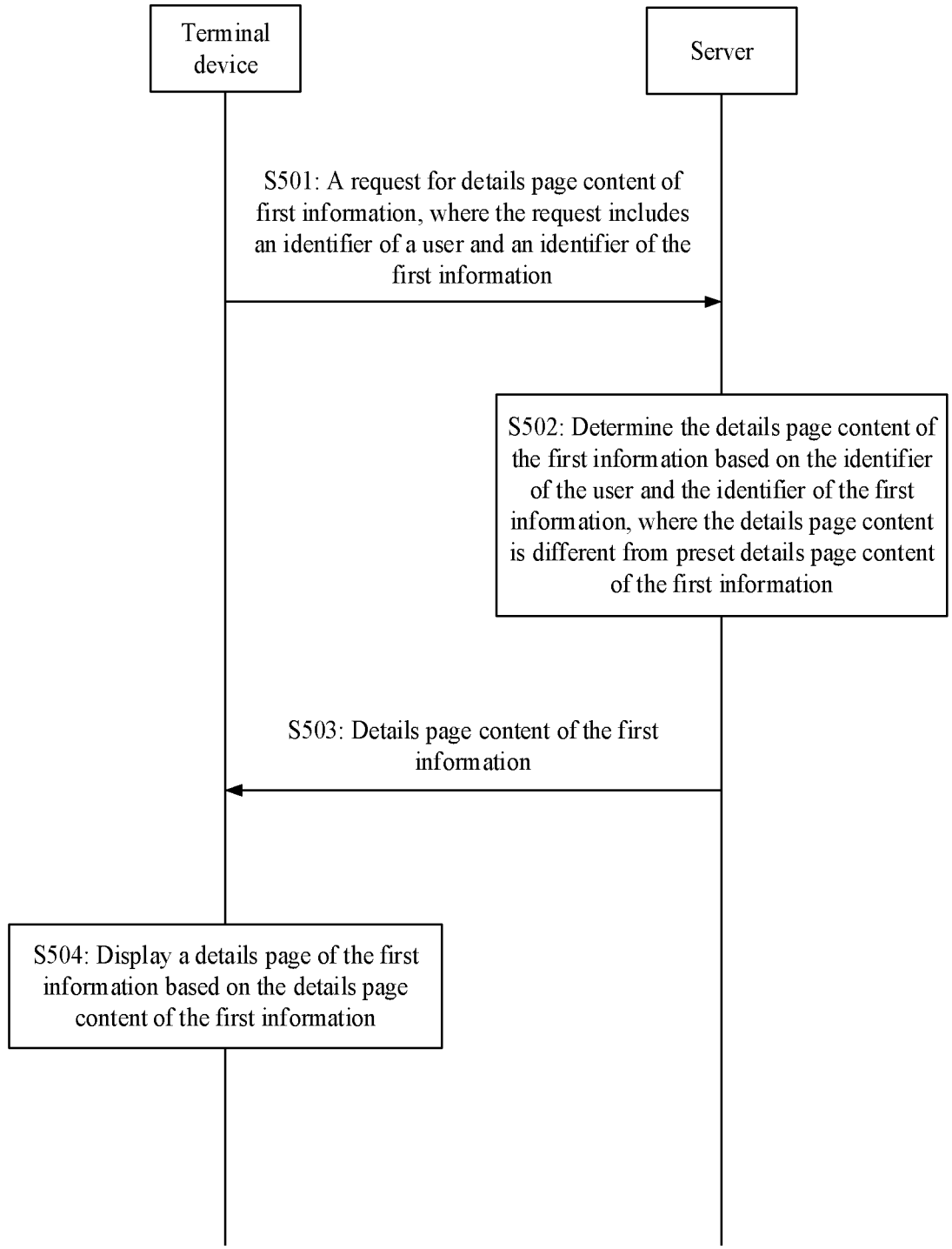
FIG. 5 is a schematic flowchart of a details page processing method in Embodiment 1 according to an embodiment of this application.

With reference to FIG. 5, the details page processing method provided in embodiments of this application is described below from a perspective of interaction between a terminal device and a server. The following several embodiments may be combined with each other, and a same or similar concept or process may not be described repeatedly in some embodiments. FIG. 5 is a schematic flowchart of a details page processing method in Embodiment 1 according to an embodiment of this application. As shown in FIG. 5, the details page processing method provided in this embodiment of this application may include the following steps:

S501: A terminal device sends, to a server, a request for obtaining details page content of first information, where the request includes an identifier of a user and an identifier of the first information.

S502: The server determines the details page content of the first information based on the identifier of the user and the identifier of the first information, where the details page content is different from preset details page content of the first information.

S503: The server sends the details page content of the first information to the terminal device.

S504: The terminal device displays a details page of the first information based on the details page content of the first information.

In S501, when receiving the request input by the user for the details page content of the first information, the terminal device sends the request for the details page content of the first information to the terminal device. For example, the terminal device is a mobile phone. As shown in FIG. 1A to FIG. 1C, a manner in which the user inputs the request may be that the user touches information displayed by the mobile phone or the user inputs a name of information in a voice manner. In this embodiment, the manner in which the user inputs the information request is not limited. For different terminal devices, the user may use different manners to request information. For example, in FIG. 1A to FIG. 1C, the first information is the information "Poetry Program was launched on March 20" displayed on the interface 101, and touching the information by the user means that the user inputs, to the terminal device, the request for obtaining the details page content of the first information.

The request includes the identifier of the user and the identifier of the first information. The identifier of the user may be a unique identification mark for identifying a user identity, for example, a user account, a user name, a mobile phone number of the user, or an identification code of the terminal device. The identifier of the first information may be a unique identification mark for identifying information, for example, a title of the first information or a serial number of the first information.

In S502, in this embodiment of this application, the details page content that is of the first information and that is determined by the server is different from the preset details page content of the first information. The preset details page content of the first information includes preset subject areas arranged in a preset order. It should be understood that, the preset subject areas are subject areas included on a details page of information when the user requests the information for the first time, or subject areas included on a default details page in the server. For example, the subject areas are subject areas a to g on the interface 102 in FIG. 1A to FIG. 1C. The preset order is an order of the preset subject areas on the details page of the information when the user requests the information for the first time, or an order of the default preset subject areas in the server. For example, an order of the preset subject areas shown in FIG. 1A to FIG. 1C is a, b, c, d, e, f, and g. Correspondingly, the preset details page content of the first information may be shown on the foregoing interface 102.

In this embodiment of this application, that the details page content of the first information is different from the preset details page content of the first information means: The details page content of the first information does not include a first subject area in the preset subject areas, or the details page content of the first information includes the preset subject areas but a first subject area in the preset subject areas is ranked lower than in the preset order.

It should be understood that, the first subject area is a subject area that is not preferred by the user. The user may perform settings on the first subject area in advance, and then the server may determine the first subject area based on the identifier of the user after receiving the foregoing request. Correspondingly, the server may obtain content of preset subject areas on the details page of the first information based on the identifier of the first information, and further determine that the details page content of the first information is content in a subject area other than the first subject area. Alternatively, the server determines that the details page content of the first information is content in the preset subject areas, but the first subject area is ranked lower than in the preset order. The first subject area may be ranked lowest in order in the preset subject areas.

Herein, a form of displaying the details page of the first information by the terminal device is used to represent that the details page content of the first information in this embodiment of this application is different from the preset details page content of the first information. For the first case, that is, the case that the details page content of the first information does not include the first subject area in the preset subject areas, first subject areas corresponding to different users may be different. For example, the preset subject areas are a to g, the preset order of the preset subject areas is also a to g, first subject areas of a user 1 are e, f, and g, and first subject areas of a user 2 are d, e, and g. To represent that the details page content of the first information in this application is different from preset details page content of the first information in the conventional technology, in FIG. 6A, FIG. 6B, FIG. 7A, and FIG. 7B, a case in which the first information is "Poetry Program was launched on March 20" is used for description below.

Figure 6A:
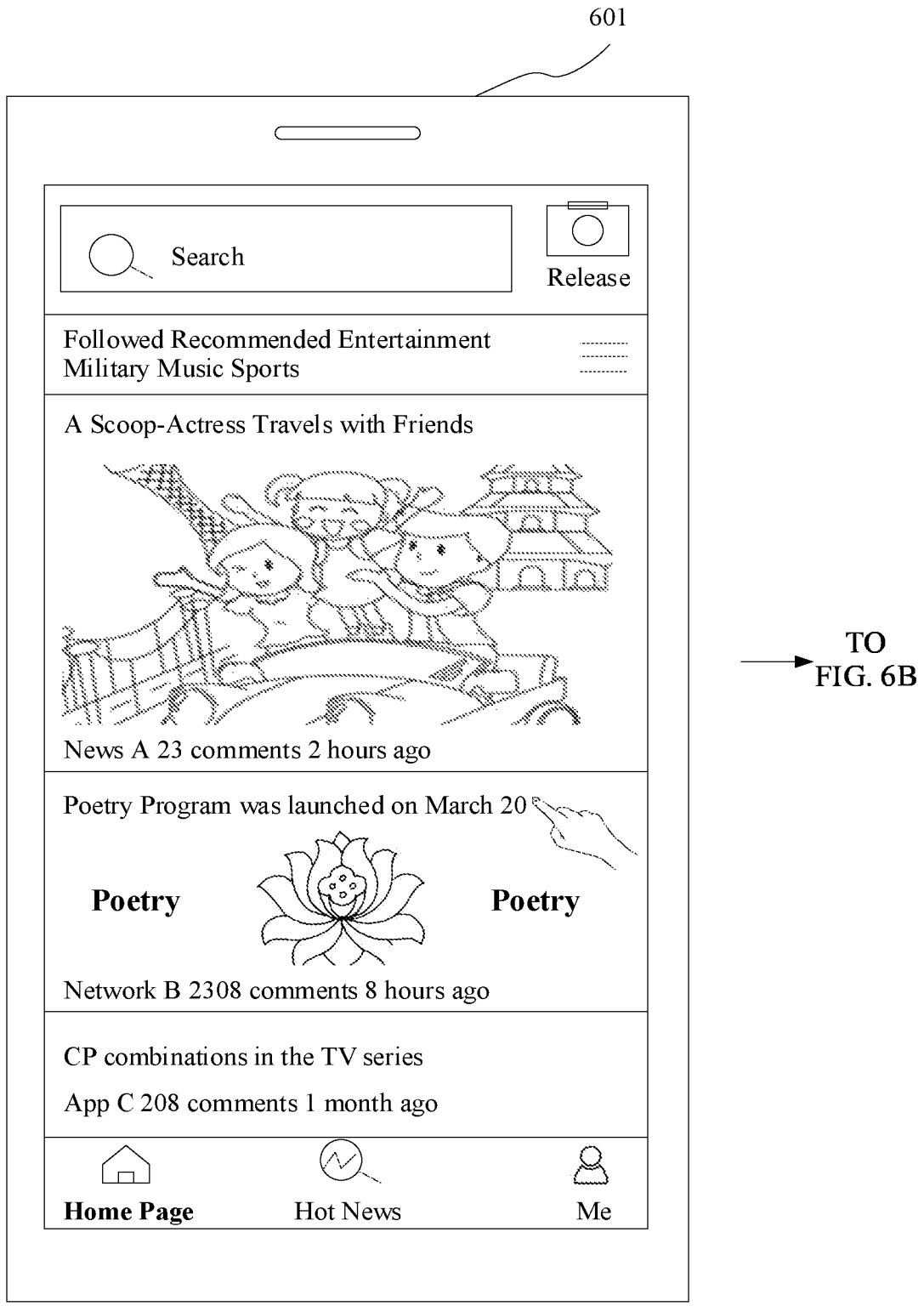
FIG. 6A and FIG. 6B are a schematic diagram 1 of an interface change of a terminal device according to an embodiment of this application.
Figure 6B:
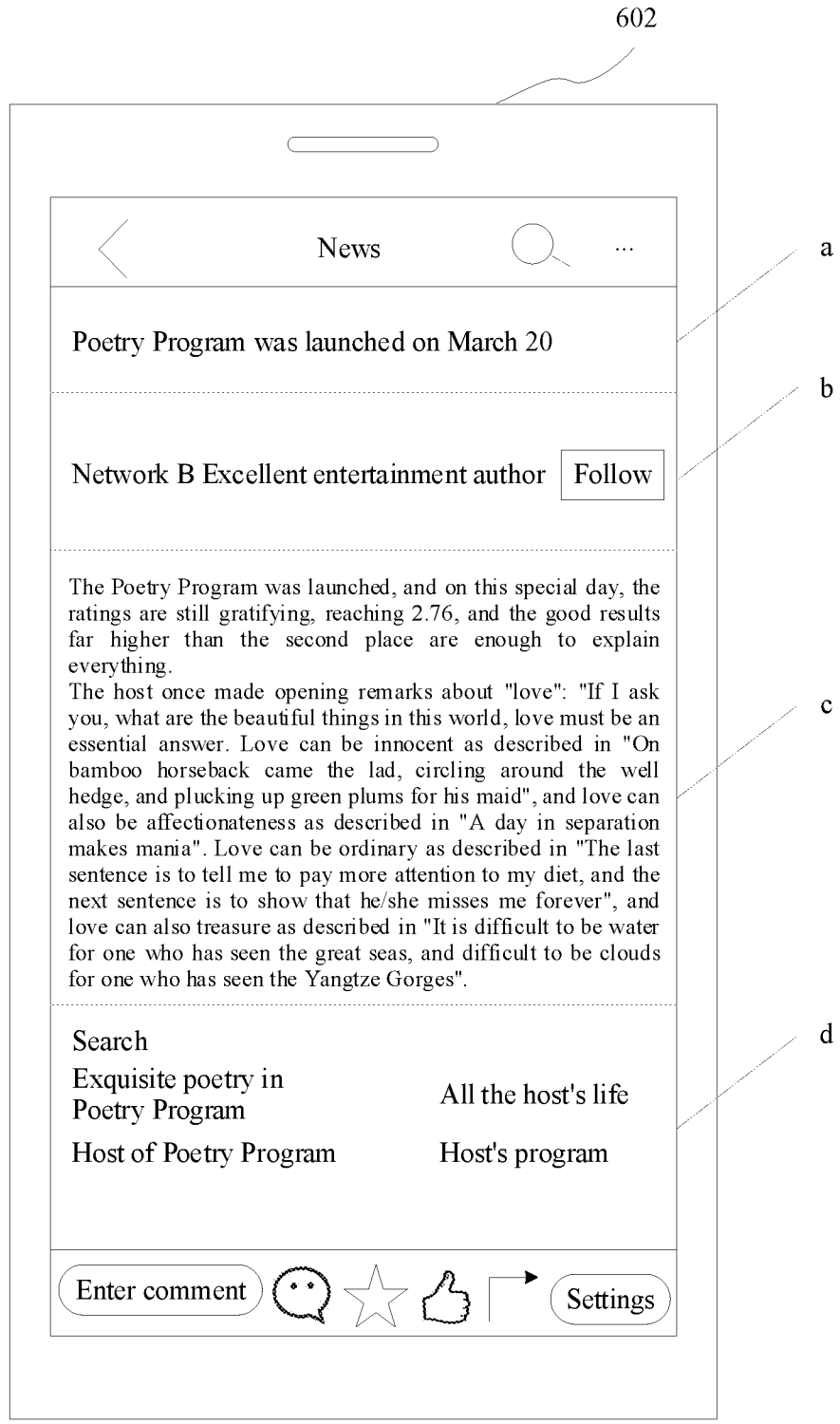

FIG. 6A and FIG. 6B are a schematic diagram 1 of an interface change of a terminal device according to an embodiment of this application. As shown in FIG. 6A and FIG. 6B, an interface 601 is the same as the interface 101 in FIG. 1A to FIG. 1C. When the user 1 touches the information "Poetry Program was launched on March 20", the interface 601 jumps to an interface 602. A details page that is of the first information and that is displayed on the interface 602 includes the subject areas a, b, c, and d.

Figure 7A:
FIG. 7A and FIG. 7B are a schematic diagram 2 of an interface change of a terminal device according to an embodiment of this application.
Figure 7B:
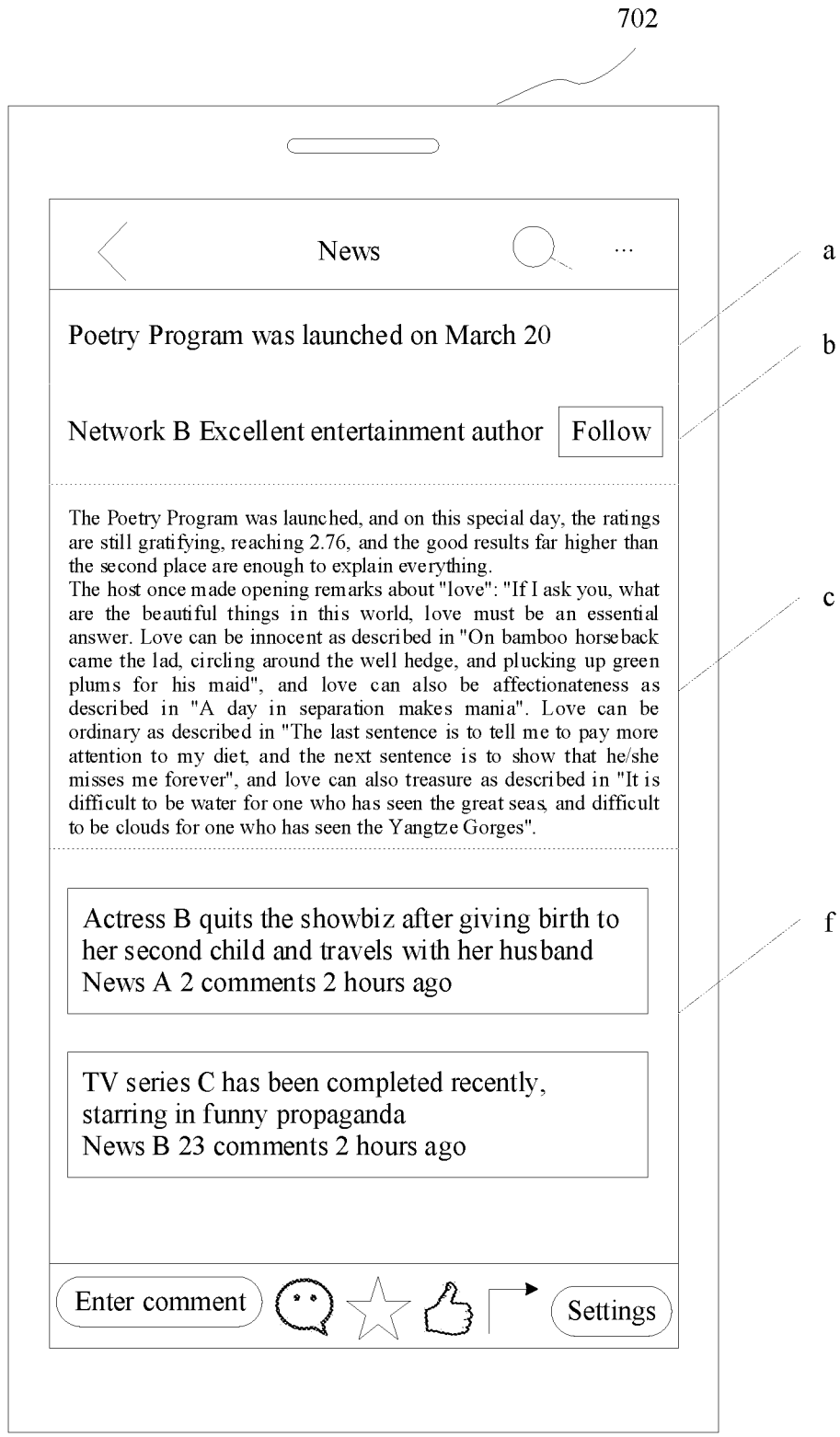

FIG. 7A and FIG. 7B are a schematic diagram 2 of an interface change of a terminal device according to an embodiment of this application. An interface 701 is the same as the interface 101 in FIG. 1A to FIG. 1C. When the user 2 touches the information "Poetry Program was launched on March 20", the interface 701 jumps to an interface 702. A details page that is of the first information and that is displayed on the interface 702 includes the subject areas a, b, c, and f.

For the second case, the details page content of the first information is content in the preset subject areas, but the first subject area is ranked lower than in the preset order. Similarly, first subject areas corresponding to different users are ranked differently in order. For example, the preset subject areas are a to g, the preset order of the preset subject areas is also a to g, a first subject area of the user 1 is e, and first subject areas of the user 2 are d and e. To represent that the details page content of the first information in this application is different from preset details page content of the first information in the conventional technology, in FIG. 8A to FIG. 8C and FIG. 9A to FIG. 9C, a case in which the first information is "Poetry Program was launched on March 20" is used for description below.

Figure 8A:
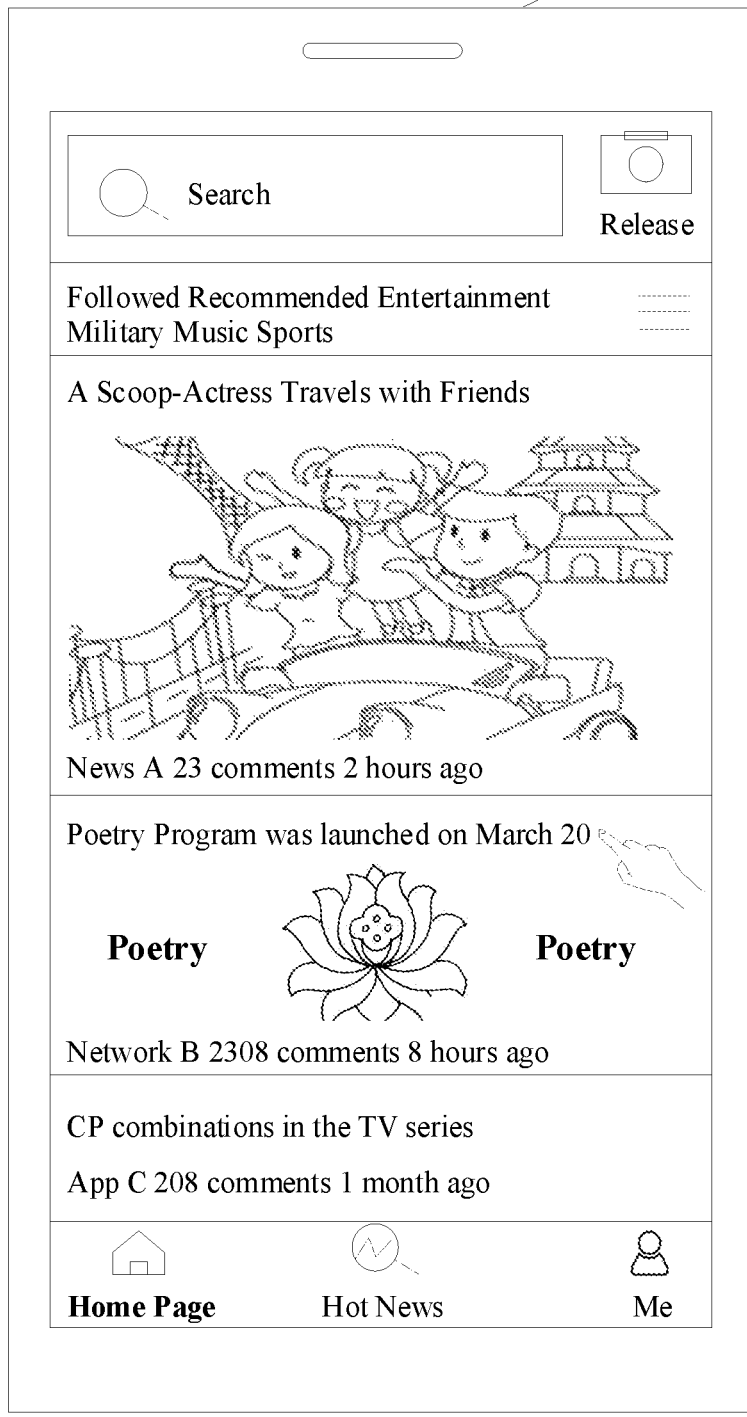
FIG. 8A to FIG. 8C are a schematic diagram 3 of an interface change of a terminal device according to an embodiment of this application.
Figure 8B:
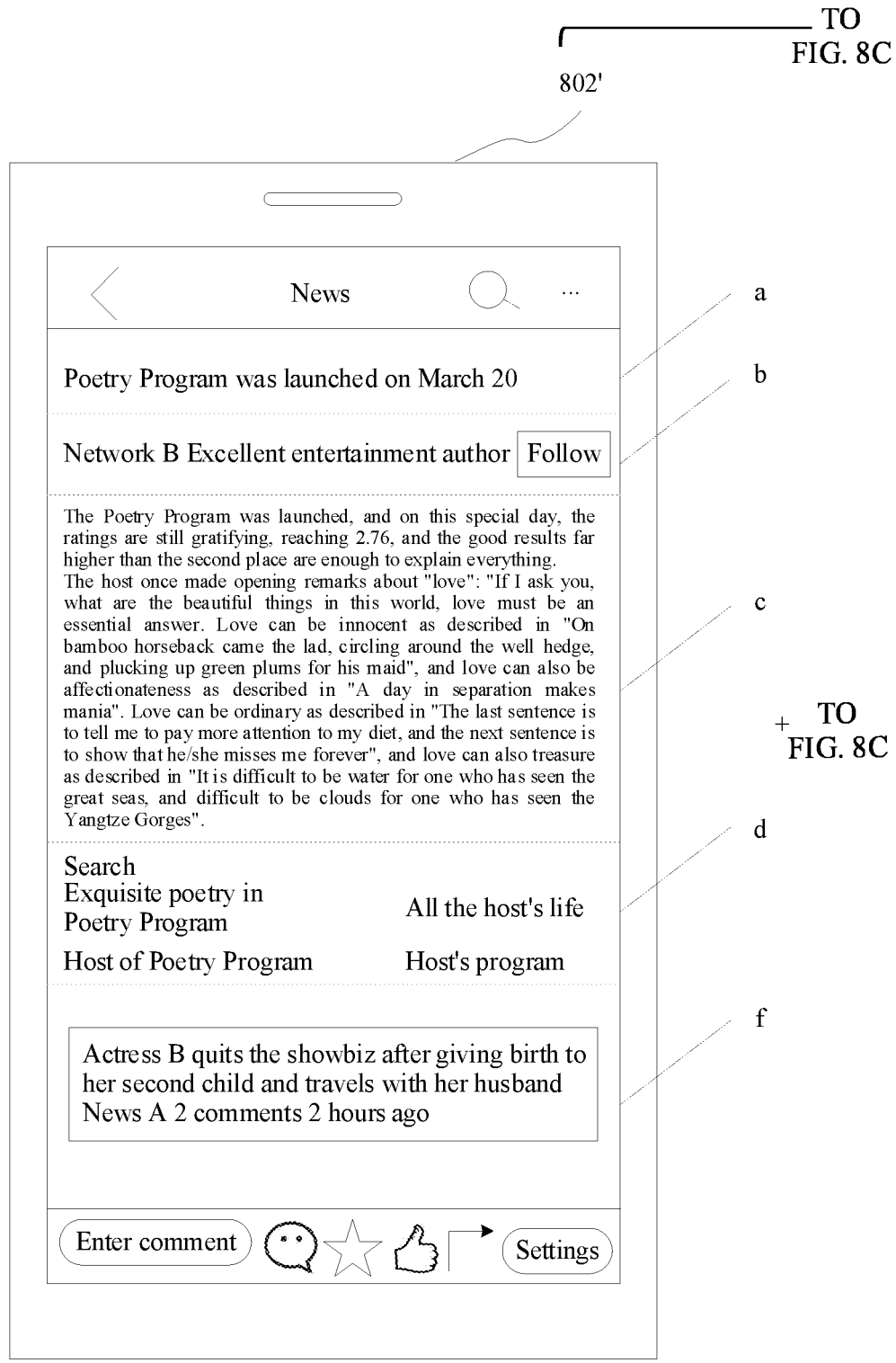
Figure 8C:
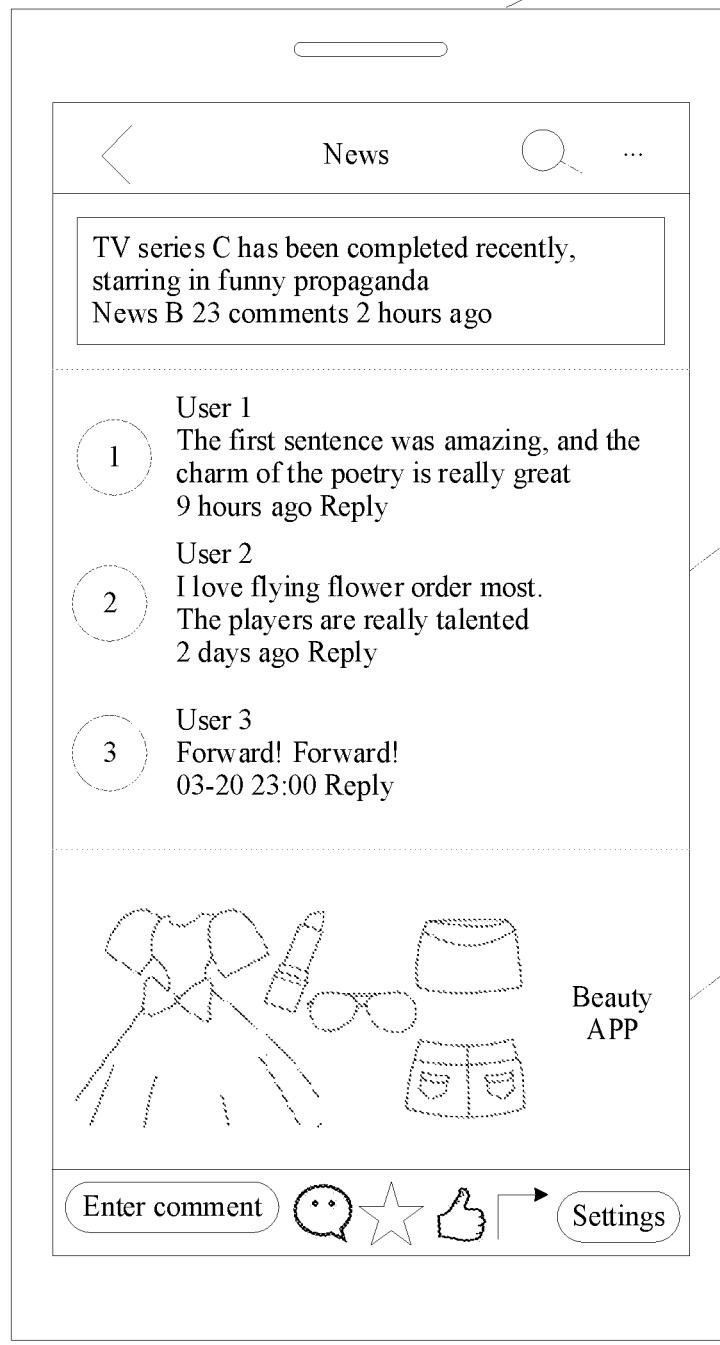

FIG. 8A to FIG. 8C are a schematic diagram 3 of an interface change of a terminal device according to an embodiment of this application. As shown in FIG. 8A to FIG. 8C, an interface 801 is the same as the interface 101 in FIG. 1A to FIG. 1C. When the user 1 touches the information "Poetry Program was launched on March 20", the interface 801 jumps to an interface 802. The interface 802 displays a details page of the first information in an order of preset subject areas: a, b, c, d, f, g, and e. It should be understood that, for ease of description of the interface 802, the interface 802 is divided into interfaces 802' and 802" for description. Accordingly, the subject area e is ranked fifth in the preset order, while the subject area e on the details page of the first information is ranked lower than fifth. For example, the subject area e on the details page of the first information is ranked lowest in the preset subject areas.

Figure 9A:
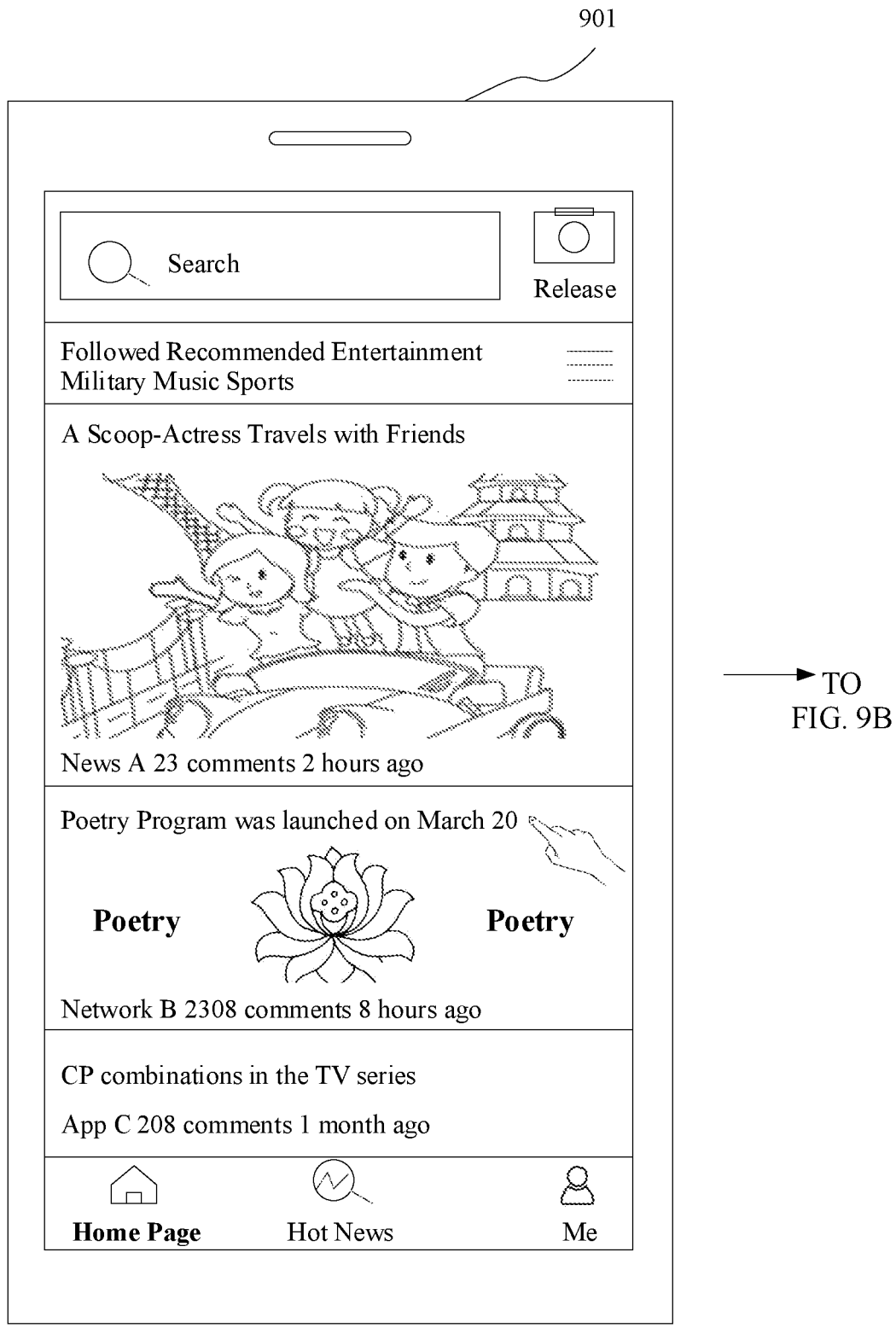
FIG. 9A to FIG. 9C are a schematic diagram 4 of an interface change of a terminal device according to an embodiment of this application.
Figure 9B:
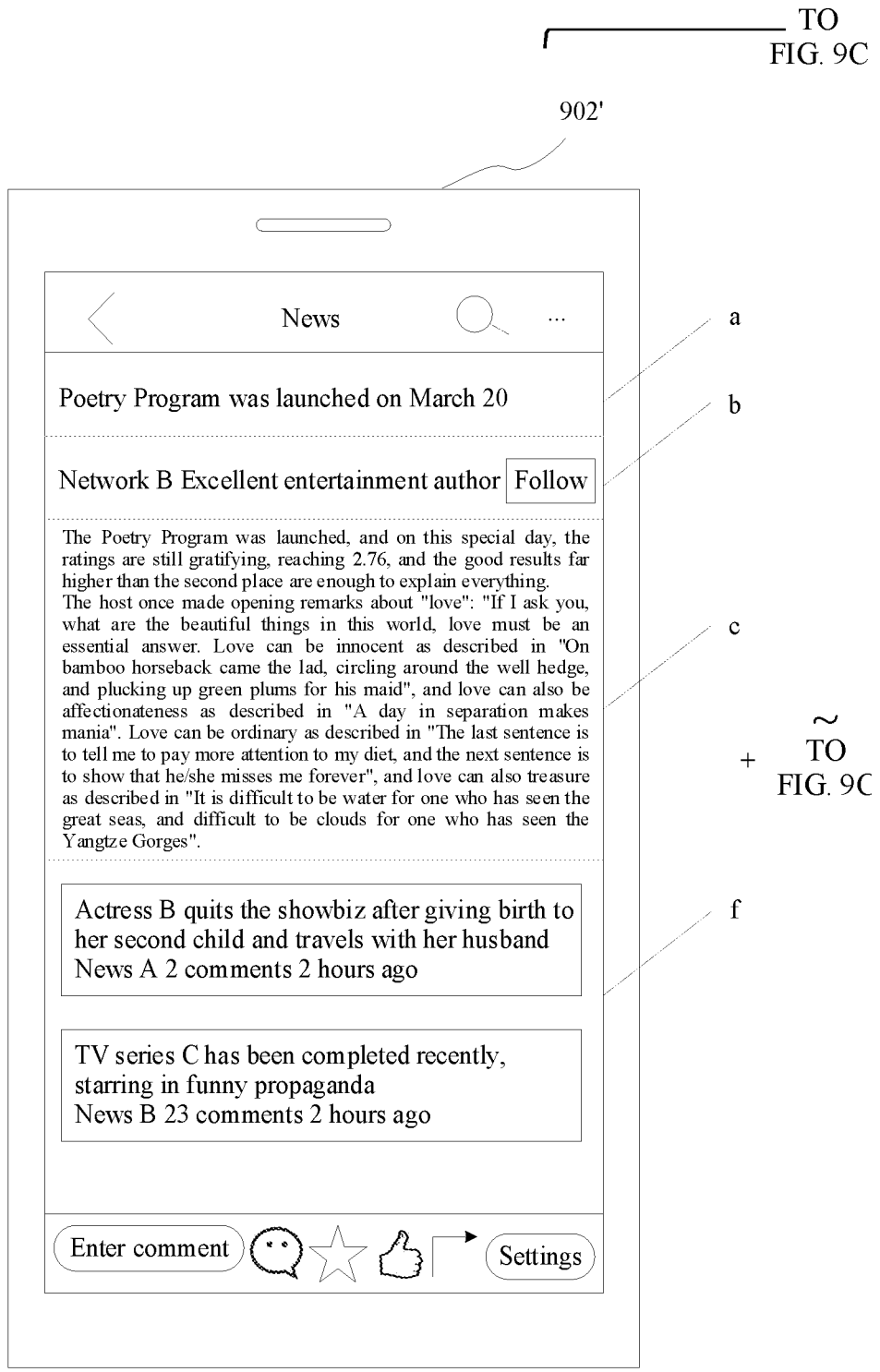
Figure 9C:
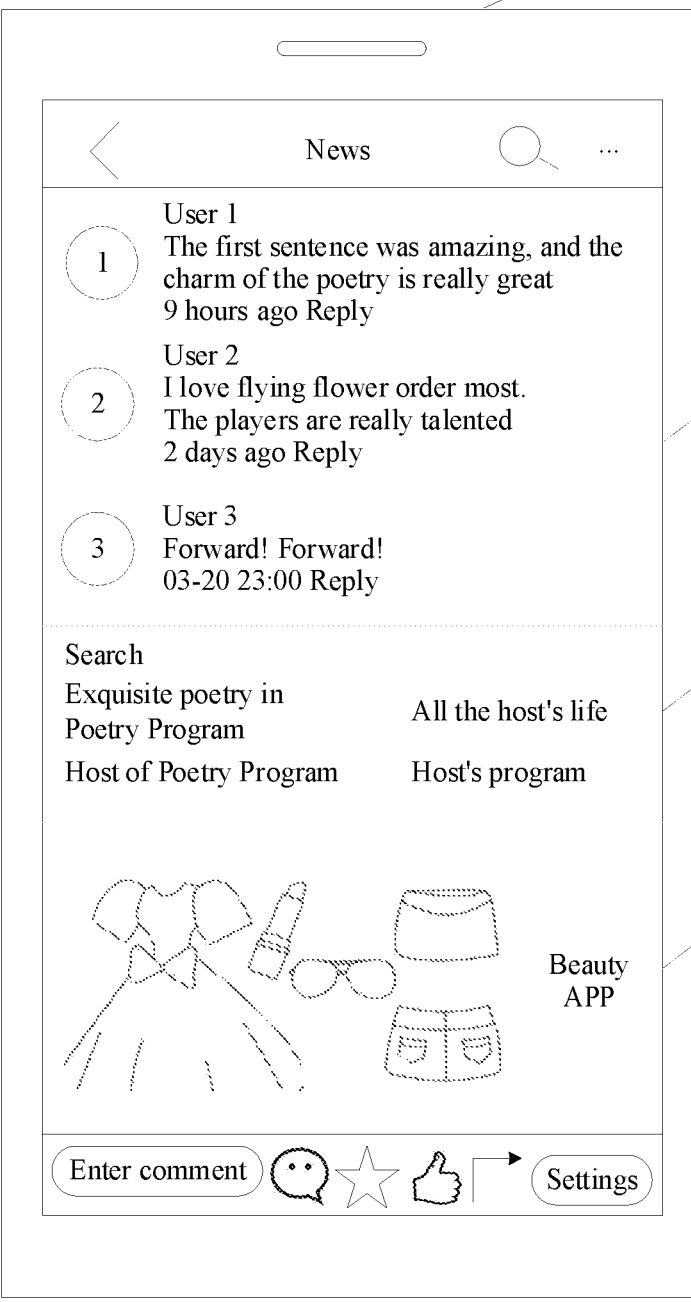

FIG. 9A to FIG. 9C are a schematic diagram 4 of an interface change of a terminal device according to an embodiment of this application. An interface 901 is the same as the interface 91 in FIG. 1A to FIG. 1C. When the user 2 touches the information "Poetry Program was launched on March 20", the interface 901 jumps to an interface 902. The interface 902 displays a details page of the first information in an order of subject areas: a, b, c, f, g, d, and e. It should be understood that, for ease of description of the interface 902, the interface 902 is divided into interfaces 902' and 902" for description. Accordingly, the subject areas d and e are respectively ranked fourth and fifth, while the subject areas d and e on the details page of the first information are ranked lower than in the preset order. For example, the subject areas d and e are ranked lowest in the preset subject areas. It should be understood that, the subject area d on the interface 902 may alternatively be ranked after the subject area e.

In S503, after determining the details page content of the first information, the server may send the details page content of the first information to the terminal device.

In S504, after receiving the details page content of the first information, the terminal device may display the details page of the first information based on the details page content of the first information. Specifically, the details page of the first information displayed by the terminal device may be shown in FIG. 6A and FIG. 6B to FIG. 9A to FIG. 9C.

The details page processing method provided in embodiments of this application includes: The terminal device sends, to the server, a request for obtaining details page content of first information, where the request includes an identifier of a user and an identifier of the first information; the server determines the details page content of the first information based on the identifier of the user and the identifier of the first information, where the details page content is different from preset details page content of the first information, the preset details page content includes preset subject areas arranged in a preset order, and that the details page content is different from preset details page content of the first information specifically includes: the details page content does not include a first subject area in the preset subject areas, or the details page content includes the preset subject areas but a first subject area in the preset subject areas is ranked lower than in the preset order; the server sends the details page content of the first information to the terminal device; and the terminal device displays a details page of the first information based on the details page content of the first information. In embodiments of this application, for different users, details pages suitable for reading by the users can be provided for the users, thereby meeting personalized requirements of the users and improving user experience.

In the foregoing embodiment, a case in which the user may perform settings on the first subject area in advance is described, but the user has different preferences for subject areas on details pages of different categories of information, in other words, first subject areas may be different for different categories of information. For example, for entertainment information, the user may prefer a text area and a comment area of the information, and a first subject area may be an advertisement area. For military information, the user may prefer a text area and an extended reading area of the information, and a first subject area may be a comment area. Therefore, in this embodiment of this application, during determining of the details page content of the first information, a category of the first information may be determined based on the identifier of the first information, and further, information about settings performed by the user on second information whose category is the same as that of the first information is obtained, to obtain a first subject area of the first information of the category. Correspondingly, the server may determine the details page content of the first information based on the identifier of the first information and the settings information. It should be understood that, the information about settings performed by the user on a details page of the second information whose category is the same as that of the first information indicates that the user does not prefer a first subject area, in other words, the settings information indicates that the user has closed the first subject area on the details page of the second information. It should be understood that, that the user has closed the first subject area on the details page of the second information herein means that the user performs an operation on the first subject area. The following may be specified in advance: The terminal device does not display the first subject area or ranks the first subject area lower in order for display.

For example, if the first subject area in the information about settings performed by the user on the details page of the second information whose category is the same as that of the first information is an advertisement area, in the foregoing embodiment, the server determines that the details page content of the first information may not include the advertisement area or that the advertisement area is ranked lower than in the preset order.

Optionally, in this embodiment of this application, the identifier of the first information may be used to represent the category of the first information. For example, the identifier of the first information may be 120011, where the first digit 1 represents that the category of the first information is a literary category, and the digit 2 represents that the first information is a subcategory "prose" of the literary category. 0011 may be used to represent that the first information is information numbered 0011 in the subcategory "prose" of the literary category. It is conceivable that, the identifier of the first information may be represented in another form. This is not limited in this embodiment of this application.

In this embodiment of this application, the user may not proactively perform settings on a first subject area corresponding to information of each category, but the server determines, based on preference data that is of the user and that is corresponding to a subject area on a details page of each category of information (referred to as the preference data of the user or the preference data below), a subject area that is on the details page of each category of information and that is preferred by the user and a subject area that is not preferred by the user, to proactively recommend, to the user, a closing control that can be used for closing the non-preferred subject area, that is, the first subject area. This helps the user perform settings on the first subject area. It should be noted that, for a manner in which the server determines the first subject area based on the preference data of the user and settings performed by the user on the details page of the second information, refer to the following related description in FIG. 11

Because the preference data of the user is used in the following related description in FIG. 11, the preference data of the user is first described herein. In this embodiment of this application, the server may obtain, based on the identifier of the user, preference data that is of the user and that is corresponding to each subject area in preset subject areas on a details page of information of a category to which the first information belongs. In this embodiment of this application, the server may obtain, in the following two possible implementations, the preference data that is of the user and that is corresponding to each subject area in the preset subject areas on the details page of the information of the category to which the first information belongs.

In a possible implementation, the server stores user portrait information, and the user portrait information includes the identifier of the user and preference data that is corresponding to the identifier of the user and that is corresponding to each subject area in preset subject areas on a details page of each category of information. Optionally, the user in the user portrait information is a user using an application to read information. Correspondingly, the server may determine the preference data of the user based on the identifier of the user, the category to which the first information belongs, and the user portrait information. It should be understood that, the preference data of the user is preference data that is corresponding to each subject area in preset subject areas on a details page of information and that is corresponding to a user identifier that is in the user portrait information and that is the same as the identifier of the user in the request for the details page content request of the first information. The user portrait information is obtained by a user portrait device, and the user portrait device may send the obtained user portrait information to the server.

In a possible implementation, the server may obtain user portrait information, that is, an identifier of a user, and preference data that is corresponding to the identifier of the user and that is corresponding to each subject area in preset subject areas on a details page of each category of information.

It should be understood that, in the foregoing two possible implementations, regardless of whether the user portrait device obtains the user portrait information or the server obtains the user portrait information, the user portrait information is obtained based on reading data of the user. In a process in which the user previously reads information, the reading data of the user is collected, and the reading data of the user is sent to the user portrait device and the server. For a specific process in which the user portrait device and the server obtain the preference data of the user based on the reading data of the user, refer to the following related description in FIG. 10.

Figure 10:
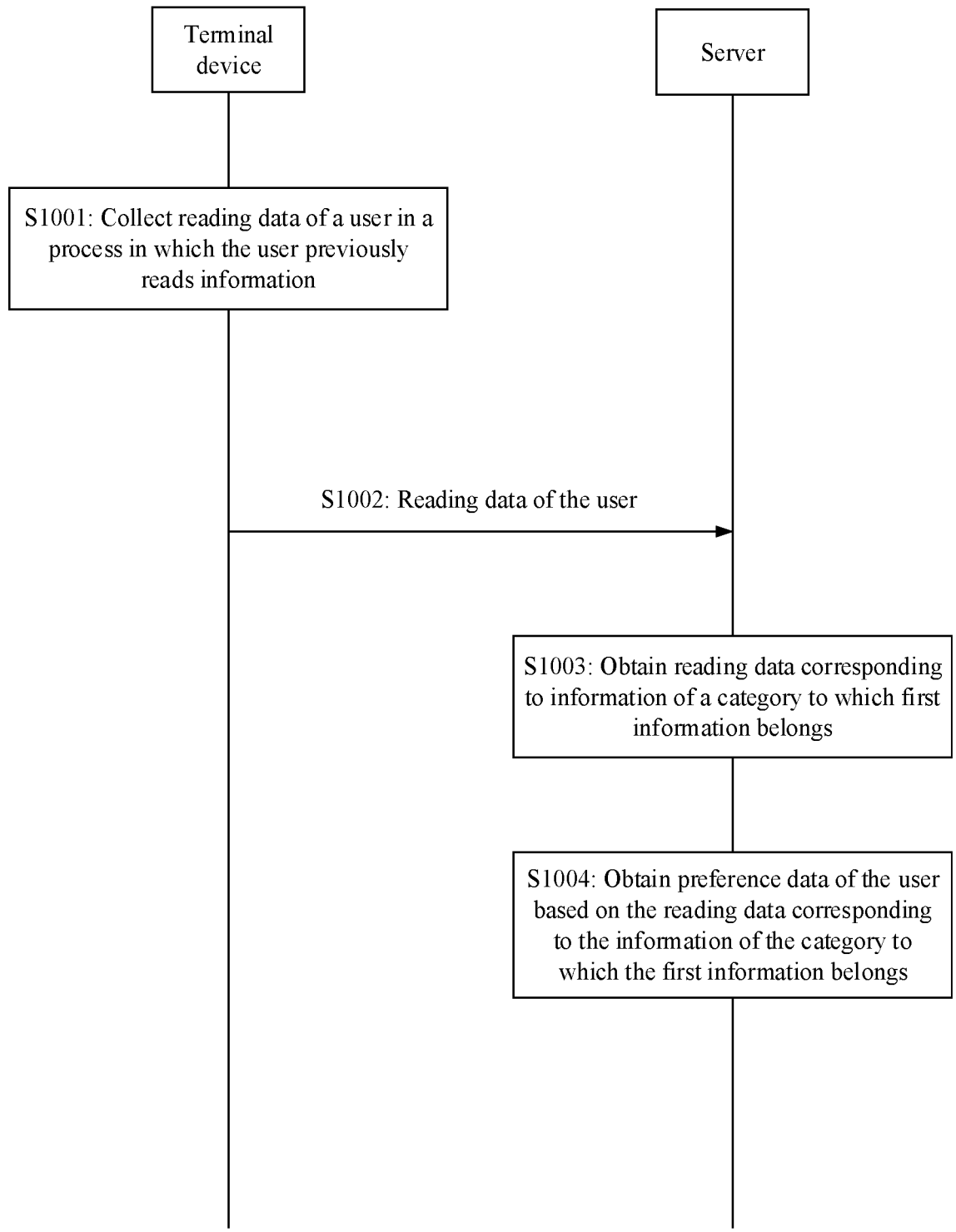
FIG. 10 is a schematic flowchart of obtaining preference data of a user according to an embodiment of this application.

FIG. 10 is a schematic flowchart of obtaining preference data of a user according to an embodiment of this application. As shown in FIG. 10, in this embodiment of this application, the obtaining preference data of a user may include the following steps.

S1001: A terminal device collects reading data of the user in a process in which the user previously reads information.

S1002: The terminal device sends the reading data of the user to a server.

S1003: The server obtains reading data corresponding to information of a category to which first information belongs.

S1004: The server obtains preference data of the user based on the reading data corresponding to the information of the category to which the first information belongs.

In S1001, the terminal device may collect the reading data of the user in the process in which the user previously reads the information. The reading data of the user in this embodiment of this application may include the category of the information, reading duration of the information, and reading duration corresponding to each subject area in preset subject areas on a details page of the information. Optionally, the reading data of the user may further include clicking data and exposure data corresponding to each subject area in the preset subject areas on the details page of the information. The category of the information may be a category of the information previously read by the user, the reading duration of the information is total duration of one piece of information previously read by the user, and the reading duration corresponding to each subject area in the preset subject areas on the details page of the information is reading duration corresponding to each subject area, for example, reading duration corresponding to a text area and reading duration corresponding to an advertisement area. The clicking data indicates whether each subject area is selected by the user. For example, the clicking data may include: The subject area is selected or not selected. The exposure data indicates whether each subject area is displayed on an interface of the terminal device, and may include: The subject area is exposed or not exposed. It should be understood that, exposure may also specifically refer to that an area of more than 50% (example) of each subject area is displayed on an interface of the terminal device. Table 1 below lists reading data reported by the terminal device for a case that the user reads information at a time.

TABLE 1

Reading data

| Parameter category | Parameter description | Parameter value (example) |
|---|---|---|
| User ID | User identifier | 1001 |
| Doc ID | Information identifier | 120011 |
| Doc Class | Information category | Class 1-literature; and class 2-prose |
| Read Time | Information reading duration | 50 s |
| Module 1 Exposure | Whether a module 1 is exposed | Y |
| Module 1 Read Time | Reading duration corresponding to the module 1 | 10 s |
| Module 1 Click | Whether the module 1 is touched | Y |
| Module 2 Exposure | Whether a module 2 is exposed | Y |
| Module 2 Read Time | Reading duration corresponding to the module 2 | 20 s |
| Module 2 Click | Whether the module 2 is touched | Y |
| Module 3 Exposure | Whether a module 3 is exposed | Y |
| Module 3 Read Time | Reading duration corresponding to the module 3 | 1 s |
| Module 3 Click | Whether the module 3 is touched | N |
| Module 4 Exposure | Whether a module 4 is exposed | N |
| Module 4 Read Time | Reading duration corresponding to the module 4 | 0 s |
| Module 4 Click | Whether the module 4 is touched | N |

As listed in Table 1, Y represents "yes", and N represents "no". The module in Table 1 refers to a subject area in this embodiment of this application. It should be understood that, when the reading data of the user may include a category of the information, reading duration of the information, and reading duration corresponding to each subject area in preset subject areas on a details page of the information, the reading information of the user in Table 1 does not include clicking data and exposure data that are corresponding to each subject area in the preset subject areas on the details page of the information.

In S1002, as listed in Table 1, the terminal device may send, to the server, reading data obtained when the user reads information each time, so that the server can receive the reading data of the user. It should be understood that, the reading data of the user may include reading data obtained when the user reads information for a plurality of times, and the reading data may include reading data corresponding to a plurality of categories of information.

In S1003, because preference data that is of the user and that is corresponding to subject areas in preset subject areas on details pages of different categories of information may be different, in this embodiment of this application, the reading data corresponding to the information of the category to which the first information belongs may be obtained based on the information category from the reading data of the user reported by the terminal device. It should be understood that, in this embodiment of this application, manners of obtaining preference data corresponding to all categories of information are the same. Obtaining preference data corresponding to the information of the category to which the first information belongs is used as an example for description below.

In S1004, because the reading data corresponding to the information of the category to which the first information belongs includes reading data obtained when the user reads the information of the category to which the first information belongs for a plurality of times, the preference data of the user in this embodiment of this application includes a preference value that is of the user and that is corresponding to each subject area in the preset subject areas when the user reads the information of the category to which the first information belongs for a plurality of times. Therefore, herein, the following is described: A preference value that is of the user and that is corresponding to each subject area in the preset subject areas each time the user reads the information of the category to which the first information belongs is obtained based on reading data obtained each time the user reads information.

A reading duration proportion corresponding to each subject area is determined from the reading data obtained each time the user reads the information of the category to which the first information belongs. For example, as listed in Table 1, reading duration corresponding to a subject area 1 is 10 s, and a reading duration proportion corresponding to the subject area 1 is 20%; reading duration corresponding to a subject area 2 is 20 s, and a reading duration proportion corresponding to the subject area 2 is 40%; reading duration corresponding to a subject area 3 is 1 s, and a reading duration proportion corresponding to the subject area 3 is 2%; and reading duration corresponding to a subject area 4 is 0 s, and a reading duration proportion corresponding to the subject area 4 is 0%.

In this embodiment of this application, a weight of a reading duration proportion, a weight of clicking data, and a weight of exposure data are preset, and then a preference value that is of the user and that is corresponding to each subject area in the preset subject areas each time the user reads information is obtained based on a reading duration proportion, clicking data, and exposure data that are corresponding to each subject area, the preset weight of the reading duration proportion, the preset weight of the clicking data, and the preset weight of the exposure data. For example, the weight of the reading duration proportion is 0.5, the weight of the clicking data is 0.25, and the weight of the exposure data is 0.25. When the clicking data or the exposure data is "Y", a value corresponding to the clicking data or the exposure data may be 1; and when the clicking data or the exposure data is "N", a value corresponding to the clicking data or the exposure data may be 0. Correspondingly, a sum of a first product of the reading duration proportion corresponding to each subject area and the preset weight of the reading duration proportion, a second product of the clicking data and the preset weight of the clicking data, and a third product of the exposure data and the preset weight of the exposure data may be used as a preference value corresponding to the subject area.

For example, Table 2 below lists preference value results of the user that are corresponding to all subject areas in the preset subject areas when the user reads information at a time.

TABLE 2

| Parameter category | Parameter description | Parameter value (example) |
|---|---|---|
| User ID | User identifier | 1001 |
| Doc Class | Information category | Class 1-literature; and class 2-prose |

TABLE 2-continued

| Parameter category | Parameter description | Parameter value (example) |
|---|---|---|
| Preferred Modules | Preference values corresponding to modules | Module 1 (text): 0.9<br>Module 2 (related recommendation): 0.7<br>Module 3 (comment): 0.1<br>Module 4 (extending reading): 0 |

It should be understood that, the server may obtain the preference value that is of the user and that is corresponding to each subject area in the preset subject areas each time the user reads information, and then store the preference value as the preference data of the user. It should be understood that, an example is used above to describe a case in which the reading data of the user may include the category of the information, the reading duration of the information, and the reading duration, the clicking data, and the exposure data corresponding to each subject area in the preset subject areas on the details page of the information. When the reading data of the user may include the category of the information, the reading duration of the information, and the reading duration corresponding to each subject area in the preset subject areas on the details page of the information, in this embodiment of this application, the preference value that is of the user and that is corresponding to each subject area in the preset subject areas each time the user reads the information may be obtained based on the reading duration proportion corresponding to each subject area and the preset weight of the reading duration proportion.

It should be understood that, an example in which the terminal device determines the preference data of the user based on the reading data of the user is used for description in FIG. 10. It is conceivable that, in this embodiment of this application, if the user portrait device determines the preference data of the user based on the reading data of the user, S1002 may be replaced as follows: The terminal device sends the reading data of the user to the user portrait device. Correspondingly, S1003 may be replaced as follows: The user portrait device obtains the preference data of the user based on the reading data corresponding to the information of the category to which the first information belongs.

Figure 11:
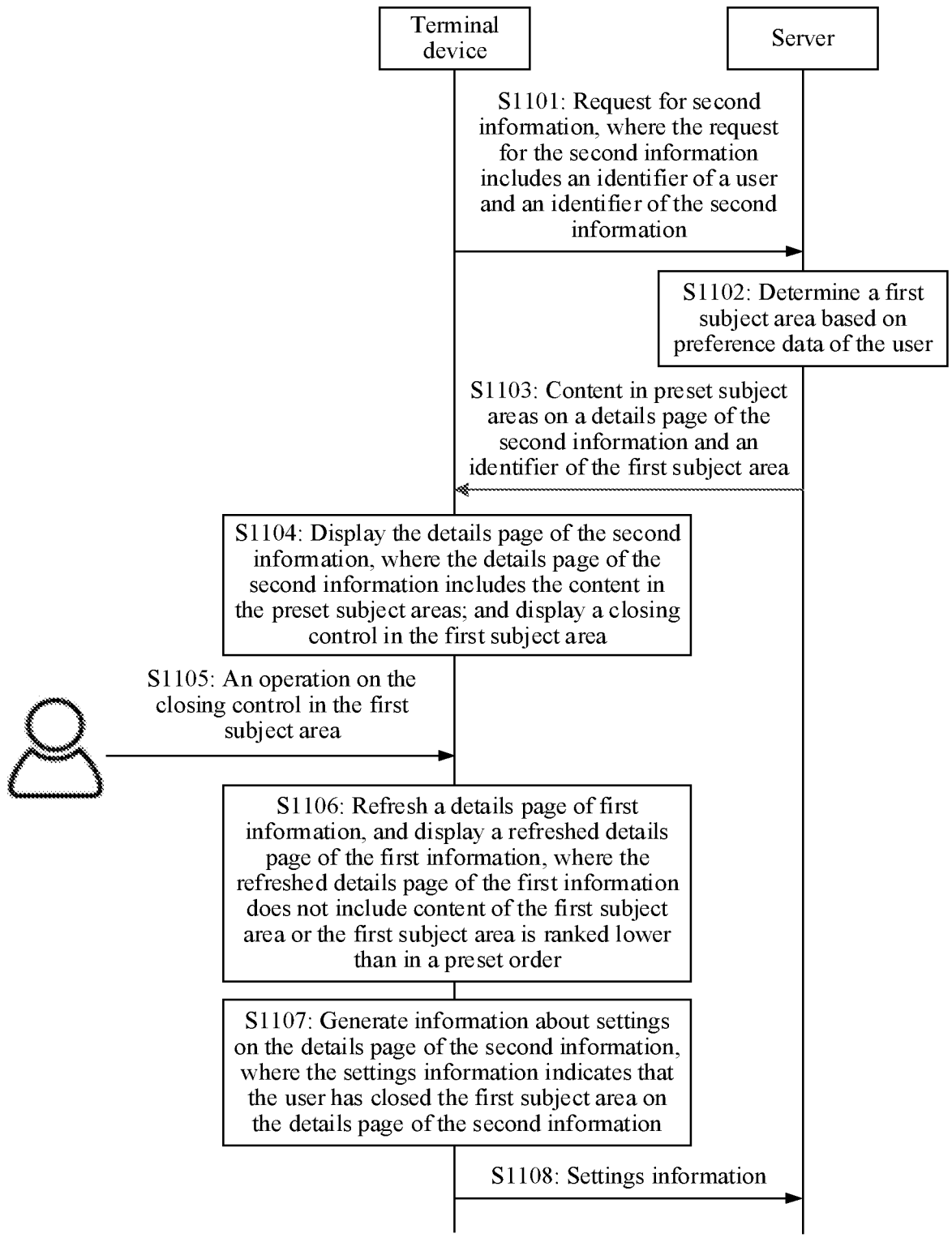
FIG. 11 is a schematic flowchart of a details page processing method in Embodiment 2 according to an embodiment of this application.
Figure 12A:
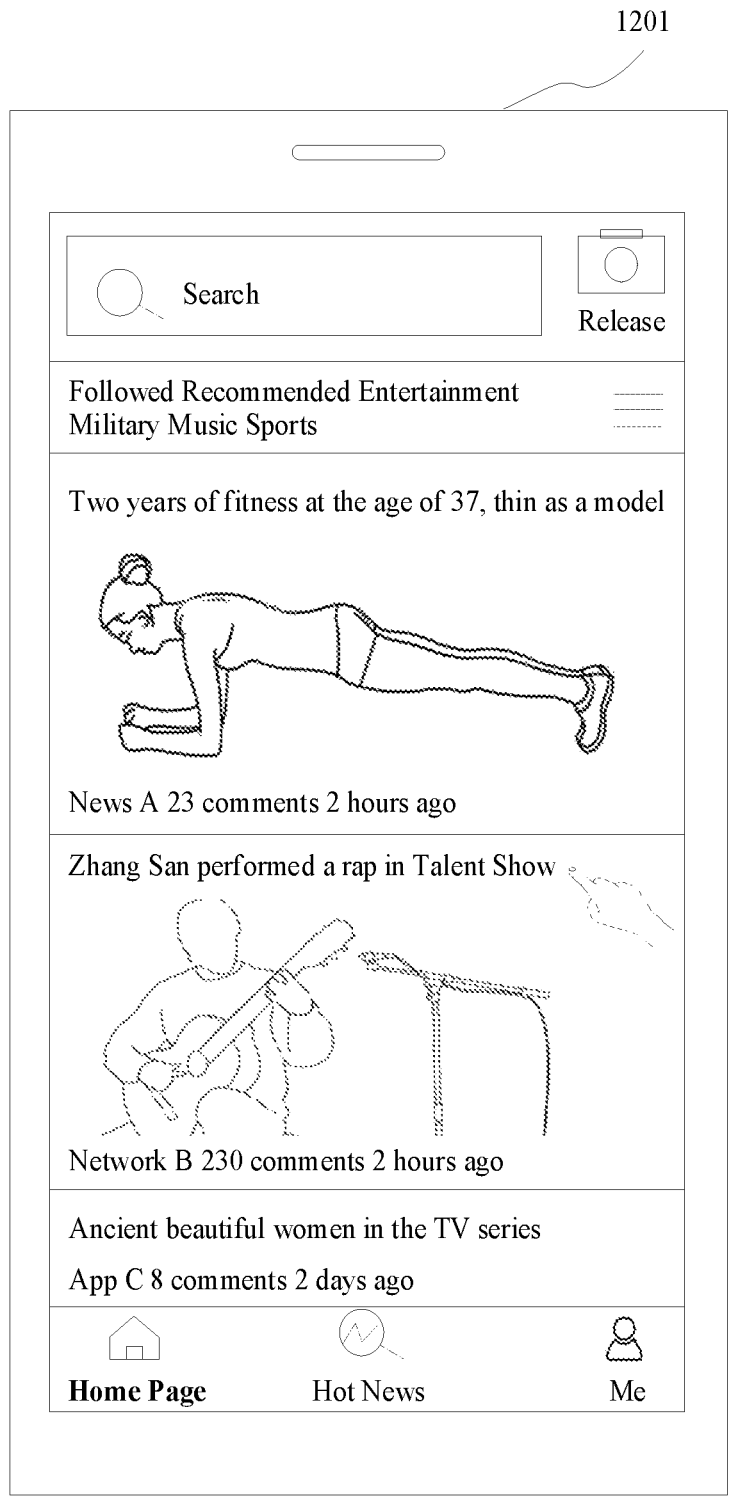
Figure 12C:
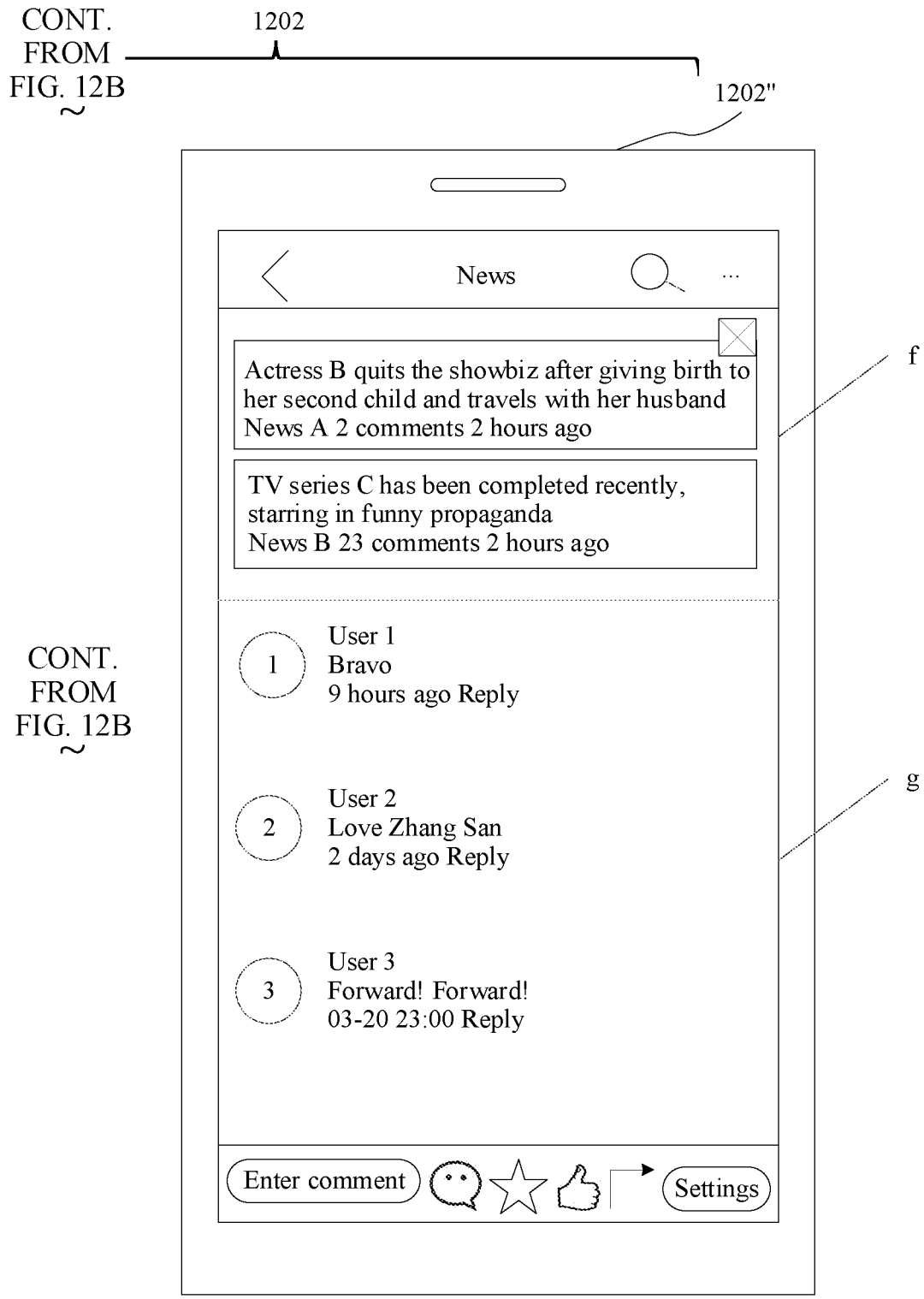
Figure 12D:
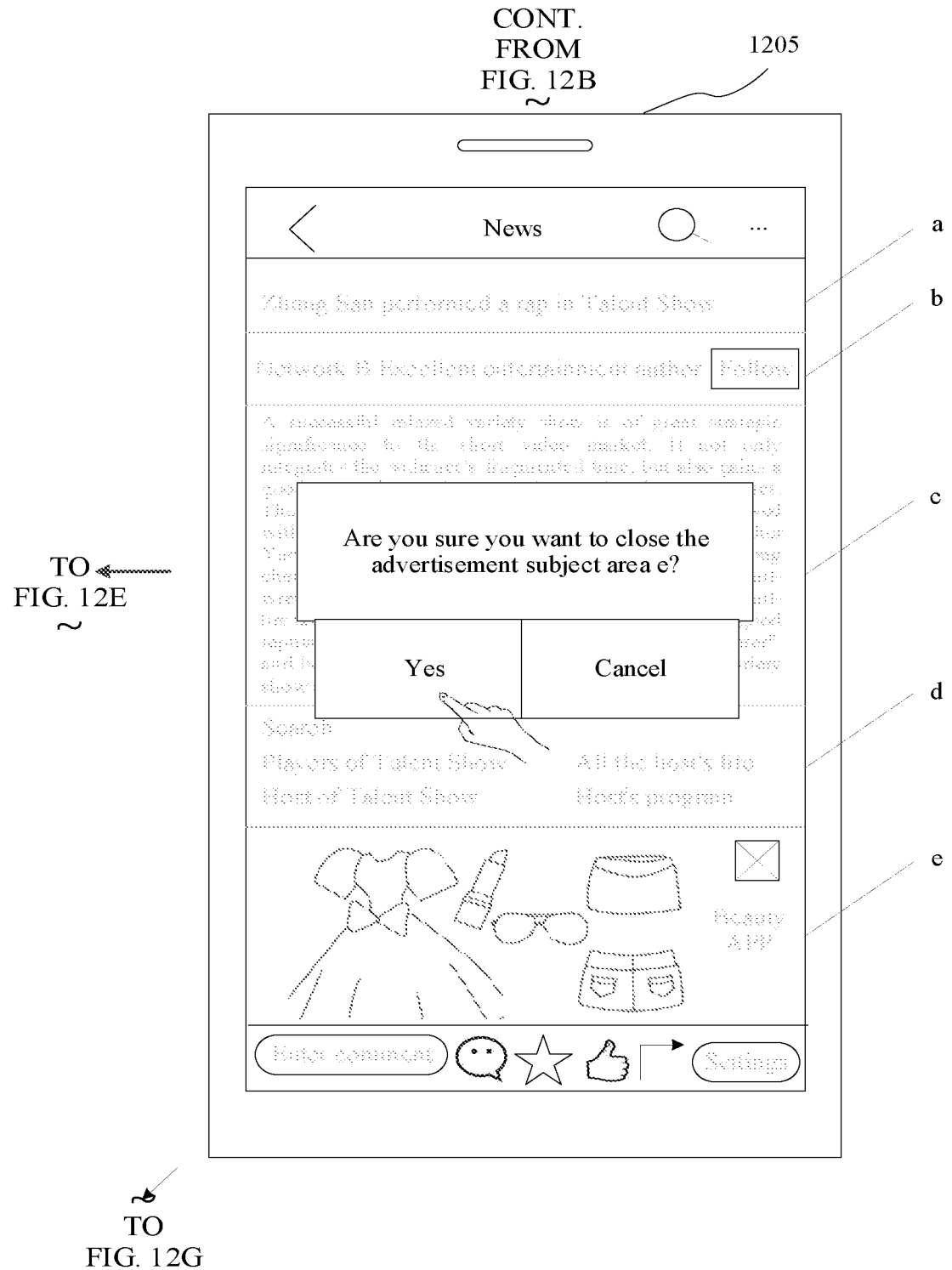
Figure 12E:
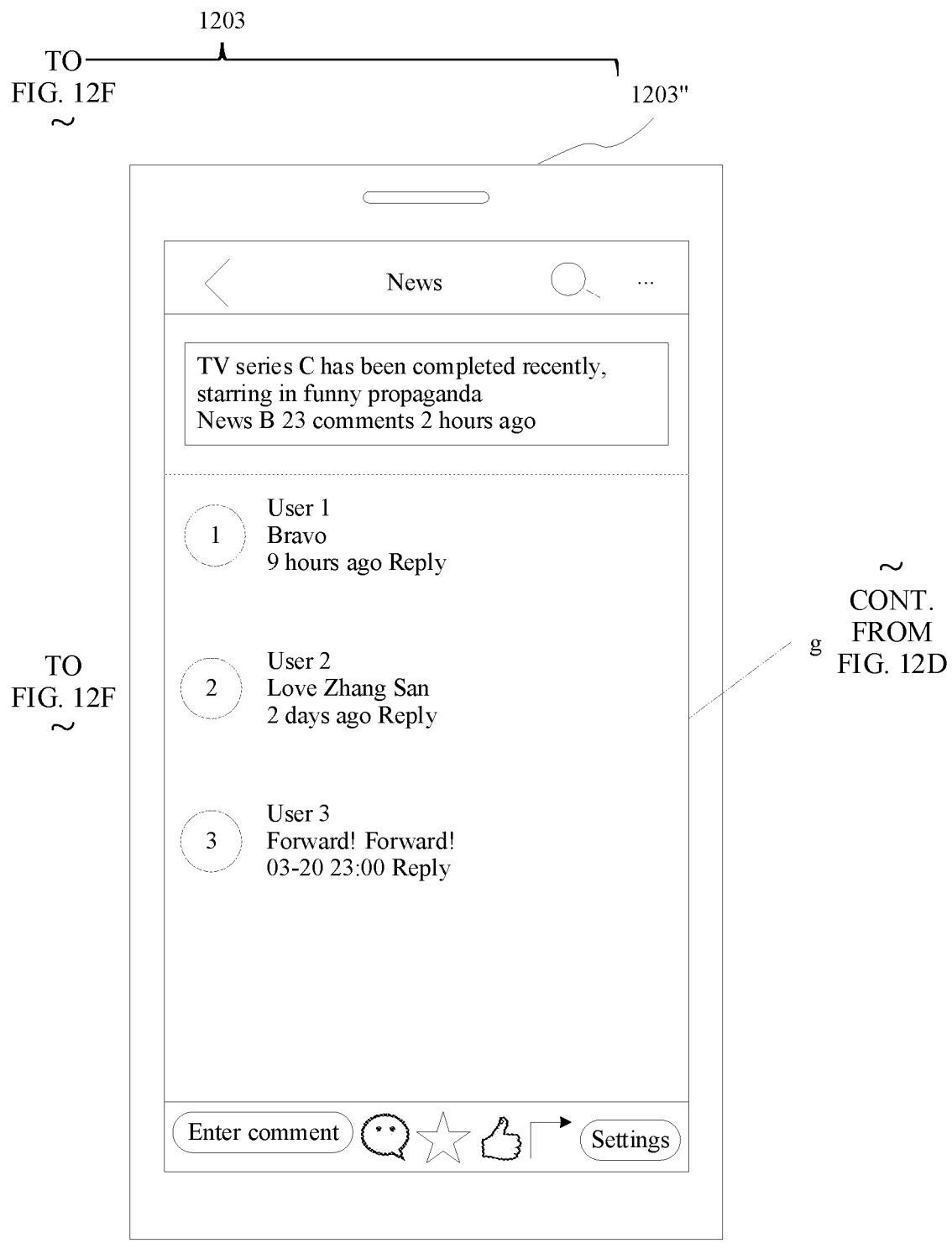
Figure 12F:
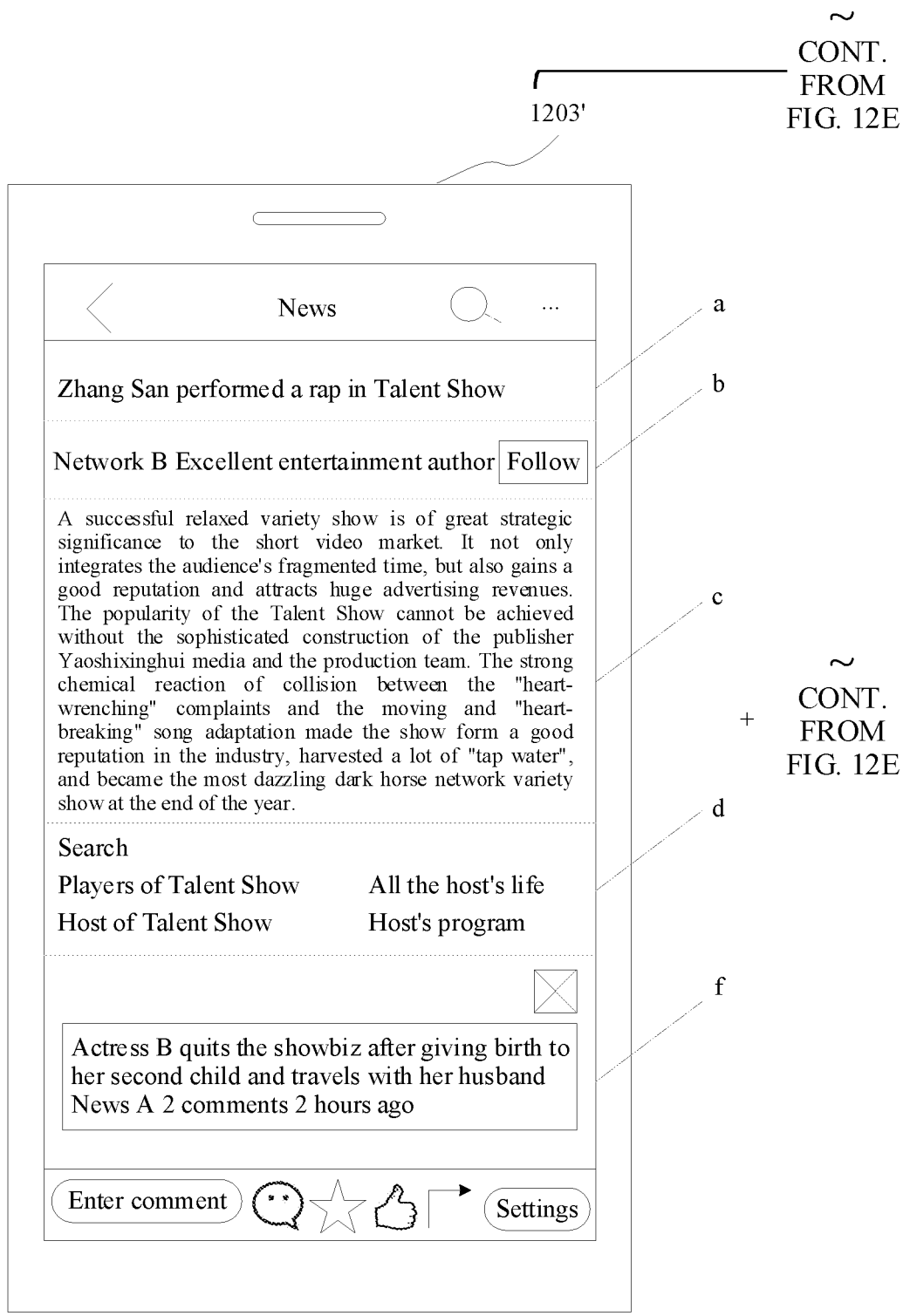
Figure 12G:
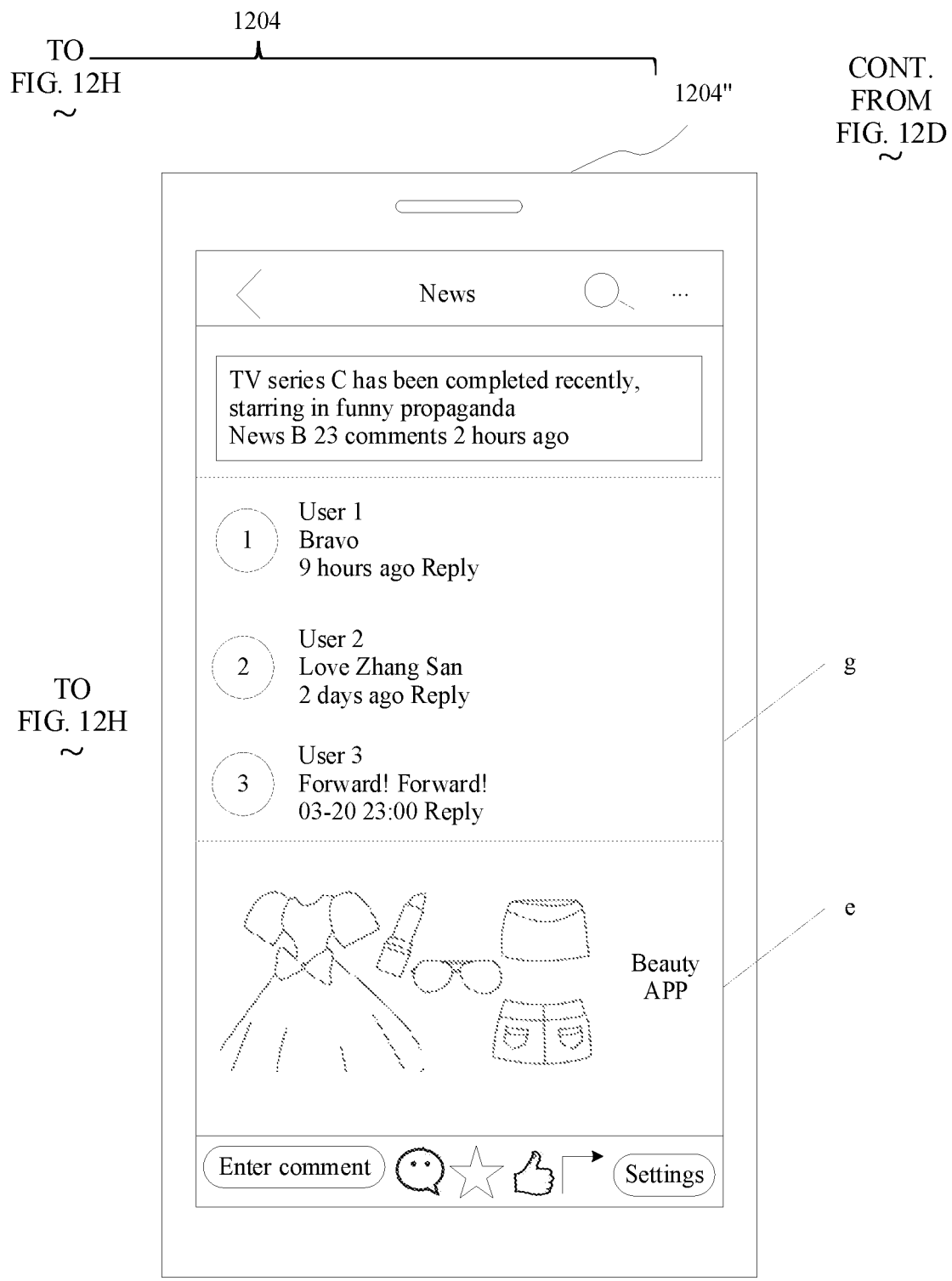
Figure 12H:
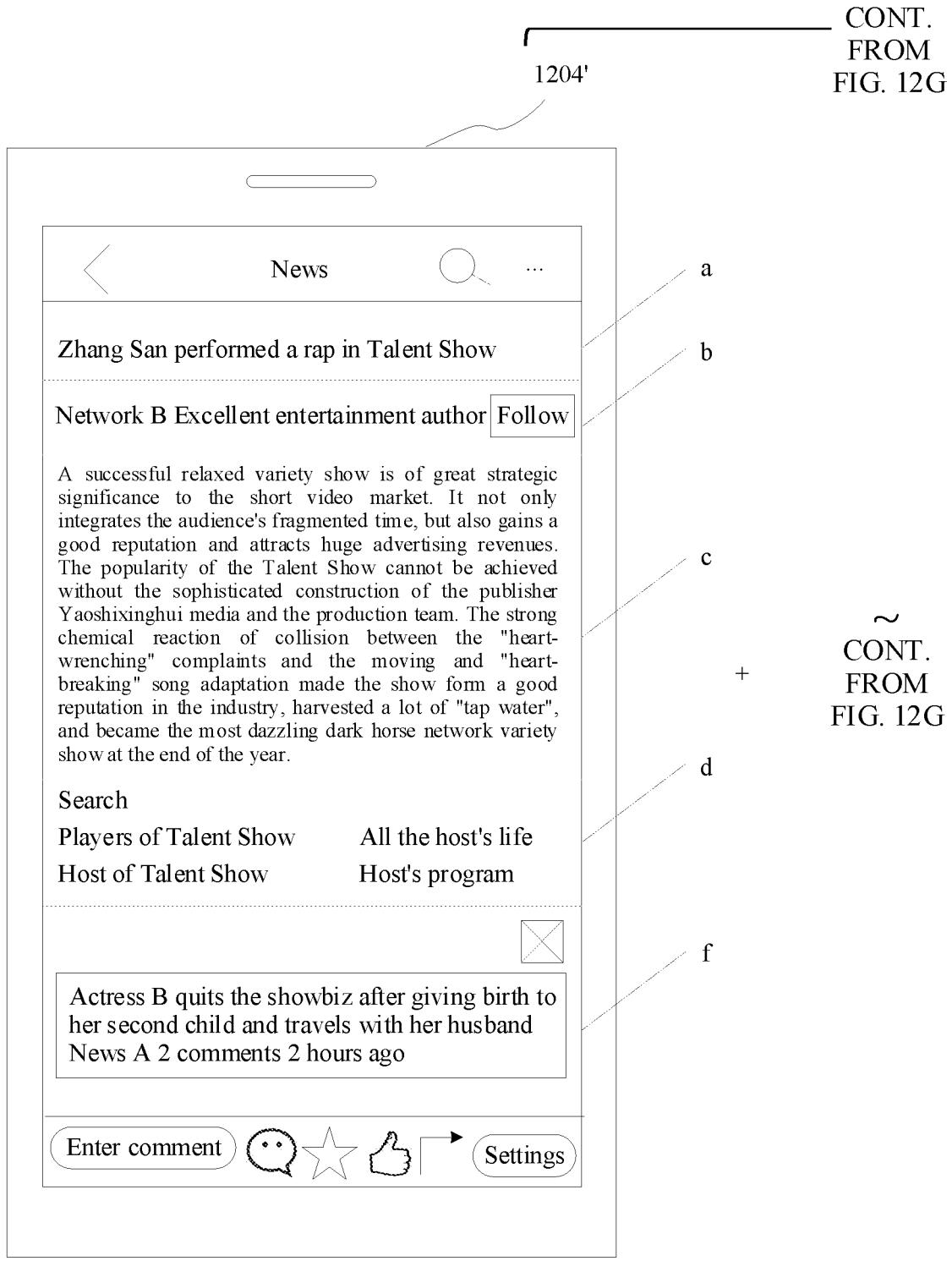
Figure 13A:
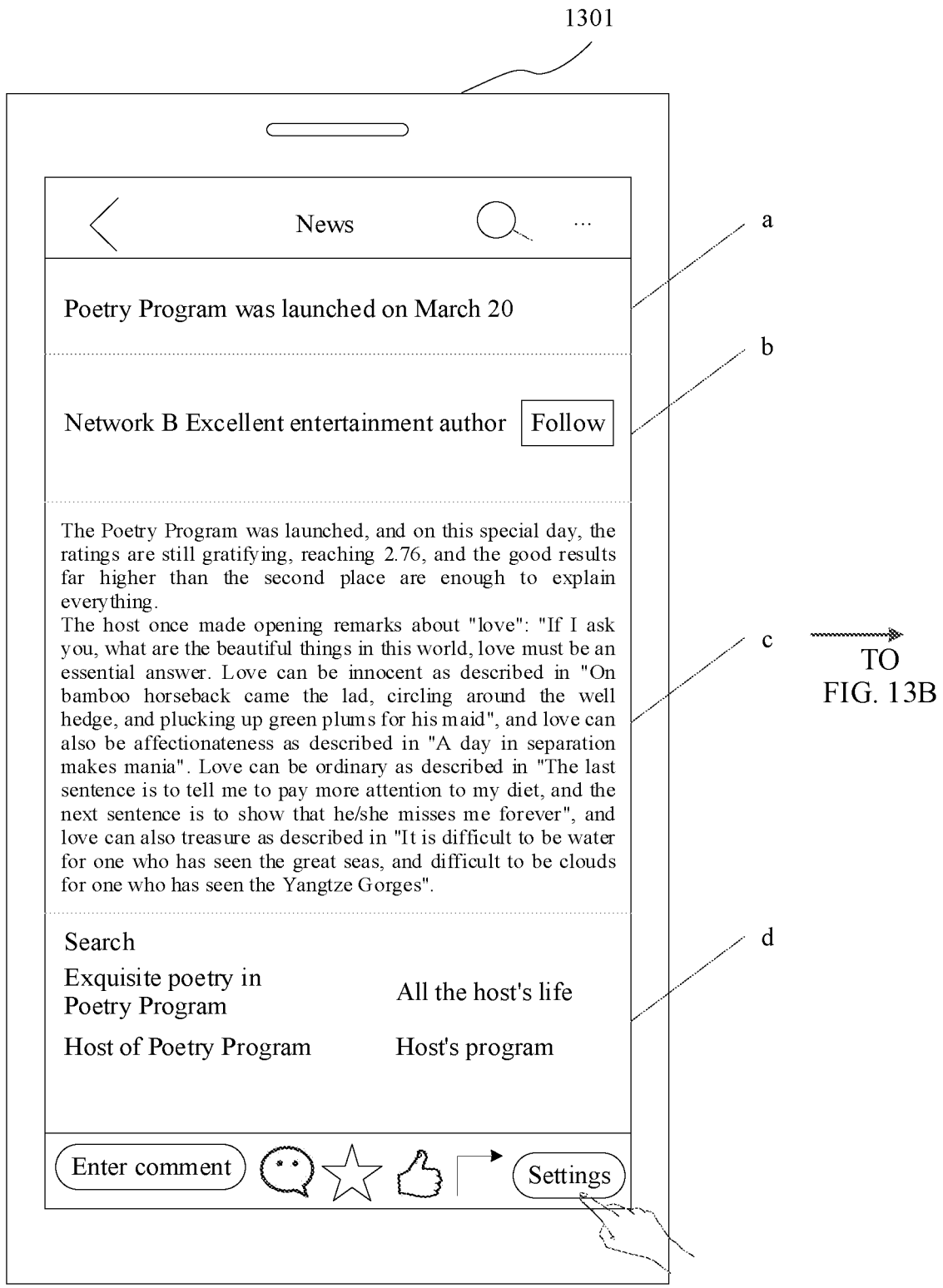
FIG. 13A to FIG. 13E are a schematic diagram 6 of an interface change of a terminal device according to an embodiment of this application.
Figure 13B:
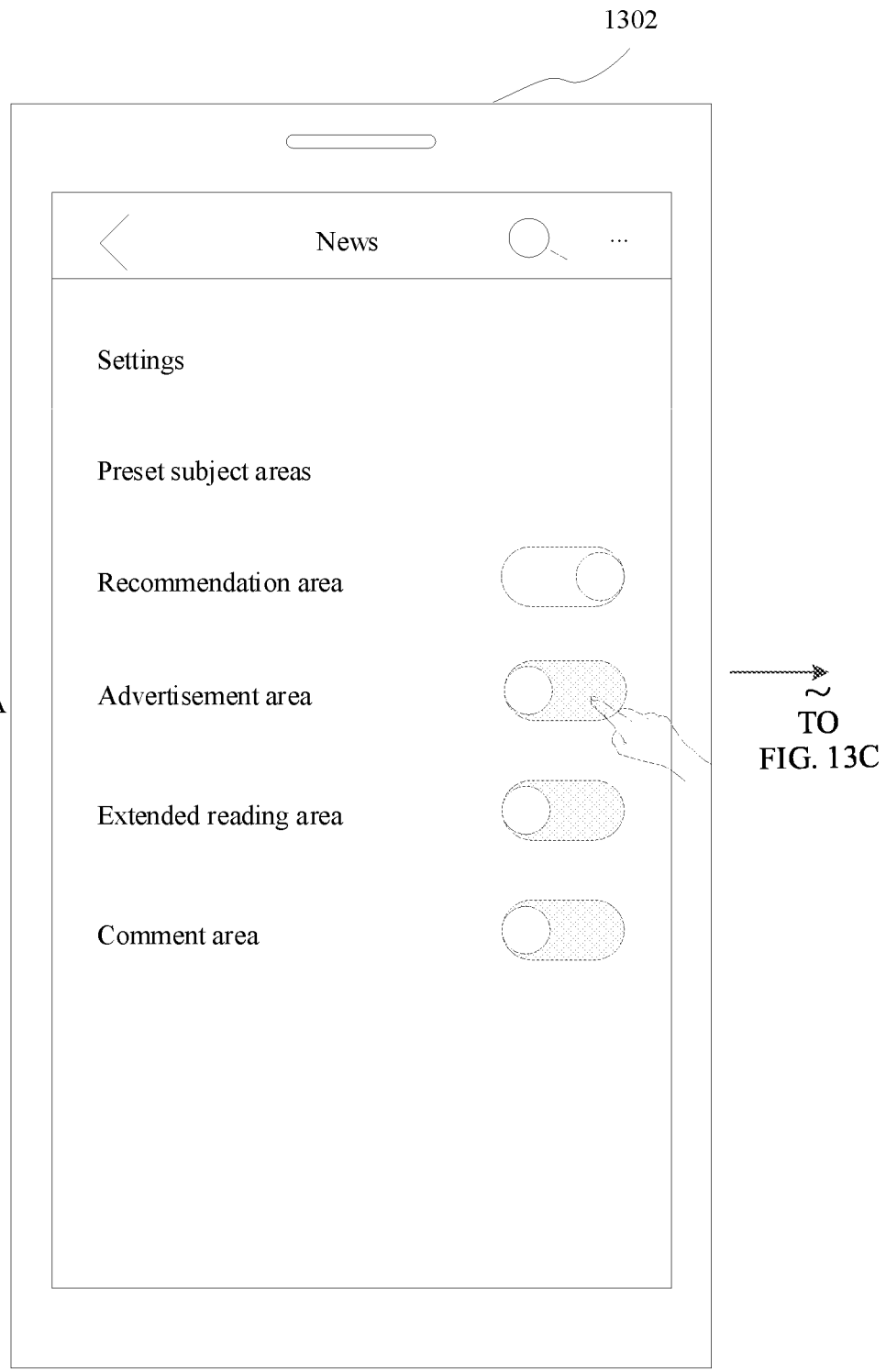
Figure 13C:
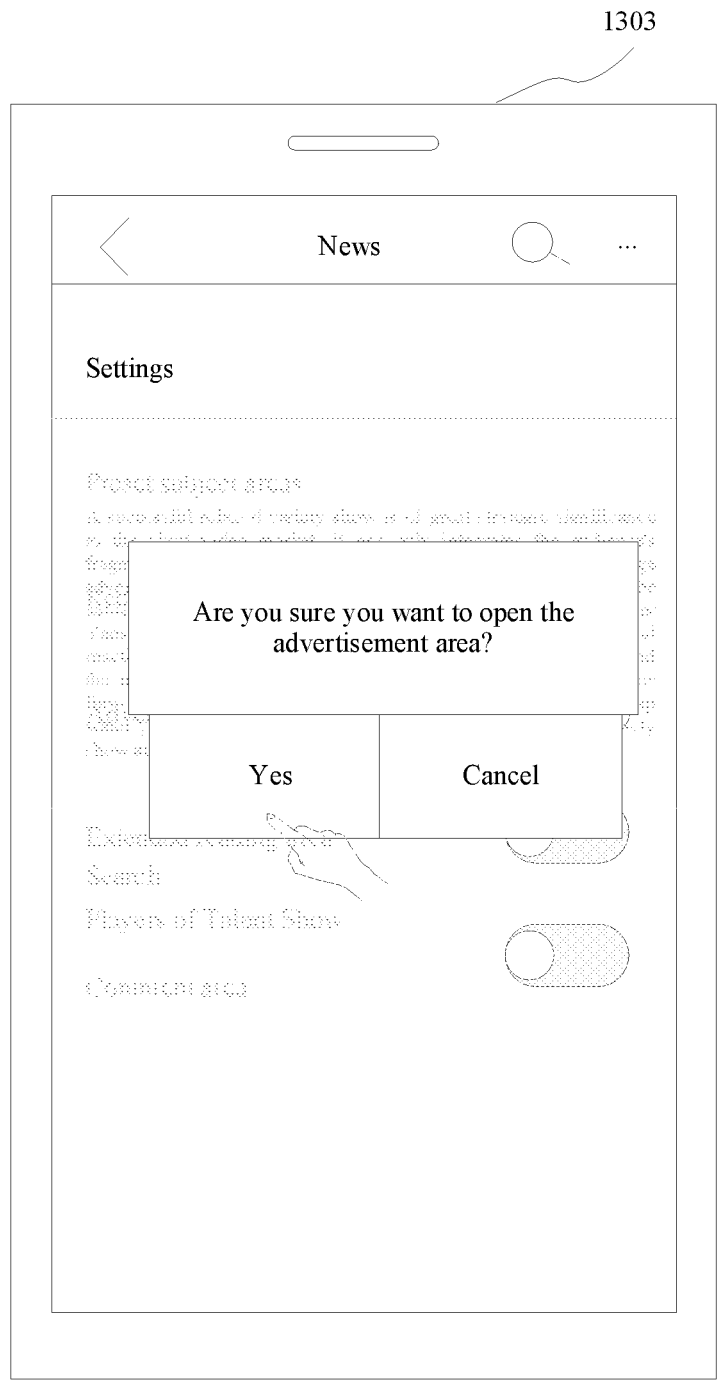
Figure 13D:
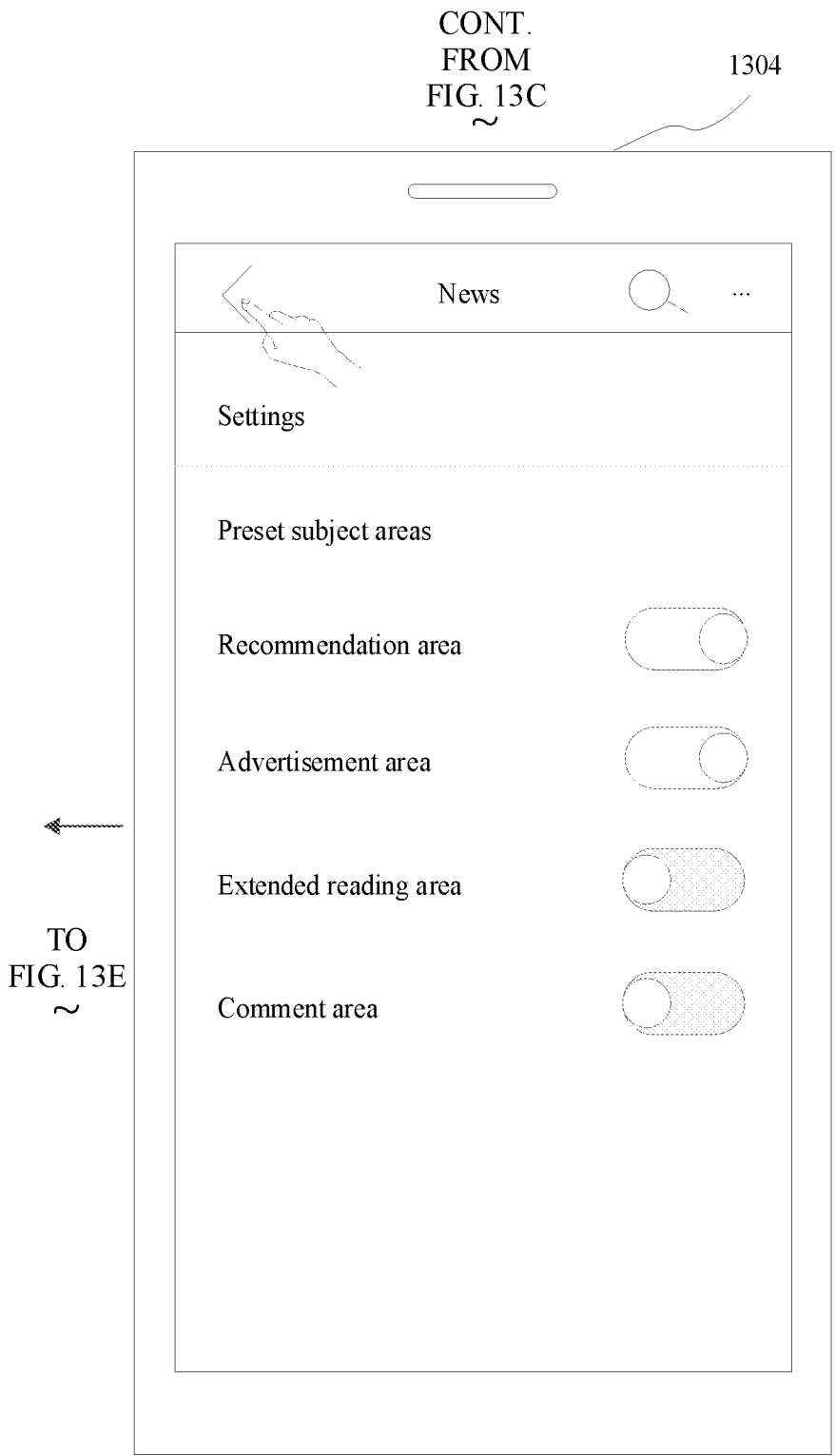
Figure 13E:
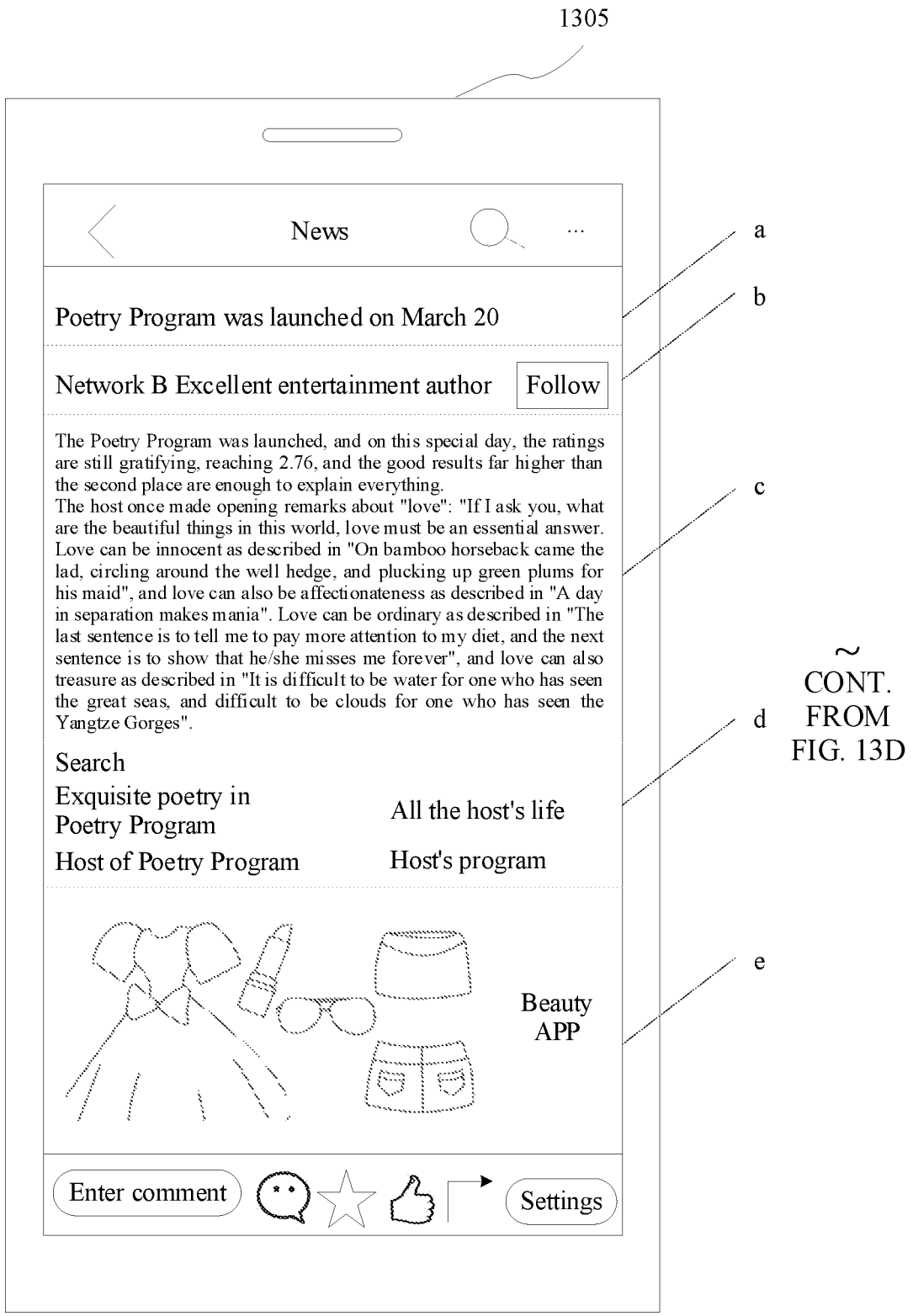
Figure 14A:
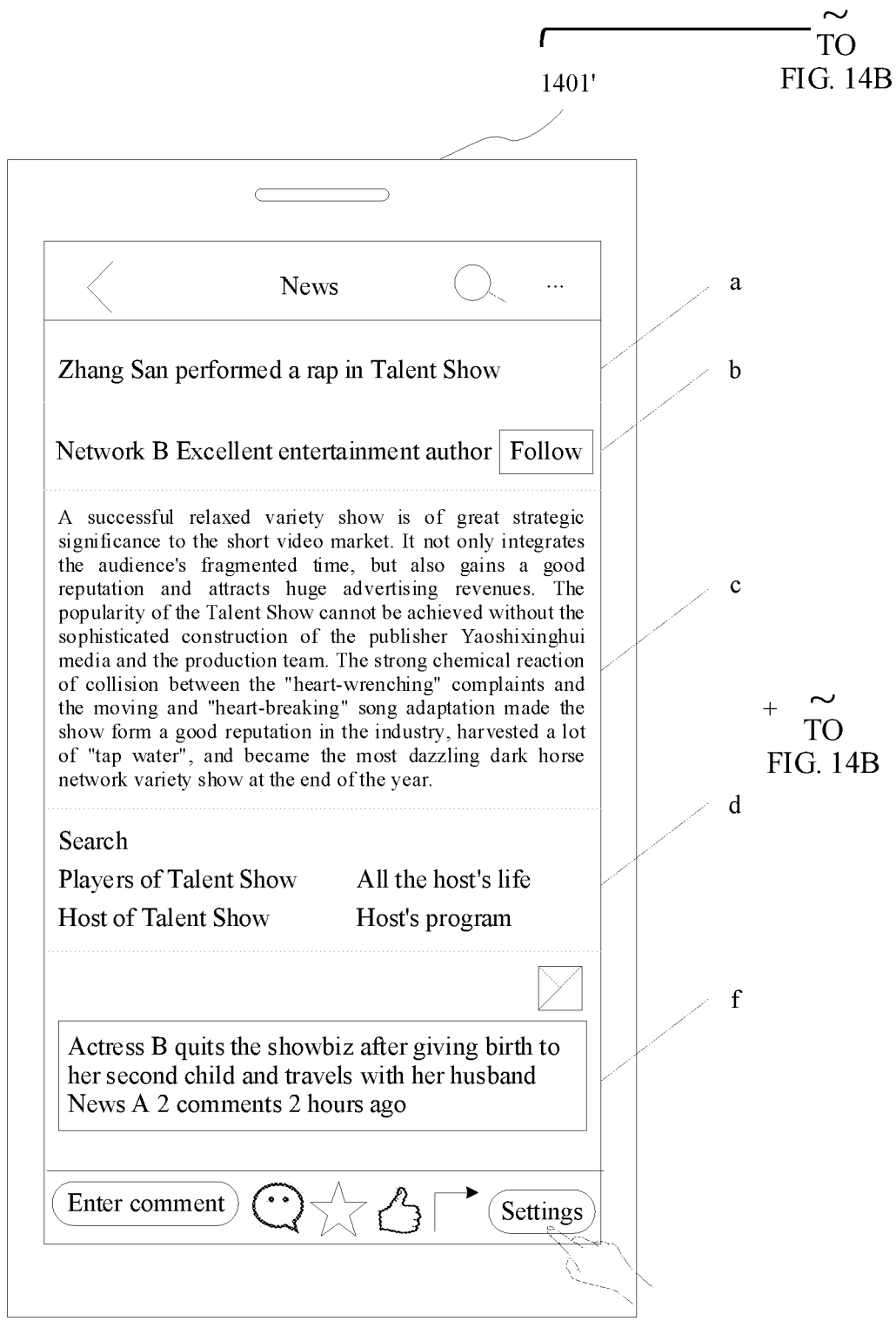
FIG. 14A to FIG. 14G are a schematic diagram 7 of an interface change of a terminal device according to an embodiment of this application.
Figure 14B:
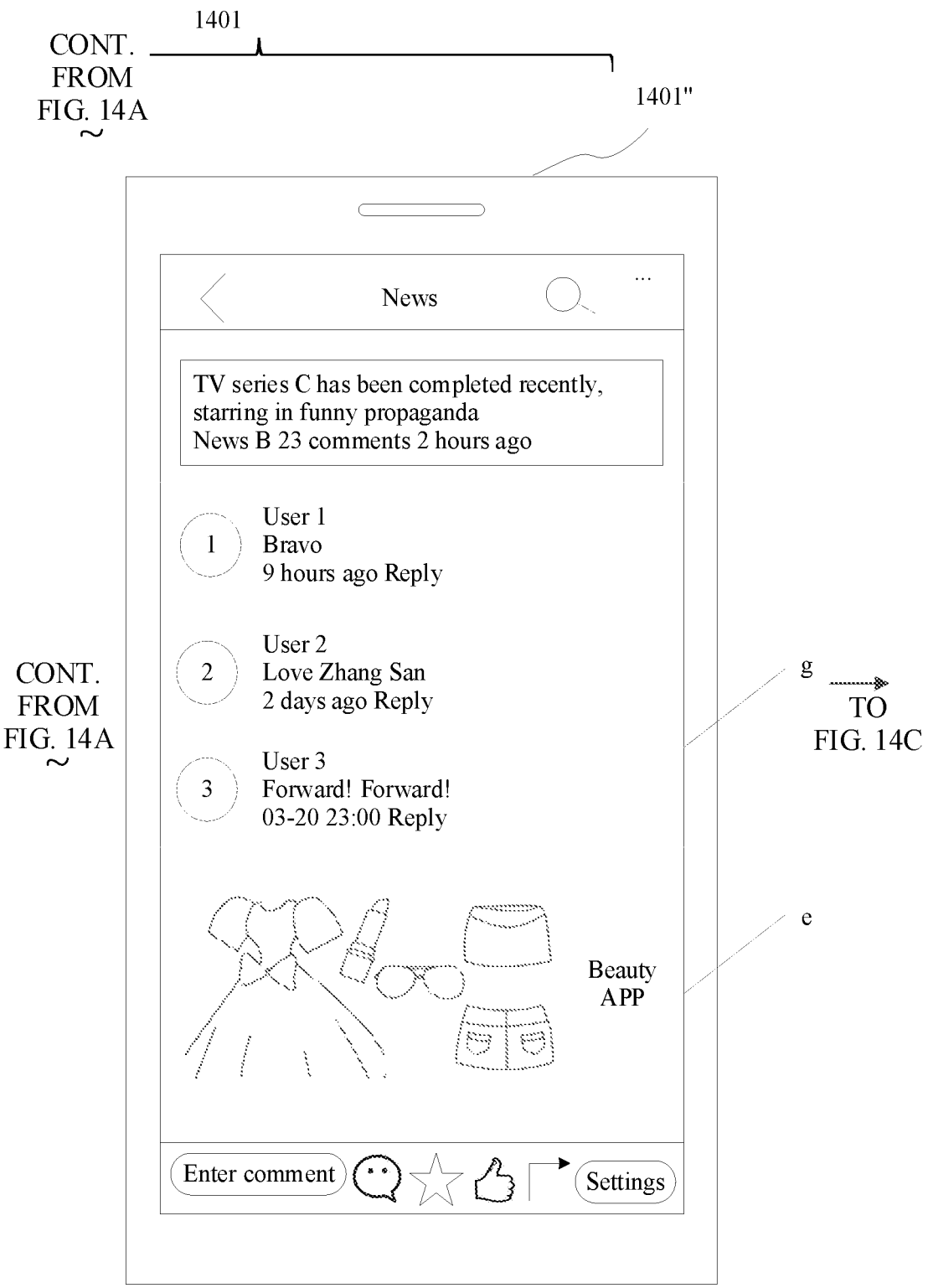
Figure 14C:
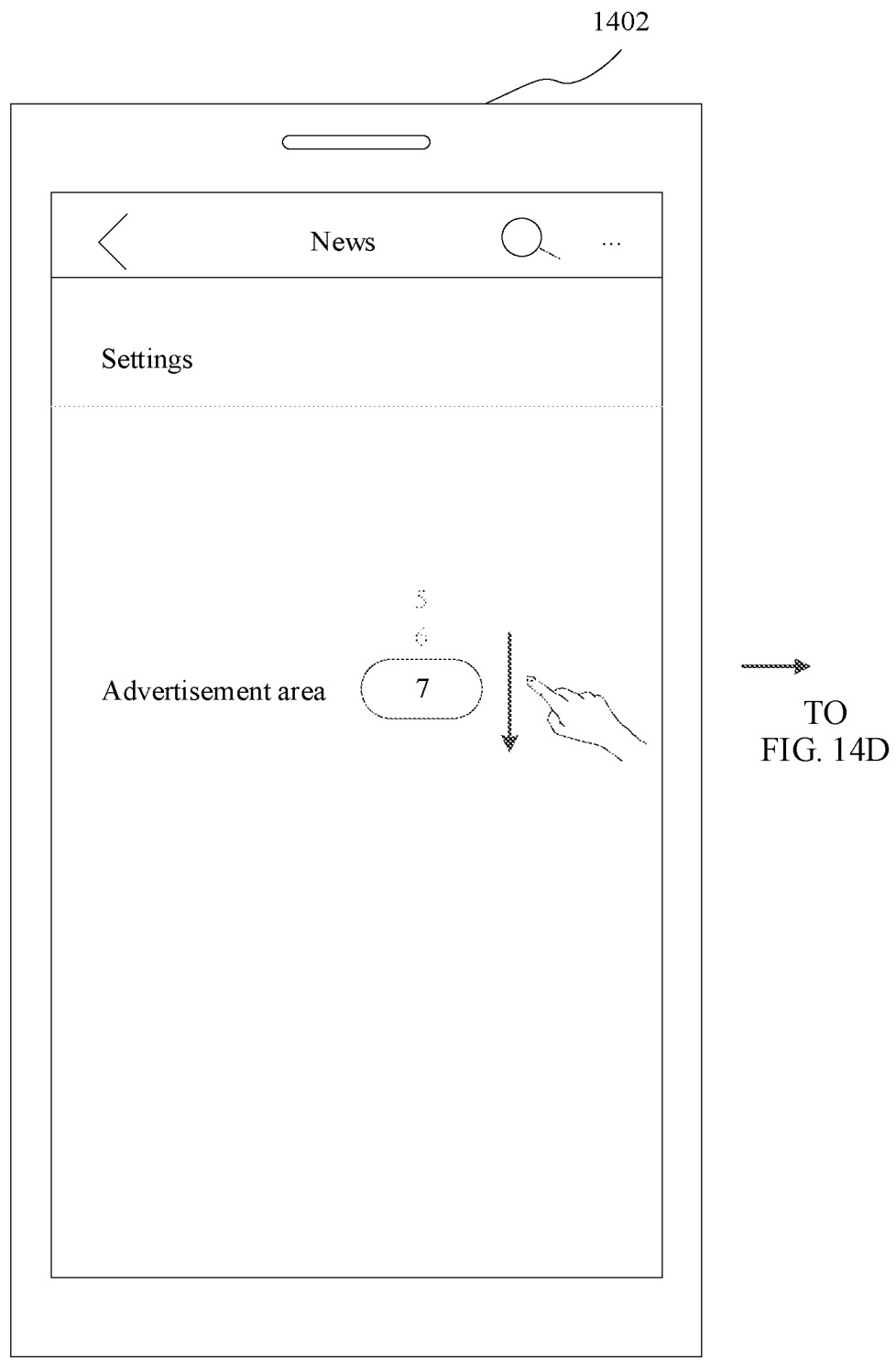
Figure 14D:
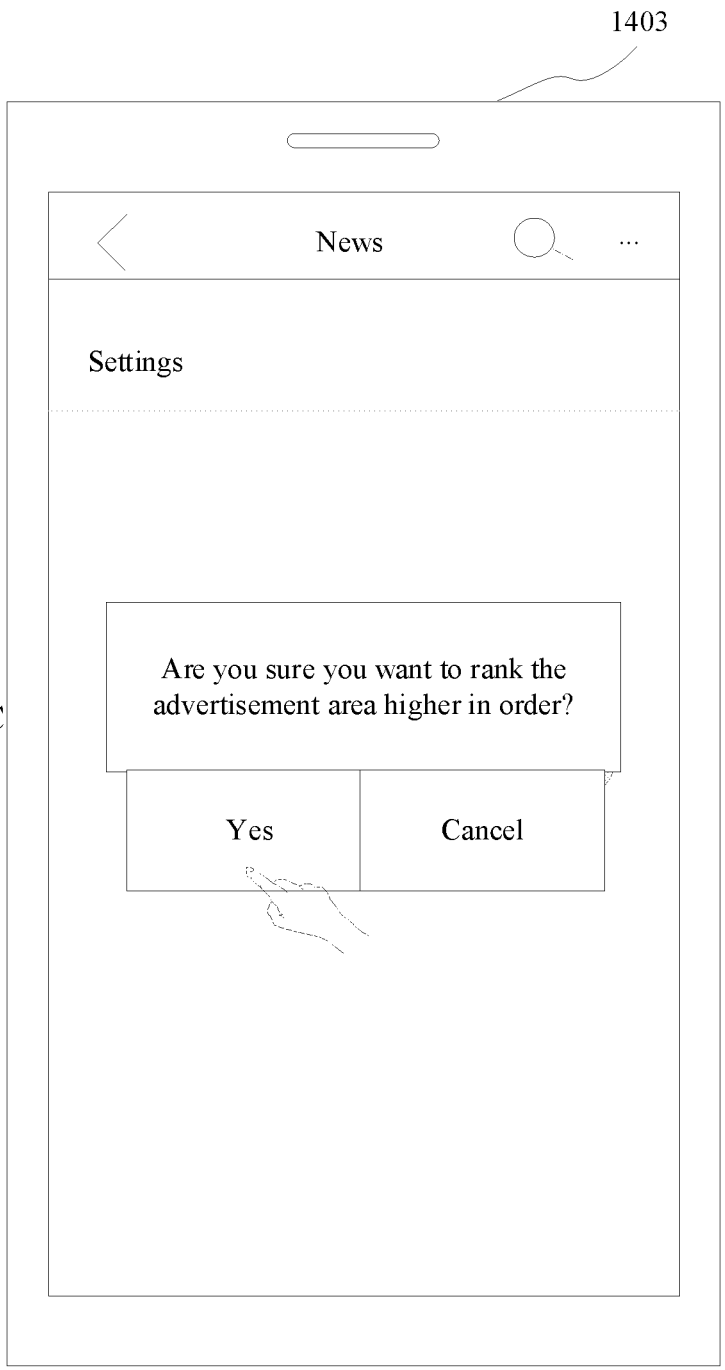
Figure 14E:
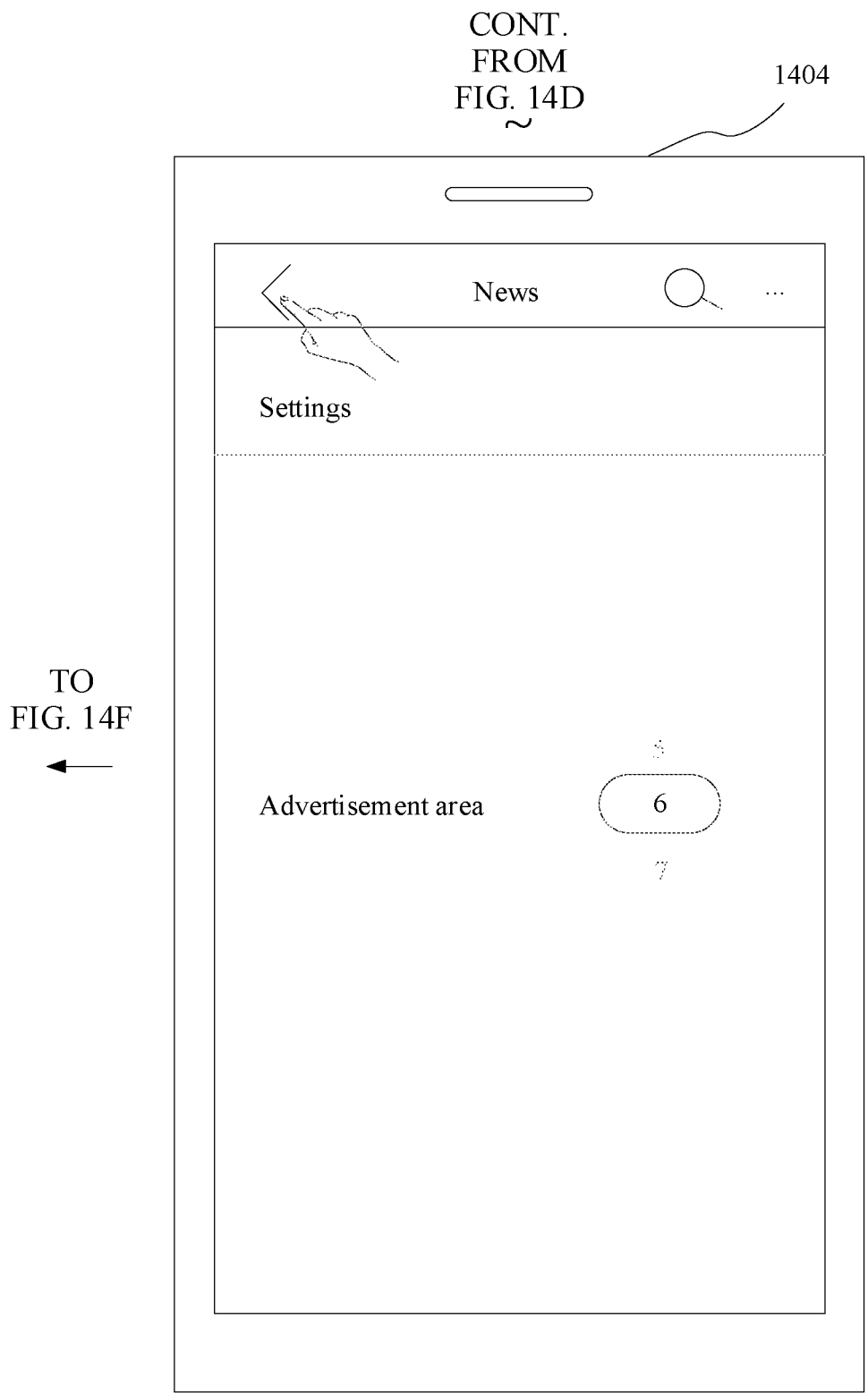
Figure 14F:
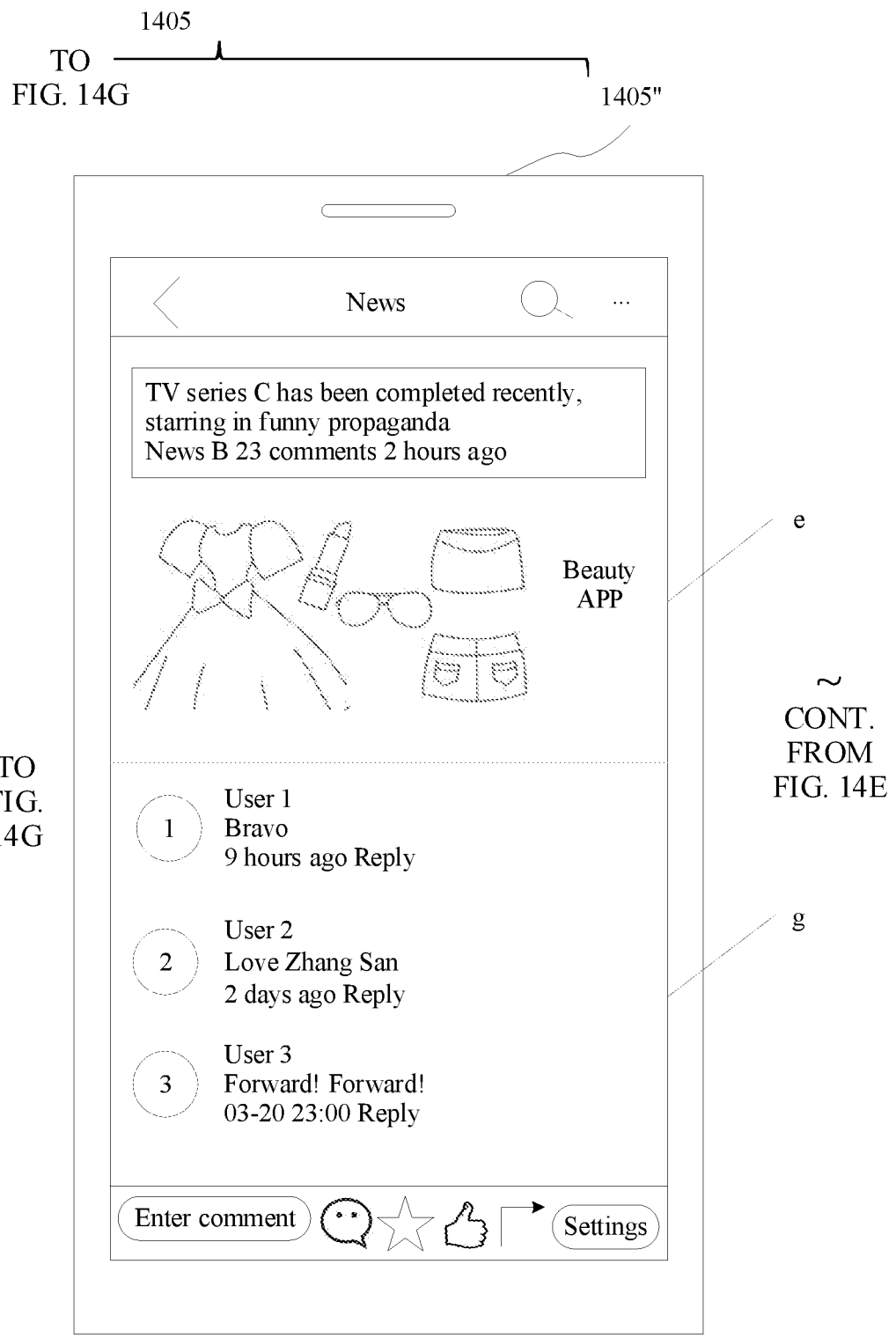
Figure 14G:
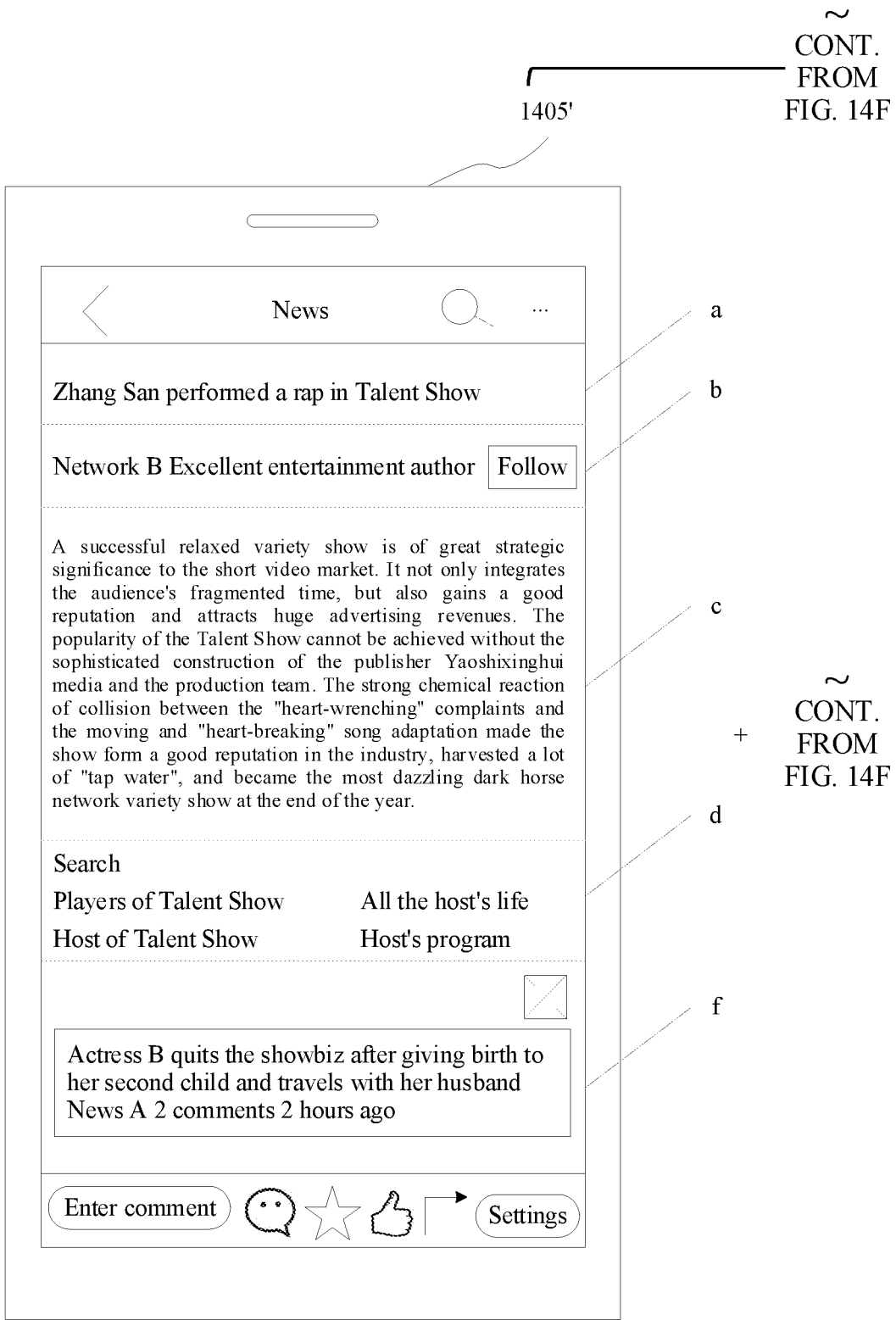

With reference to FIG. 11, the following describes a process in which the server determines a first subject area based on the preference data of the user and guides the user to close the first subject area, that is, a process in which the server obtains, based on the preference data of the user, information about settings performed by the user. FIG. 11 is a schematic flowchart of a details page processing method in Embodiment 2 according to an embodiment of this application. As shown in FIG. 11, the details page processing method in this embodiment of this application may include the following steps:

S1101: The terminal device sends a request for second information to the server, where the request for the second information includes an identifier of the user and an identifier of the second information.

S1102: The server determines the first subject area based on the preference data of the user.

S1103: The server sends content in preset subject areas on a details page of the second information and an identifier of the first subject area to the terminal device.

S1104: The terminal device displays the details page of the second information, where the details page of the second information includes the content in the preset subject areas on the details page of the second information; and displays a closing control in the first subject area.

S1105: The terminal device receives an operation performed by the user on the closing control in the first subject area.

S1106: The terminal device refreshes the details page of the first information, and displays a refreshed details page of the first information, where the refreshed details page of the first information does not include the first subject area or the first subject area is ranked lower than in a preset order.

S1107: The terminal device generates information about settings on the details page of the second information, where the settings information indicates that the user has closed the first subject area on the details page of the second information.

S1108: The terminal device sends the settings information to the server.

A manner in which the terminal device sends the request for the second information to the server in S1101 is the same as a manner in which the terminal device sends the first information to the server. For details, refer to related descriptions in S501. It should be understood that, a category of the second information is the same as that of the first information, and the second information may be the same as or different from the first information. For example, FIG. 12A to FIG. 12H are a schematic diagram 5 of an interface change of a terminal device according to an embodiment of this application. An interface 1201 in FIG. 12A to FIG. 12H displays a list page corresponding to an entertainment category, and the second information requested by the user is "Zhang San performed a rap in Talent Show" or "Poetry Program was launched on March 20" shown above.

In S1102, the server determines, based on the preference data of the user, a subject area that is not preferred by the user, that is, the first subject area, to guide the user to close the first subject area, and further generates the information that is in the foregoing embodiment and that is about settings performed by the user on the details page of the second information. In this embodiment of this application, the server may determine a subject area that is in subject areas in the preset subject areas and that is corresponding to a preference value less than a threshold each time information reading is performed, where the threshold may be pre-specified. For example, if the threshold is 0.5, as shown in Table 2, subject areas that are in the subject areas and that are corresponding to preference values less than the threshold include a comment area and an extended reading area.

To ensure confidence of a subject area that is not preferred by the user, in this embodiment of this application, a subject area that is in subject areas corresponding to preference values less than the threshold and that is corresponding to preference values whose quantity is greater than a quantity threshold may be used as the first subject area. It should be understood that the quantity threshold may be pre-specified. For example, in Table 2, if the subject areas corresponding to the preference values less than the threshold include the comment area and the extended reading area, and a quantity of preference values that are less than the threshold and that are corresponding to each of the comment area and the extended reading area is greater than the quantity threshold, it may be determined that the comment area and the extended reading area are first subject areas.

In S1103, when sending details page content of the second information to the terminal device, the server may send the content in the preset subject areas on the details page of the second information and the identifier of the first subject area to the terminal device. With reference to FIG. 1A to FIG. 1C, for example, if the server determines that first subject areas of a user 1 are e and f, subject areas that are not preferred by the user are e and f. Correspondingly, when sending the details page content of the second information to the terminal device, the server may send identifiers of the first subject areas, for example, e and f.

In S1104, the terminal device may display the details page of the second information. The details page of the second information includes the content in the preset subject areas on the details page of the second information, and the closing control is displayed in the first subject area. Correspondingly, the interface 1201 may jump to an interface 1202. The interface 1202 displays the content in the preset subject area: "Zhang San performed a rap in Talent Show" and displays closing controls in the subject areas e and f, so that the user can close the subject areas e and f.

In S1105, the user may select the closing control displayed on the terminal device, to close the corresponding subject area. Correspondingly, the terminal device may receive an operation performed by the user on the closing control.

In S1106, after receiving the operation performed by the user on the closing control, the terminal device may determine the subject area closed by the user. If the user selects the closing control displayed in the subject area e, it may be determined that the subject area closed by the user is e. In this embodiment of this application, after the user selects a closing control, the details page of the first information may be refreshed, and a refreshed details page of the first information may be displayed. The refreshed details page of the first information does not include the subject area closed by the user, or the subject area closed by the user is ranked lower than in the preset order of subject areas.

For example, as shown on the interface 1202, if the user selects the closing control displayed in the subject area e, the interface 1202 may jump to an interface 1203. The interface 1203 provides a refreshed details page of the first information. The refreshed details page of the first information does not include the subject area e. Optionally, if the user selects the closing control displayed in the subject area e, the interface 1202 may jump to an interface 1204. The interface 1204 provides a refreshed details page of the first information. The subject area e on the refreshed details page of the first information is ranked lower than in the preset order. For example, the subject area e is ranked lowest on the details page of the first information.

Optionally, after the user selects the closing control displayed in the subject area e, the interface 1202 may jump to an interface 1205. The interface 1205 is configured to remind the user to close the selected subject area. For example, the interface 1205 may display text reminder information "Are you sure you want to close the advertisement subject area e?", a "Yes" control, and a "Cancel" control. If the user touches the "Yes" control, the interface 1205 may jump to the interface 1203 or the interface 1204. If the user touches the "Cancel" control, the interface 1205 may jump to the interface 1202. Optionally, the interface 1205 may further display reminder information "a closed subject area may be reset in details page settings", so that the user may re-open the closed subject area or rank the subject area closed by the user higher in order. It should be understood that, the user may close the subject area f in the same manner as that used for closing the subject area e above.

As shown on the interface 1203, the user has closed the subject area e, but has not closed the subject area f. In this case, the interface 1203 may display the subject areas a, b, c, d, f, and g, and a closing control is displayed in the subject area f. The user may further choose to close the subject area f.

Optionally, in this embodiment of this application, the user closes some of the first subject areas. For example, the user closes only the subject area e. Correspondingly, when the user requests third information of the category, the terminal device may display a closing control in a subject area that is on a details page of the third information and that is not closed by the user, for example, continue to display the closing control in the subject area f.

In S1107, the terminal device may further generate, based on the operation performed by the user on the closing control, the information about settings performed by the user on the details page of the second information. The settings information includes an identifier of a subject area closed by the user (that is, the settings information in the foregoing embodiment). If the user closes the subject areas e and f, the settings information includes identifiers of the subject areas e and f.

In S1108, the terminal device may send the information about settings performed by the user to the server. After receiving the settings information sent by the terminal device, the server may store the information about settings performed by the user. Further, when the user requests the first information, the terminal device may determine the first subject area based on the settings information, and further determine the details page content of the first information, so that the terminal device displays the details pages of the first information in FIG. 6A and FIG. 6B to FIG. 9A to FIG. 9C.

In this manner, the user closes the first subject area or performs order adjustment on the first subject area. To re-open the first subject area or read the first subject area earlier, two possible implementations are provided in this embodiment of this application to guide the user to re-open the first subject area or rank the first subject area higher in order.

In a possible implementation, a "Settings" control is displayed on the details page of the first information, and the user may select the "Settings" control to re-open the first subject area or rank the first subject area higher in order. Correspondingly, after receiving an instruction of the user for selecting the settings control, the terminal device may display the settings interface. An adjustment control is displayed on the settings interface, and the adjustment control is used to restore display of the first subject area or rank the first subject area higher in order.

For example, if the operation performed by the user on the first subject area makes the terminal device not display the first subject area while displaying the details page of the first information, the adjustment control may be a switch corresponding to the first subject area. FIG. 13A to FIG. 13E are a schematic diagram 6 of an interface change of a terminal device according to an embodiment of this application. As shown in FIG. 13A to FIG. 13E, an interface 1301 may be the same as the interface 602. After the user selects a "Settings" control on the interface 1301, the interface 1301 may jump to an interface 1302. The interface 1302 may be a settings interface. If subject areas closed by the user are e, f, and g, identifiers of the subject areas e, f, and g are displayed on the interface 1302. For example, the subject areas e, f, and g may be an advertisement area, an extended reading area, and a comment area. Correspondingly, an identifier of each subject area is corresponding to a switch, and the user may operate the switch to re-open the subject area or rank the first subject area higher in order. It is conceivable that, switches corresponding to the advertisement area, the extended reading area, and the comment area each are displayed in an off state, in other words, the user has closed the first subject areas: the advertisement area, the extended reading area, and the comment are or ranked the first subject areas lower in order. A shadow is used to represent the off state on the interface 1302. It should be understood that, the interface 1302 may further include a subject area in preset subject areas other than the first subject areas and a switch corresponding to the subject area.

If the terminal device receives an instruction of the user for selecting a switch corresponding to a first subject area, the terminal device determines that the first subject area needs to be re-opened or the first subject area needs to be ranked higher in order, and sends updated settings information to the server. It should be understood that, the updated settings information includes an identifier of a new first subject area. If first subject areas set by the user on the details page of the second information are e, f, and g, and the user re-opens the subject area e, identifiers that are of new first subject areas and that are included in the updated settings information are f and g. Correspondingly, the server receives the updated settings information from the terminal device. The updated settings information is generated based on an operation performed by the user on the switch corresponding to the first subject area, and the operation is used to restore display of the first subject area or rank the first subject area higher in order.

Optionally, after the user selects the switch corresponding to the advertisement area, the interface 1302 may jump to an interface 1303. The interface 1303 may display "Are you sure you want to open the advertisement area?", a "Yes" control, and a "Cancel" control. If the user touches the "Yes" control, the interface 1303 may jump to an interface 1304. A switch corresponding to the advertisement area on the interface 1304 is displayed in an on state. If the user touches the "Cancel" control, the interface 1303 may jump to the interface 1302.

It is conceivable that, after the user performs settings on the switch corresponding to the advertisement area, the terminal device displays a refreshed details page of the first information. On the refreshed details page of the first information, the advertisement area is displayed or the advertisement area is ranked higher in order. Correspondingly, when the user returns to the details page of the first information, the interface 1304 may jump to an interface 1305. If the user performs an operation on the first subject area to restore display of the first subject area, after receiving the updated settings information, the server may further send content in the advertisement area to the terminal device, so that the terminal device displays the content in the advertisement area, as shown on the interface 1305.

For example, if the operation performed by the user on the first subject area makes the terminal device rank the first subject area lower than in the preset order when the terminal device displays the details page of the first information, the adjustment control may be an order selection control corresponding to the first subject area. FIG. 14A to FIG. 14G are a schematic diagram 7 of an interface change of a terminal device according to an embodiment of this application. As shown in FIG. 14A to FIG. 14G, an interface 1401 in FIG. 14A to FIG. 14G is the same as the interface 1204. After the user selects a "Settings" control, the interface 1401 jumps to an interface 1402. The interface 1402 displays an order selection control corresponding to the first subject area, and the first subject area is an advertisement area. As displayed on the interface 1402, the advertisement area is ranked seventh currently, and the order selection control may be a control that is displayed on the interface 1402 and that can be scrolled up and down to select a ranking of the advertisement area. After the user selects the order selection control, the interface 1402 may jump to an interface 1403. The interface displays text reminder information such as "Are you sure you want to rank the advertisement area higher in order?", a "Yes" control, and a "Cancel" control. After the user selects the "Yes" control, the interface 1403 jumps to an interface 1404. As displayed on the interface 1404, the advertisement area adjusted by the user is ranked sixth currently. Correspondingly, after the user performs settings on a switch corresponding to the advertisement area, the terminal device displays a refreshed details page of the first information. On the refreshed details page of the first information, the advertisement area is displayed or the advertisement area is ranked higher in order. Correspondingly, the interface 1404 may jump to an interface 1405. On the interface 1405, a ranking of the first subject area is raised to sixth. For example, a ranking of the advertisement area on the interface 1405 may be raised from lowest to second lowest.

In another possible implementation, the server may determine a hotspot subject area based on reading data that is corresponding to the first information and that is fed back by another terminal device. The hotspot subject area is a subject area preferred by a user of the another terminal device. The subject area preferred by the user of the another terminal device may be a subject area corresponding to a preference value greater than the foregoing threshold, and a quantity of subject areas that are in the terminal device and that are corresponding to preference values greater than the foregoing threshold is greater than a quantity threshold. For example, if a quantity of preference values in the another terminal device that are corresponding to a comment area and that are greater than the foregoing threshold exceeds 20, it is determined that the comment area is a hotspot subject area in subject areas closed by the user. It should be understood that, in this embodiment of this application, a manner of obtaining a preference value that is in the another terminal device and that is corresponding to each subject area is the same as the foregoing manner of obtaining, based on reading data obtained each time the user previously reads information, a preference value that is of the user and that is corresponding to each subject area. Details are not described herein again.

If the server determines that the hotspot area includes a first subject area, the server may send reminder information to the terminal device. Correspondingly, the terminal device may display the reminder information on the details page of the first information. The reminder information is generated by the server based on the reading data that is corresponding to the first information and that is fed back by the another terminal device, and the reminder information indicates to restore display of the first subject area or rank the first subject area higher in order.

Figure 15A:
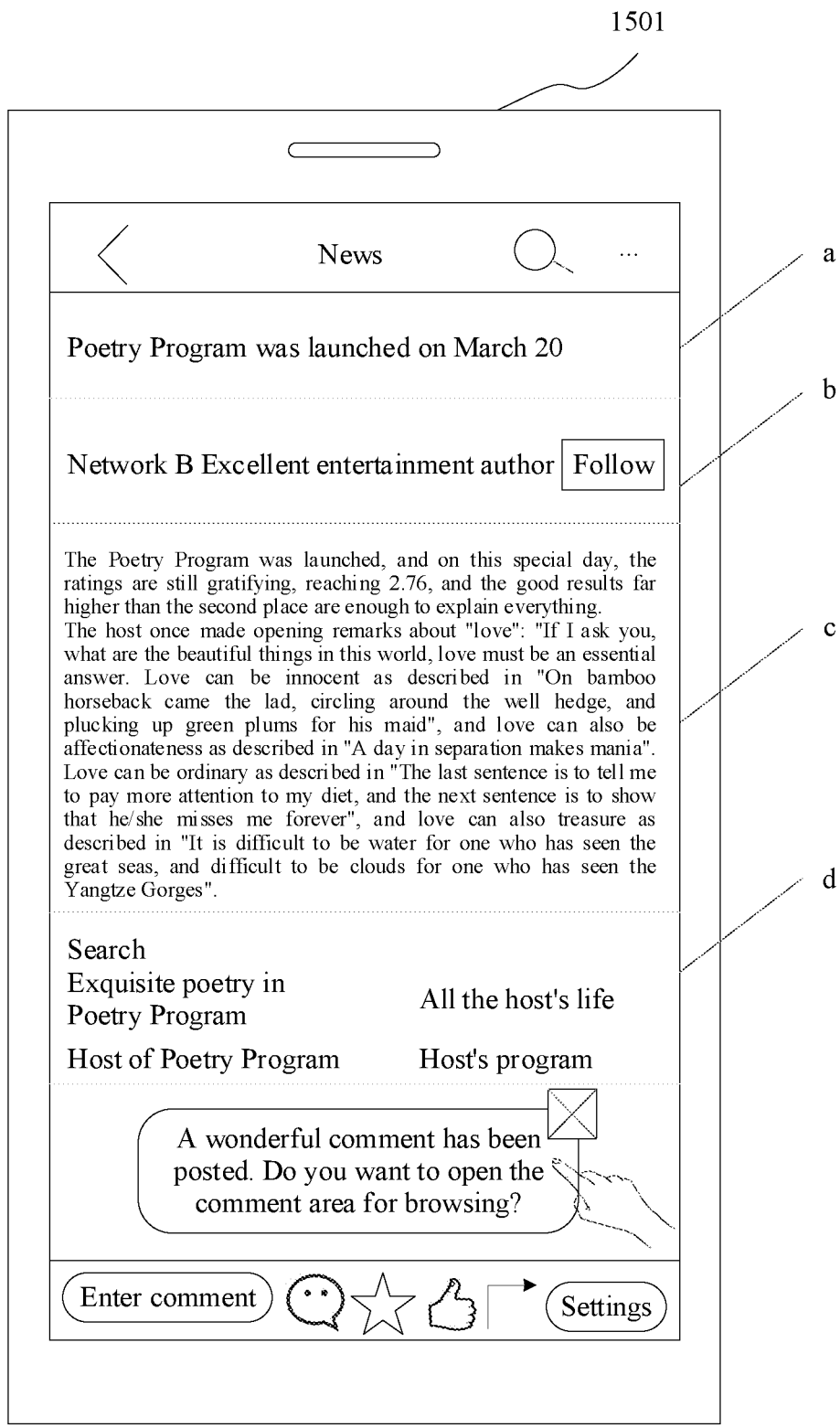
FIG. 15A to FIG. 15C are a schematic diagram 8 of an interface change of a terminal device according to an embodiment of this application.
Figure 15B:
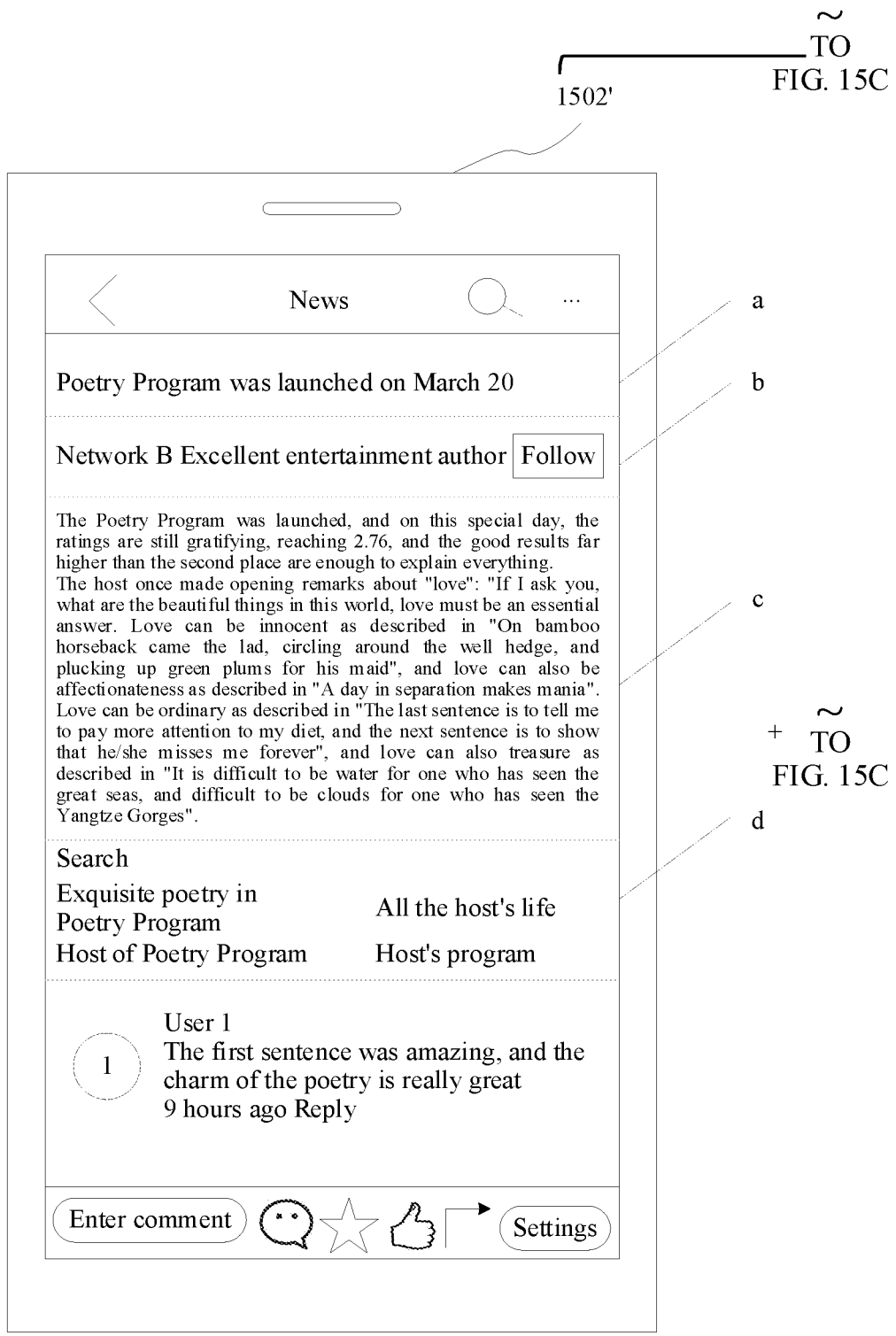
Figure 15C:
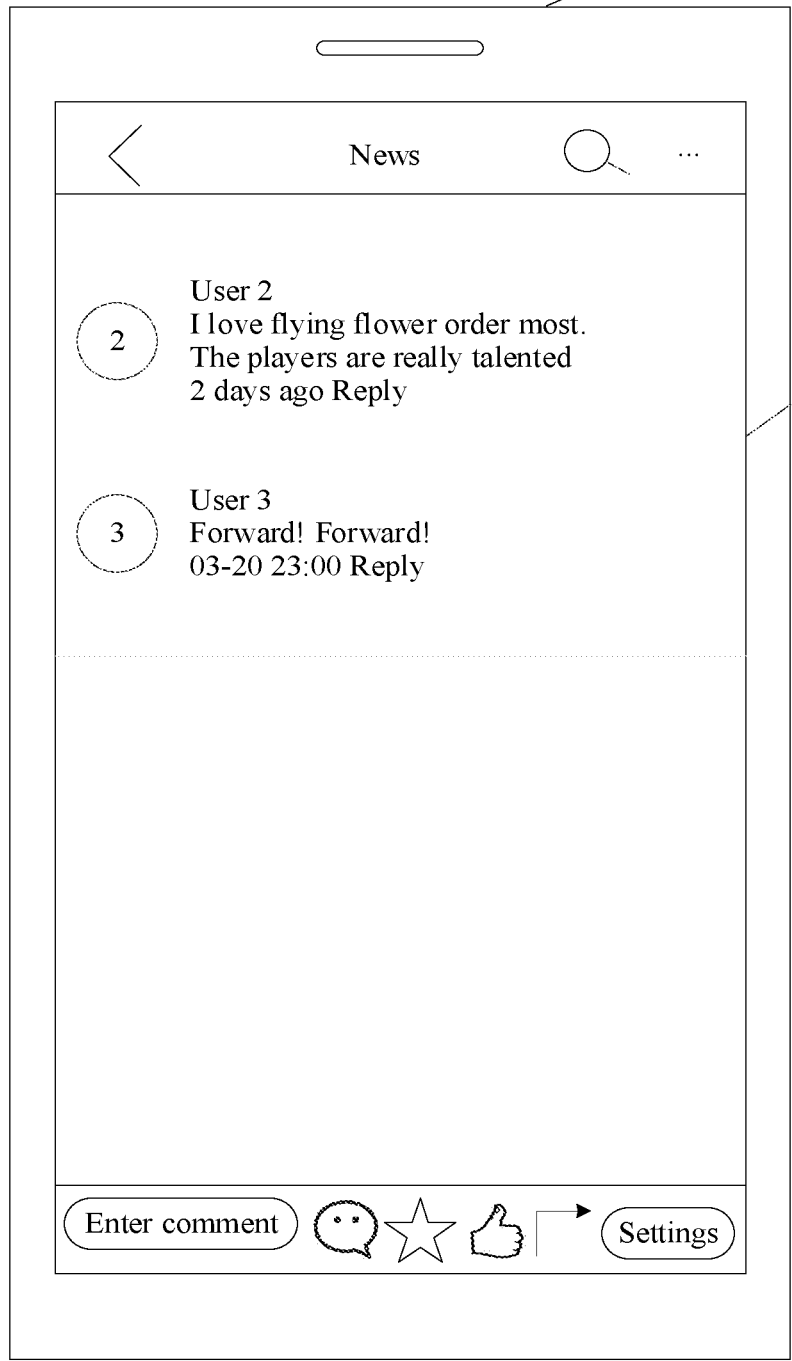
Figure 16A:
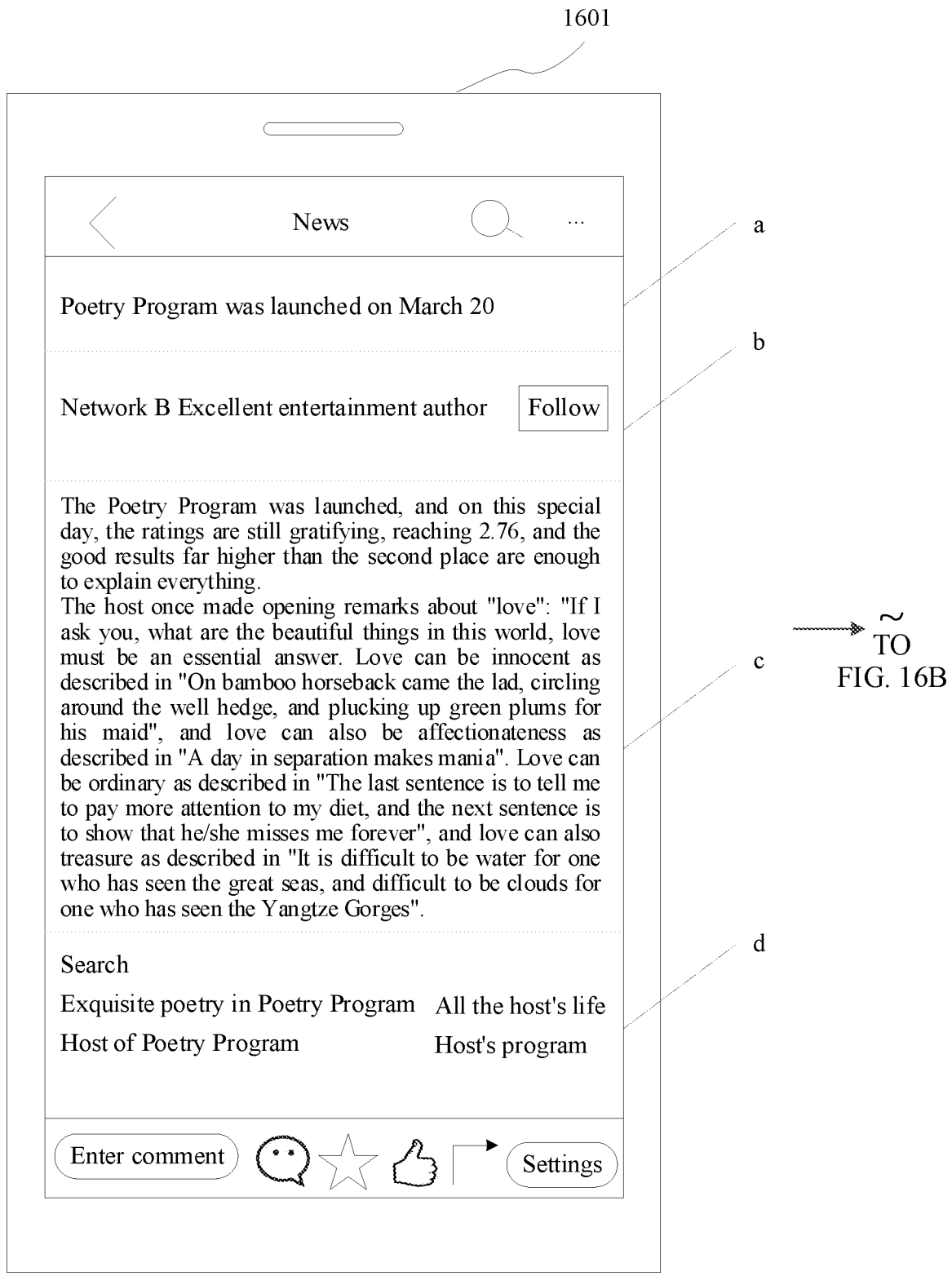
FIG. 16A to FIG. 16D are a schematic diagram 9 of an interface change of a terminal device according to an embodiment of this application.
Figure 16B:
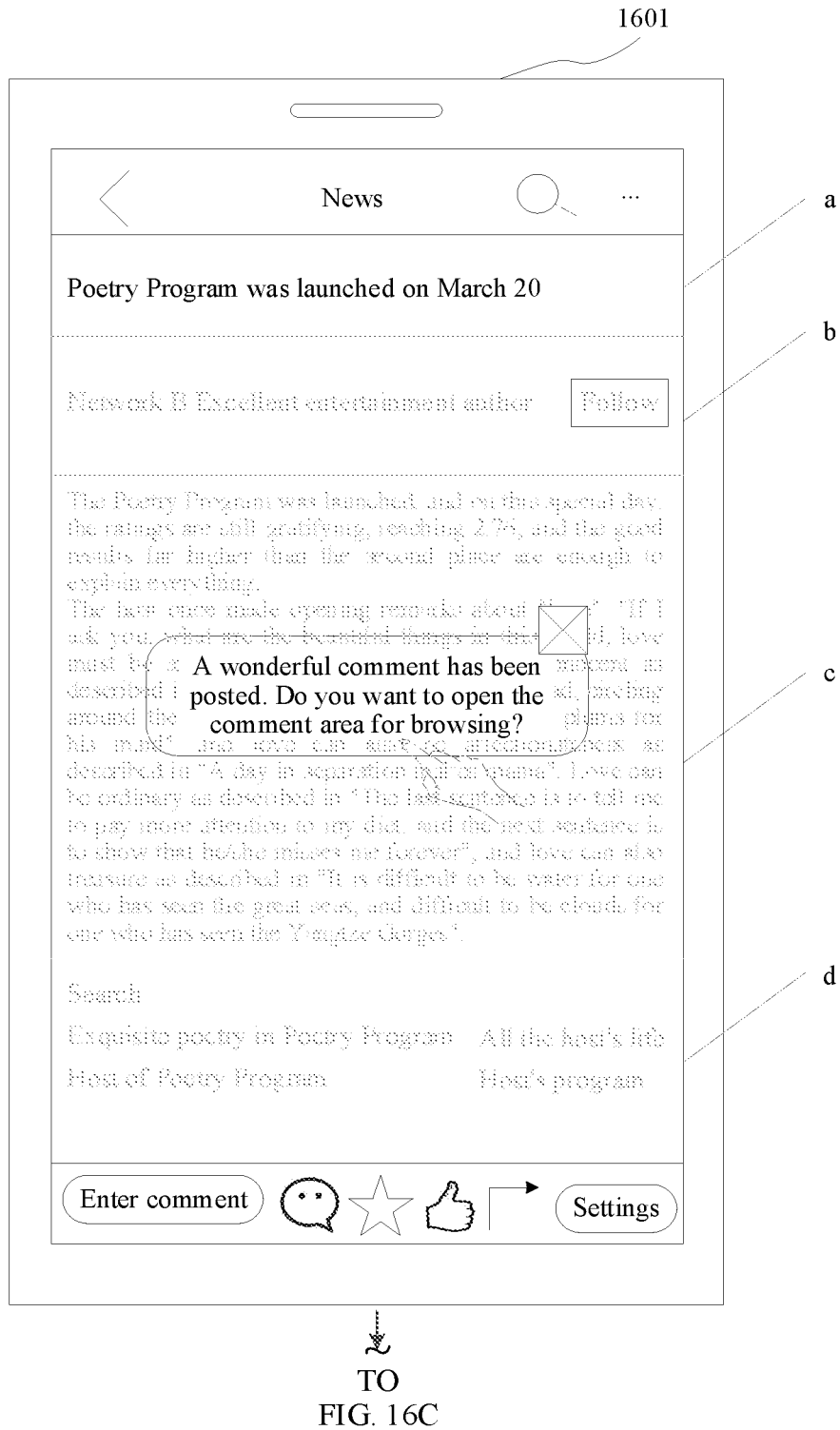
Figure 16C:
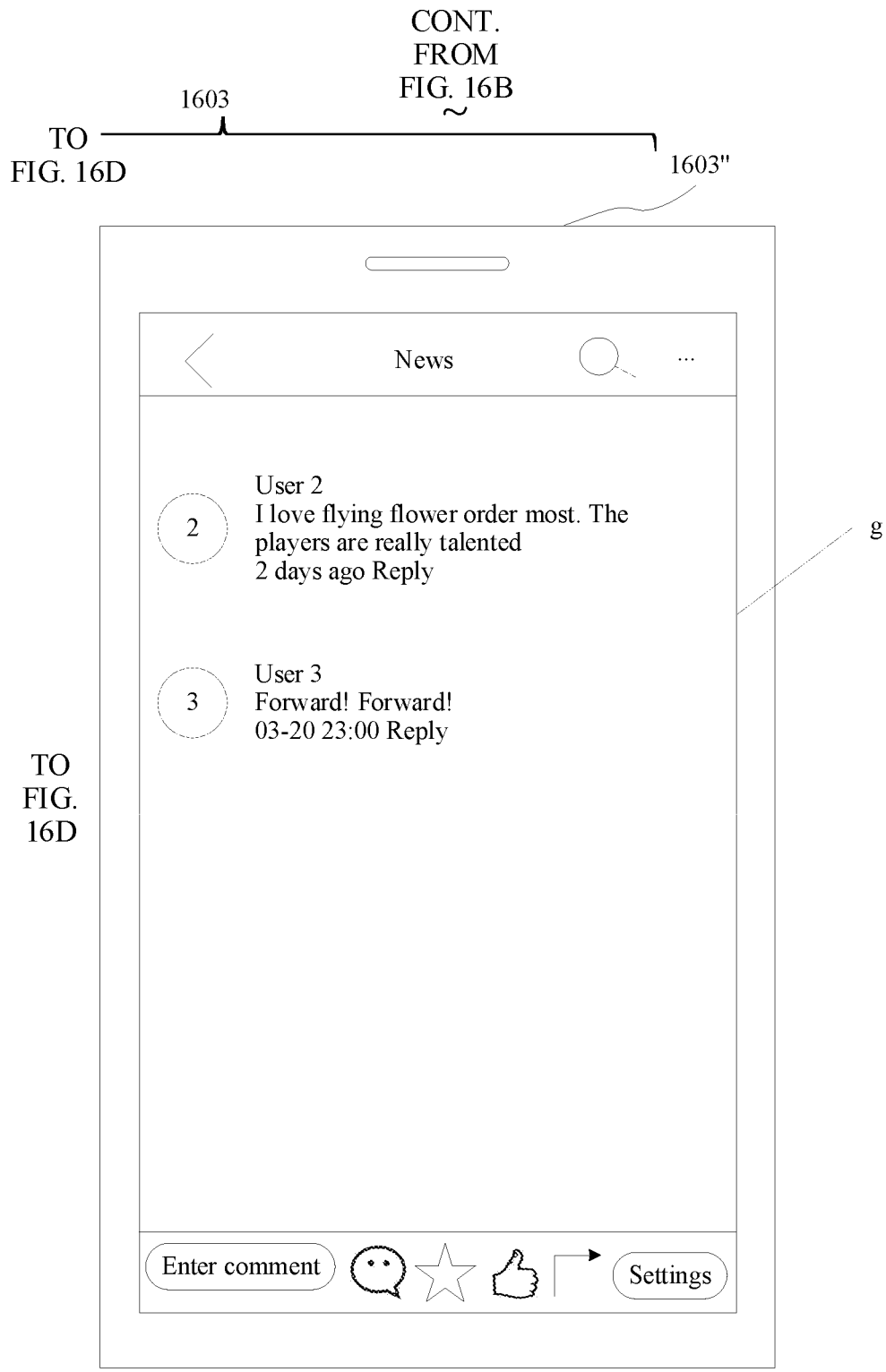
Figure 16D:
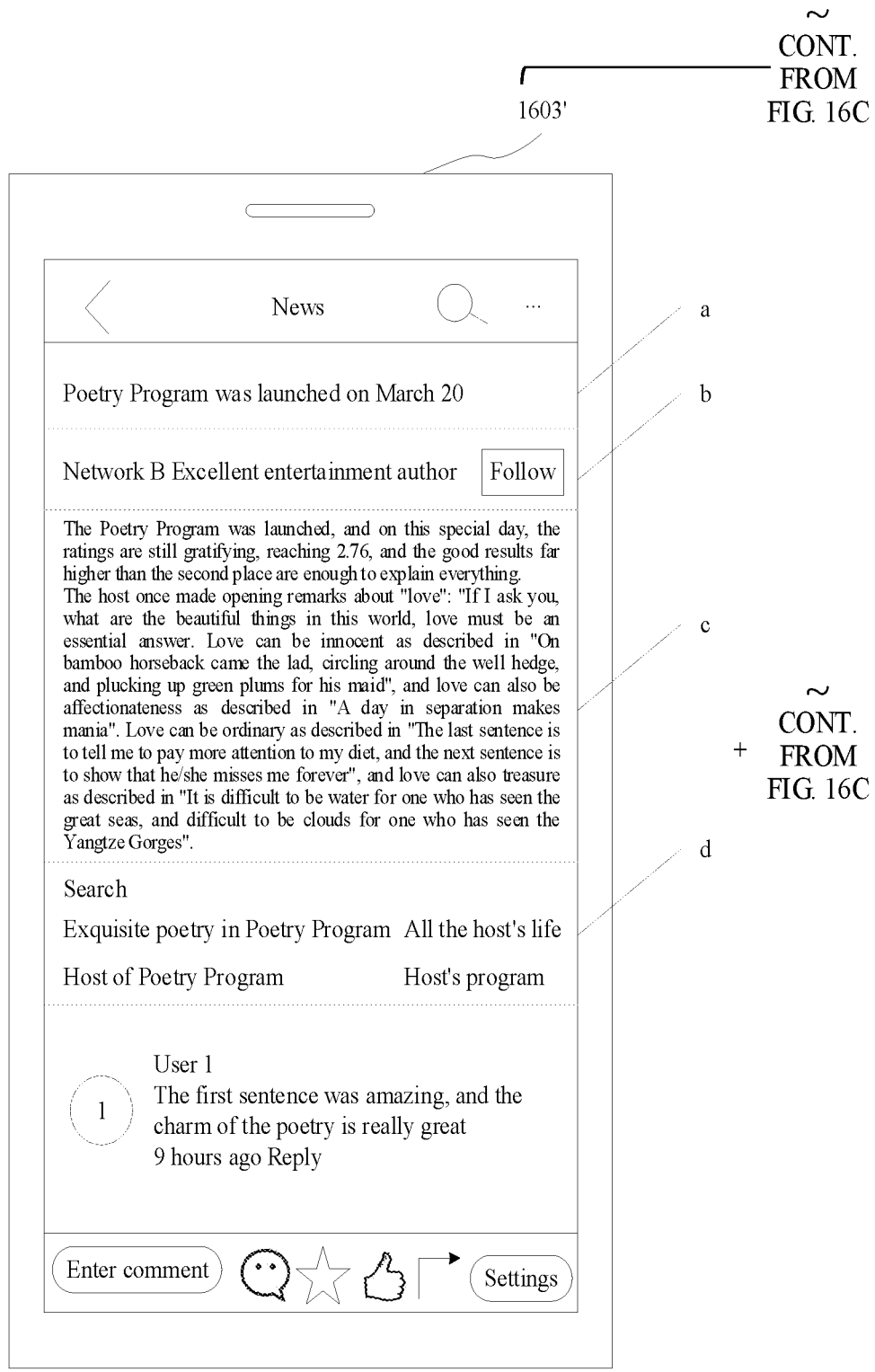

Optionally, the reminder information may be sent to the terminal device along with the details page content of the first information. Correspondingly, the terminal device may display the reminder information when displaying the details page of the first information. FIG. 15A to FIG. 15C are a schematic diagram 8 of an interface change of a terminal device according to an embodiment of this application. As shown in FIG. 15A to FIG. 15C, an interface 1501 is compared with the interface 1301; and if the server determines that a hotspot subject area is a comment area, a reminder control is further displayed at a position in the comment area on the interface 1501 to remind the user to open the comment area. The interface 1501 further displays text reminder information "A wonderful comment has been posted. Do you want to open the comment area for browsing?" and a closing control.

If the terminal device receives an instruction of the user for selecting the reminder information, the terminal device generates re-updated settings information, and sends the re-updated settings information to the server. If the user selects the reminder information, the interface 1501 jumps to an interface 1502. The interface 1502 provides a refreshed details page of the first information, and the interface 1502 displays content in the comment area corresponding to the first information. Correspondingly, a first subject area corresponding to the re-updated settings information does not include the comment area. It is conceivable that, if the user selects the closing control, the terminal device displays the interface 1301.

Optionally, the reminder information may be sent to the terminal device after the details page content of the first information is sent to the terminal device. Correspondingly, when the user reads the details page of the first information, the reminder information may be popped out on an interface of the details page. FIG. 16A to FIG. 16D are a schematic diagram 9 of an interface change of a terminal device according to an embodiment of this application. An interface 1601 is the same as the interface 1301. After the terminal device receives reminder information sent by the server, the interface 1601 may jump to an interface 1602. The interface 1602 may display a closing control and the reminder information, for example, text reminder information "A wonderful comment has been posted. Do you want to open the comment area for browsing?". If the terminal device receives an instruction of the user for selecting the reminder information, the terminal device generates re-updated settings information, and sends the re-updated settings information to the server. If the user selects the reminder information, the interface 1602 jumps to an interface 1603. The interface 1603 provides a refreshed details page of the first information, and the interface 1603 is the same as the interface 1502. Correspondingly, a first subject area corresponding to the re-updated settings information does not include the comment area. It is conceivable that, if the user selects the closing control, the terminal device displays the interface 1601.

It should be understood that, in FIG. 15A to FIG. 15C and FIG. 16A to FIG. 16D, an example in which the terminal device does not display the first subject area is used for description. It is conceivable that, the manners in which the terminal device displays the reminder information in FIG. 15A to FIG. 15C and FIG. 16A to FIG. 16D may also be applied in a scenario in which the terminal device ranks the first subject area lower in order. Correspondingly, after the user selects the reminder information, the terminal device may rank the first subject area higher in order, as shown on the interface 1405.

It is conceivable that, if the server determines, based on the preference data of the user, that there is no subject area preferred by the user, in other words, no first subject area is corresponding to the user, the server may send the content in the preset subject area on the details page of the second information to the terminal device. Correspondingly, the terminal device displays the details page of the second information. The details page of the second information includes the content in the preset subject area on the details page of the second information. It should be understood that, the details page of the second information is the same as a preset details page of the second information. For example, the terminal device may display a details page the same as that provided by the interface 102.

In embodiments of this application, the terminal device may determine a first subject area based on preference data of the user, and then interact with the user to close a subject area that is not preferred by the user, so that the user reads content in a preferred subject area when reading information, thereby improving user experience. In addition, in embodiments of this application, an interaction manner in which the user opens a closed subject area may be further provided. The user may open the closed subject area to meet a personalized requirement of the user. The user may assemble various subject modules on a details page, thereby improving user experience.

The term "a plurality of" in the specification means two or more. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates that there is an "or" relationship between two associated objects. In a formula, the character "/" indicates that there is a "division" relationship between two associated objects.

It may be understood that various numbers in embodiments of this application are merely used for differentiation for ease of description, and are not used to limit the scope of embodiments of this application.

It should be understood that sequence numbers of the foregoing processes do not mean execution sequences in embodiments of this application. The execution sequences of the processes should be determined according to functions and internal logic of the processes, and should not be construed as any limitation on the implementation processes of embodiments of this application.

What is claimed is:

1. A method comprising:
   receiving, from a terminal a request for obtaining details page content of first information of a list page, wherein the request comprises a first identifier of a user and a second identifier of the first information; and
   sending, based on the first identifier and the second identifier, the details page content to the terminal when the details page content is different from preset details page content of the first information,
   wherein the preset details page content comprises preset subject areas ranked in a preset order, and
   wherein the details page content either does not include a first subject area in the preset subject areas or the first subject area in the preset subject areas is ranked lower than a first subject area rank in the preset order.

2. The method of claim 1, further comprising:
   obtaining, from the terminal and based on a category of the first information and the first identifier, settings information on a details page of second information of the category, wherein the settings information indicates that a first subject area on the details page has closed; and
   ranking, based on the settings information, the details page content.

3. The method of claim 2, further comprising receiving, from the terminal, and based on an operation on a closing control in the first subject area on the details page, the settings information.

4. The method of claim 3, further comprising sending, to the terminal, and based on first preference data of the user, a third identifier of the first subject area on the details page, wherein the first preference data corresponds to the second information, and wherein the third identifier enables the terminal to display the closing control.

5. The method of claim 4, wherein the first preference data comprises a preference value of the user corresponding to each subject area in the preset subject areas each time the second information is displayed, and wherein before sending the third identifier, the method further comprises:
   determining second subject areas that are in the preset subject areas and that correspond to first preference values less than a threshold each time the second information is displayed; and
   setting, as the first subject area, a third subject area that is in the second subject areas and that corresponds to second preference values comprising a quantity that is greater than a quantity threshold.

6. The method of claim 4, wherein before sending the third identifier, the method further comprises:
   receiving, from a user portrait device, user portrait information comprising the first identifier and second preference data corresponding to the first identifier and each category of information; and
   obtaining the first preference data from the user portrait information.

7. The method of claim 4, wherein before sending the third identifier, the method further comprises:
   receiving reading data of the user from the terminal in a process in which the second information is displayed; and
   obtaining, based on the reading data, the first preference data.

8. The method of claim 7, wherein the reading data correspond to each subject area in preset subject areas on a second details page and comprises:
   a category of third information;
   a first reading duration of the third information; and
   a second reading duration.

9. The method of claim 2, wherein after sending the details page content, the method further comprises receiving, from the terminal, updated settings information based on an operation on the first subject area on the details page, and wherein the operation instructs to display the first subject area on the details page or ranks the first subject area higher in order on the details page.

10. The method of claim 2, further comprising sending, to the terminal, based on reading data that corresponds to the first information and that is fed back by a second terminal, reminder information, wherein the reminder information instructs to display the first subject area on the details page or to rank the first subject area on the details page higher in order.

11. The method of claim 10, wherein after sending the reminder information, the method further comprises receiving, from the terminal and based on an operation on the reminder information, updated settings information, and wherein the operation instructs to restore display of the first subject area on the details page or ranks the first subject area higher in order on the details page.

12. A method comprising:
   sending, to a server, a request for obtaining details page content of first information of a list page, wherein the details page content is different from preset details page content of the first information, wherein the preset details page content comprises preset subject areas ranked in a preset order, and wherein the details page content either does not include a first subject area in the preset subject areas or wherein the first subject area in the preset subject areas is ranked lower than in a first subject area rank in the preset order, and wherein the request comprises a first identifier of a user and a second identifier of the first information;

receiving, from the server, the details page content; and displaying a first details page of the first information based on the details page content.

13. The method of claim 12, wherein before sending the request, the method further comprises:

displaying a second details page of second information comprising a category that is the same as that of the first information, wherein a first subject area on the second details page comprises a closing control;

receiving an operation on the closing control; and sending, to the server, settings information on the second details page, wherein the settings information instructs to close the first subject area on the second details page.

14. The method of claim 12, further comprising:

displaying a settings control on the first details page;

receiving a first operation for selecting the settings control;

displaying, in response to the first operation, an adjustment control on the settings interface, wherein the adjustment control is configured to restore display of the first subject area in the preset subject areas or rank the first subject area in the preset subject areas higher in order;

receiving a second operation for selecting the adjustment control; and sending, in response to the second operation, updated settings information to the server.

15. The method of claim 14, wherein after sending the updated settings information, the method further comprises displaying a refreshed details page of the first information, and wherein the first subject area is either displayed or ranked higher in order on the refreshed details page.

16. The method of claim 12, further comprising:

receiving, from the server, reminder information that is based on reading data corresponding to the first information and that is fed back by a second terminal, wherein the reminder information instructs to restore display of the first subject area in the preset subject areas or to rank the first subject area in the preset subject areas higher in order;

displaying the reminder information on the first details page;

receiving an operation for selecting the reminder information;

generating, in response to the operation for selecting reminder information, updated settings information; and sending the updated settings information to the server.

17. The method of claim 12, further comprising:

collecting reading data of the user; and sending the reading data to a user portrait device and to the server.

18. The method of claim 17, wherein the reading data correspond to each subject area in preset subject areas on a second details page and comprises:

a category of second information;

a first reading duration of the second information; and a second reading duration.

19. A details page generation apparatus comprising:

a transceiver configured to receive, from a terminal, a request for obtaining details page content of first information, wherein the request comprises a first identifier of a user and a second identifier of the first information; and one or more processors coupled to the transceiver and configured to rank the details page content based on the first identifier and the second identifier, wherein the details page content is different from preset details page content of the first information, wherein the preset details page content comprises preset subject areas ranked in a preset order, and wherein the details page content either does not include a first subject area in the preset subject areas, or wherein the first subject area in the preset subject areas is ranked lower than a first subject area rank in the preset order, and wherein the transceiver is further configured to send, based on the first identifier and the second identifier, the details page content to the terminal when the details page content is different from preset details page content of the first information, wherein the preset details page content comprises preset subject areas ranked in a preset order, and wherein the details page content either does not include a first subject area in the preset subject areas or the first subject area in the preset subject areas is ranked lower than a first subject area rank in the preset order.

20. The details page generation apparatus of claim 19, wherein the one or more processors are further configured to:

obtain, based on a category of the first information and the first identifier, settings information on a details page of second information of the category, wherein the settings information indicates that a first subject area on the details page closes; and further rank, based on the settings information, the details page content.

* * * * *